US011143143B1

(12) United States Patent
Carlson et al.

(10) Patent No.: US 11,143,143 B1
(45) Date of Patent: Oct. 12, 2021

(54) EXTINGUISHABLE DIVERT SYSTEM

(71) Applicant: Valley Tech Systems, Inc., Reno, NV (US)

(72) Inventors: Russell Carlson, Reno, NV (US); Dustin Barr, Reno, NV (US); Allen Yan, Reno, NV (US); Justin Carpenter, Loomis, CA (US)

(73) Assignee: Valley Tech Systems, Inc., Reno, NV (US)

( * ) Notice: Subject to any disclaimer, the term of this patent is extended or adjusted under 35 U.S.C. 154(b) by 34 days.

(21) Appl. No.: 16/411,108

(22) Filed: May 13, 2019

Related U.S. Application Data

(60) Provisional application No. 62/670,685, filed on May 11, 2018.

(51) Int. Cl.
| | | |
|---|---|---|
| *F02K 9/26* | (2006.01) | |
| *B64G 1/40* | (2006.01) | |
| *B63H 11/14* | (2006.01) | |
| *F02K 9/94* | (2006.01) | |
| *F02K 9/22* | (2006.01) | |

(52) U.S. Cl.
CPC .............. *F02K 9/26* (2013.01); *B64G 1/403* (2013.01); *B63H 11/14* (2013.01); *F02K 9/22* (2013.01); *F02K 9/94* (2013.01); *F05B 2270/301* (2013.01); *F05D 2270/051* (2013.01)

(58) Field of Classification Search
CPC ..... F02K 9/08; F02K 9/26; F02K 9/94; B64G 1/403; F05B 2270/301; F05D 2270/051
See application file for complete search history.

(56) References Cited

U.S. PATENT DOCUMENTS

| | | | |
|---|---|---|---|
| 3,266,237 A | 8/1966 | Crowell, Jr. et al. | |
| 3,293,855 A | 12/1966 | Cuttill et al. | |
| 3,724,217 A * | 4/1973 | McDonald | F02K 9/86 |
| | | | 60/254 |

(Continued)

FOREIGN PATENT DOCUMENTS

| | | |
|---|---|---|
| JP | H5-70275 A2 | 3/1993 |
| WO | WO 2009/136887 A1 | 11/2009 |

OTHER PUBLICATIONS

Dubrow et al., "Ballistics of Solid Propellants During Thrust Modulation", American Institute of Aeronautics and Astronautics., Jan. 1964 (9 pp.).
Glascock, "Characterization of Electric Solid Propellant Pulsed Microthrusters", Missouri University of Science and Technology, Masters Theses, 7598, 2016 (73 pp.).
McGrath, D., "ATK Advances in Solid Propulsion", presented to SPST, Oct. 9, 2014 (29 pp.).

(Continued)

*Primary Examiner* — Todd E Manahan
*Assistant Examiner* — Kyle Robert Thomas
(74) *Attorney, Agent, or Firm* — Holland & Hart LLP

(57) ABSTRACT

Various implementations of an extinguishable, solid propellant divert system for a flight vehicle are disclosed. Also disclosed are methods for using the divert system to control the flight of a flight vehicle. In one implementation, a divert system includes a hot gas generator pneumatically linked to one or more divert thrusters and an extinguishment valve. The extinguishment valve can be opened to rapidly depressurize the hot gas generator and extinguish the solid propellant burning inside. In another implementation, a method of controlling the trajectory of the flight vehicle includes repeatedly igniting and extinguishing the solid propellant in a hot gas generator and using the hot gas to provide divert thrust for the flight vehicle.

16 Claims, 53 Drawing Sheets

(56) References Cited

U.S. PATENT DOCUMENTS

| | | | |
|---|---|---|---|
| 4,023,355 A | | 5/1977 | McDonald |
| 4,840,024 A | | 6/1989 | McDonald |
| 5,062,593 A | * | 11/1991 | Goddard ............ B64G 1/26 |
| | | | 244/169 |
| 5,133,183 A | | 7/1992 | Asaoka et al. |
| 5,613,299 A | | 3/1997 | Ring et al. |
| 6,205,378 B1 | | 3/2001 | Rodden et al. |
| 6,412,275 B1 | | 7/2002 | Perruci |
| 6,651,438 B2 | | 11/2003 | McGrath et al. |
| 7,281,367 B2 | | 10/2007 | Rohrbaugh et al. |
| 7,770,380 B2 | | 8/2010 | Dulligan et al. |
| 7,788,900 B2 | | 9/2010 | Dulligan et al. |
| 8,051,640 B2 | | 11/2011 | Geisler et al. |
| 8,215,097 B2 | | 7/2012 | Cover et al. |
| 8,338,768 B2 | * | 12/2012 | Hanlon ............ F42B 10/663 |
| | | | 244/3.22 |
| 8,464,640 B2 | | 6/2013 | Sawka |
| 8,584,443 B1 | * | 11/2013 | Carlson ............ F02K 9/26 |
| | | | 60/234 |
| 8,888,935 B2 | | 11/2014 | Grix et al. |
| 8,950,329 B2 | | 2/2015 | Villarreal et al. |
| 9,035,226 B1 | | 5/2015 | Jouse et al. |
| 9,115,964 B2 | * | 8/2015 | Facciano ............ F42B 15/01 |
| 9,914,671 B1 | | 3/2018 | McPherson |
| 10,598,128 B1 | * | 3/2020 | Carlson ............ F02K 9/94 |
| 10,712,138 B1 | * | 7/2020 | Carlson ............ F42B 10/663 |
| 2016/0061148 A1 | * | 3/2016 | Nelson ............ F02K 9/24 |
| | | | 244/171.1 |
| 2018/0128207 A1 | | 5/2018 | Villarreal et al. |

OTHER PUBLICATIONS

Merkle et al., "Extinguishment of Solid Propellants by Rapid Depressurization", Princeton University, Jul. 1969 (213 pp.).

Mongia et al., "A Model for the Combustion and Extinction of Composite Solid Propellants During Depressurization", Combustion and Flame 22, 59-69, 1974 (11 pp.).

Pue et al., "Missile Concept Optimization for Ballistic Missile Defense", Johns Hopkins Apl Technical Digest, vol. 32, No. 5, 2014 (13 pp.).

Sawka et al., "Solid State Digital Propulsion 'Cluster Thrusters' for Small Satellites, Using High Performance Electrically Controlled Extinguishable Solid Propellants", 19th Annual AIAA/USU Conference on Small Satellites, Jun. 2005 (5 pp.).

Von Elbe et al., "Extinguishment of Solid Propellants by Rapid Depressurization", AIAA Journal, vol. 6, No. 7, 1417-19, Jul. 1968 (3 pp.).

Information about Related Patents, Patent Applications, and Patent Office Proceedings see the section below having the same title.

U.S. Pat. No. 9,927,217 U.S. Appl. No. 14/847,820, Mar. 27, 2018, Valley Tech Systems, Inc., Attitude Control System.

U.S. Appl. No. 15/935,630, filed Mar. 26, 2018, Valley Tech Systems, Inc., Method for Controlling a Flight Vehicle.

U.S. Appl. No. 15/488,267, filed Apr. 14, 2017, Valley Tech Systems, Inc., Hot Gas Thruster.

U.S. Appl. No. 14/875,424, filed Oct. 5, 2015, Valley Tech Systems, Inc., Attitude Control System.

* cited by examiner

EXTINGUISHABLE DIVERT SYSTEM

STATEMENT REGARDING FEDERALLY SPONSORED RESEARCH OR DEVELOPMENT

This invention was made with government support under one or more of the following contracts awarded by the Missile Defense Agency through the Department of Defense (DoD) Small Business Innovative Research Program (SBIR). The U.S. government has certain rights in the invention.
Contract No. HQ0147-17-C-7424 (2017)
Contract No. HQ0147-16-C-7705 (2016)
Contract No. HQ0147-16-C-7706 (2016)
Contract No. HQ0147-15-C-7244 (2015)
Contract No. HQ0147-14-C-7873 (2013)
Contract No. HQ0147-13-C-7205 (2012)
Contract No. W91260-09-C-0008 (2009)
Contract No. W9113M-08-0069 (2008)
Contract No. W9113-07-C-0142 (2007)
Contract No. HQ0006-06-C-7479 (2006)

TECHNICAL FIELD

This relates to solid propellant divert control systems for flight vehicles that can be repeatedly extinguished and reignited to provide on-demand, multi-pulse, divert thrust over an extended operation time. It especially relates to such systems where the solid propellant is extinguished by rapid depressurization. The divert system can be part of a solid propellant divert and attitude control system.

BACKGROUND

One of the greatest threats facing the world is the increasing proliferation of ballistic missiles and weapons of mass destruction. Despite reductions in the number of weapons deployed by the United States and the former Soviet Union, ballistic missile proliferation continues on a wide scale and could increase as technology is transferred to additional nations.

Nations invest in ballistic missiles because they provide the means to project power both in a regional and strategic context and a capability to launch an attack from a distance. A nation without ballistic missiles can acquire them in a short period of time through an intensive research and development program. In the future, ballistic missiles could even become available to nonstate terrorist groups.

Missile defense technology being developed, tested and deployed by the United States is designed to counter ballistic missiles of all ranges—short, medium, intermediate and long. Since ballistic missiles have different ranges, speeds, sizes, and performance characteristics, the ballistic missile defense system is an integrated, "layered" architecture that provides multiple opportunities to destroy missiles and their warheads before they reach their targets.

The missile defense system architecture includes: (1) networked sensors (including space-based) and ground and sea based radars for target detection and tracking; (2) ground and sea based interceptor missiles for destroying a ballistic missile using either the force of a direct collision, called "hit-to-kill" technology, or an explosive blast fragmentation warhead; and (3) a command, control, battle management, and communications network providing operational commanders with the needed links between the sensors and interceptor missiles.

One of the key components of the missile defense system is the standard missile 3 (SM-3), the latest design of which is the SM-3 Block 1B. It is a ship and/or land-based missile used by the United States and its allies to intercept short to intermediate range ballistic missiles as part of the Aegis Ballistic Missile Defense System. Radar locates the ballistic missile and the Aegis weapon system calculates a solution on the target. Once a solution is in place, the missile is launched.

A solid fuel rocket booster launches the SM-3 out of a Mark 41 vertical launching system (VLS). After launch, the missile establishes communication with the launching platform (ship or ground installation) and proceeds towards the target. Once the booster or first stage burns out, it detaches, and a second stage solid-fuel dual thrust rocket motor (DTRM) takes over propulsion through the atmosphere. The missile continues to receive mid-course guidance information from the launching platform and is aided by GPS data.

The second stage rocket motor eventually burns out and detaches and a solid-fuel third-stage rocket motor (TSRM) takes over propulsion. The TSRM can propel the missile above the atmosphere if needed. The TSRM is pulse fired and provides propulsion for the SM-3 until approximately 30 seconds to intercept when the TSRM separates from the kill vehicle (KV).

The KV includes a seeker system that searches for the target using pointing data from the launching platform. The seeker system contains sensors and/or other target acquisition components such as infrared (IR) sensors, radio frequency (RF) sensors, radar, and/or optics that are used to detect and pinpoint the location of the target. The seeker system identifies the target and establishes a track for guidance.

A divert and attitude control system (DACS) such as the throttleable divert and attitude control system (TDACS) used with the SM-3 Block 1B missile is used to maneuver the KV to the target. The DACS includes a divert system and an attitude control system (ACS). The divert system removes trajectory errors that remain after the earlier portions of flight and responds to guidance commands derived from seeker system measurements. In general, the divert system provides the lateral motion for the KV, and the ACS provides the angular control to stabilize KV pointing and control divert direction.

The DACS can maneuver the KV in various ways such as "diverting" the trajectory of the KV or adjusting the attitude (pitch, roll, and yaw) of the KV. Divert movements are typically performed to move the KV laterally or otherwise adjust the KV's trajectory. Attitude adjustments are performed to control the orientation of the KV with respect to an inertial frame of reference or another entity, which is usually the target. For example, the DACS can adjust the attitude of the KV to position radar, optics, and other sensors towards the target. Divert maneuvers typically require substantially more total impulse than attitude adjustment maneuvers.

Although conventional DACS technologies, such as those used in the SM-3 Block 1B TDACS, have functioned somewhat acceptably, they also suffer from a number of performance deficiencies in the following areas: (1) operating time (increased operating time is preferred), (2) energy management (on/off capability), (3) mass (less mass being preferred), and (4) divert distance. Accordingly, it would be desirable to provide a DACS system that improves one or more of these factors.

SUMMARY

A divert and attitude control system (DACS) includes an attitude control system (ACS) and a divert system (DS). The DACS can be used with a variety of endoatmospheric and exoatmospheric flight vehicles. For example, it can be used as the DACS for the kill vehicle (KV) of a missile defense interceptor missile. It can also be used with any of the other flight stages of a guided missile. Also disclosed are methods of using the DACS to control the trajectory of a flight vehicle (divert system) and/or the attitude of the flight vehicle (attitude control system).

The DACS can be implemented in various ways to realize one or more of the following potential advantages. One potential advantage is that the attitude control system and/or the divert system can provide on-demand, multiple thrust pulses and long duration operation. In some implementations, for example, the attitude control system and/or the divert system can provide thrust for at least 1000 seconds.

Another potential advantage of the DACS is that the attitude control system and/or the divert system can use solid propellant. Solid propellant is relatively stable and easy to transport compared to other options such as hypergolic propellants. This makes it suitable for use with flight vehicles launched from land or sea. Solid propellant is also relatively inexpensive compared to the alternatives. Another potential advantage is that the DACS is lightweight, which increases the capabilities of the flight vehicle, particularly for a KV.

In some implementations, the attitude control system and/or divert system can use an extinguishable solid propellant. The propellant is ignited to provide pressurized gas for the attitude thrusters and/or divert thrusters. In some implementations, the attitude control system and the divert system each include separate propellant. In one implementation, the propellant in the divert system is ignited by hot gas from the attitude control system.

In some implementations, the propellant in the attitude control system and/or divert system is repeatedly extinguished and reignited. In one implementation, hot gas generated by burning the propellant in the attitude control system is used to repeatedly ignite the propellant in the divert system. The solid propellant in the attitude control system and/or the divert system can be extinguished in a number of ways. In some implementations, the solid propellant is extinguished by rapid depressurization.

In some implementations, the attitude control system can be used independently with divert systems other than those described in this document. For example, the attitude control system can be used with a throttleable divert system such as the one currently used with the SM-3 Block 1B missile.

In some implementations, the divert system can be used independently with attitude control systems other than those described in this document. For example, the divert system can be used with an attitude control system that uses high pressure, stored, cold gas to provide attitude thrust.

In some implementations, the DACS can provide continuous attitude control and/or divert control capability for a relatively long period of time. For example, the DACS can provide continuous attitude control and/or divert control capability for 100 seconds to 2000 seconds. Also, the DACS can provide continuous attitude control and/or divert control capability for at least 100 seconds, at least 200 seconds, at least 300 seconds, at least 400 seconds, at least 500 seconds, and so forth.

In some implementations, the attitude control system and the divert system are separate components that are pneumatically linked. The two systems are pneumatically linked in the sense that hot gas generated from one system can be channeled to the other system to ignite the propellant in the other system. In some implementations, hot gas from the attitude control system can be channeled to the divert system to ignite the propellant in the divert system. In some implementations, hot gas from the attitude control system can be used to repeatedly ignite the propellant in the divert system thereby eliminating the need for igniters in the divert system.

The attitude control system can have a variety of configurations. In some implementations, the attitude control system includes a gas generator, an accumulator coupled to the gas generator, a valve positioned between the gas generator and the accumulator, and attitude thrusters. The gas generator includes propellant that burns to provide hot gas to the accumulator where it is stored. The accumulator is pneumatically linked to attitude thrusters that use the hot gas in the accumulator to adjust the attitude of the flight vehicle.

The valve can be opened to recharge the accumulator with hot gas from the gas generator and, after the accumulator is full, closed to hold the pressurized hot gas in the accumulator. The valve can include various components that allow it to withstand the high temperatures and high pressures produced by the burning propellant. In one implementation, the valve includes components made of a ceramic matrix composite such as C—ZrOC or C—SiC.

In some implementations, the valve extends at least part way into the accumulator. In this configuration, the valve is pressurized when the accumulator is recharged with hot gas. After the accumulator is full and the valve is closed, the pressure inside the valve falls to ambient while the pressure in the accumulator remains. In this configuration, the pressure in the accumulator exerts hoop compression on the outside of the valve.

In some implementations, the attitude control system includes a vent valve that is in fluid communication with the gas generator and/or the accumulator. The vent valve can be used to extinguish the propellant in the gas generator. For example, after the accumulator is recharged by the propellant burning in the gas generator, the valve to the accumulator is closed and the vent valve is opened. The sudden depressurization in the gas generator extinguishes the propellant.

In some implementations, the attitude control system can operate in the following manner. An initial propellant charge is positioned in the accumulator and ignited with the valve closed. Hot gas fills the accumulator until it reaches a set pressure or initial threshold at which the valve is opened. Hot gas flows from the accumulator to the gas generator and ignites the propellant in the gas generator for the first time. The gas generator produces additional hot gas and the pressure gradient reverses so that hot gas flows back into the accumulator.

The accumulator reaches a set point maximum pressure or upper threshold pressure at which the valve to the accumulator is closed and the vent valve is opened. The sudden depressurization in the gas generator extinguishes the propellant. When the pressure in the accumulator drops below a set point or lower threshold (due to attitude adjustments, etc.) or after a set amount of time, the accumulator is recharged by opening the valve and closing the vent valve. Hot gas flows from the accumulator to the gas generator and ignites the propellant. The hot gas from the gas generator pressurizes the accumulator and the cycle repeats itself. The accumulator can be recharged multiple times over the operational life of the attitude control system.

In some implementations, the attitude control system is a low level attitude control system (LLACS). For example, the attitude control system that is part of the DACS for the KV can be a low level attitude control system. The low level attitude control system can provide attitude control thrust throughout the final flight stage including when the divert system is active (burning propellant) or inactive (extinguished).

The divert system can have a variety of configurations. In some implementations, the divert system includes a gas generator, an ignition valve, and divert thrusters. The ignition valve is positioned between the divert system and the attitude control system to selectively allow hot gas from the attitude control system to enter the divert system and ignite the propellant. For example, the ignition valve can be positioned between the accumulator and the divert gas generator. Opening the ignition valve allows hot gas from the accumulator to contact and ignite the propellant in the divert gas generator.

In general, the divert system typically includes substantially more propellant than the attitude control system. This is because divert maneuvers require substantially more thrust than attitude adjustments. In one implementation, the divert system includes at least 1.5× as much propellant as the attitude control system.

In some implementations, the divert system includes a first hot gas generator and a second hot gas generator spaced apart and positioned opposite each other along a lengthwise axis of the divert system. The hot gas generators can be pneumatically linked to each other and to the divert thrusters.

In some implementations, the one or more gas generators in the divert system are pneumatically separate from any propulsion rocket motors that may be included on the flight vehicle. This design makes it so the divert system can produce hot gas when the propulsion rocket motors are off or have separated from the flight vehicle.

A launch vehicle reaction control system (RCS) is also disclosed. The RCS can be used to provide attitude control for small spacecraft launch systems such as those that are used to launch satellites and the like. The RCS can be used in booster flyout attitude control system applications, post boost propulsion system (PBPS) applications, payload deltav applications, and attitude control systems to provide increased satellite orbital insertion accuracy.

The RCS can provide a number of advantages. One is that it can replace conventional, heavier, and less performing cold gas attitude control systems resulting in a cost reduction up to 30% and a weight reduction up to 25%. It can provide a new affordable and higher performing solid RCS that fills an important technical gap for affordable access to space.

The RCS can be used in a variety of applications including: hypersonic inflatable aerodynamic decelerator (HIAD), towed glider airLaunch system (TGALS), mars ascent vehicle reaction control system (MAV RCS), lunar/mars landers, large booster systems, low earth orbit smallsats, deep-space smallsats, non-propulsive gas generators, kinetic energy KVs, ground based strategic deterrent (GBSD) post boost propulsion and booster roll control system applications, and/or hypersonic steering applications.

In some implementations, the RCS includes a gas generator, at least two thrusters, and one or more igniters. The gas generators hold solid propellant that can be ignited with an igniter. The solid propellant burns generating hot gas. The thrusters are actuated to: (a) maintain the pressure in the gas generate at a set level or within a certain range and/or (b) exert thrust on the flight vehicle to adjust its trajectory and/or attitude. The solid propellant can be extinguished by opening all or enough of the thrusters to cause rapid depressurization of the gas generator. The solid propellant can be repeatedly ignited and extinguished to produce multiple thrust pulses.

It should be appreciated that referring to the gas generator as not being pneumatically linked to or pneumatically separate from a propulsion rocket motor means that no pneumatic pathway or linkage exists between the gas generator and the propulsion rocket motor. If such a pathway or linkage exists, then they are pneumatically linked and are not pneumatically separate. This is true regardless of the presence or state (open/closed) of any valve that may be present in such a pathway or linkage.

The systems, methods, and devices of this disclosure each have several innovative aspects, no single one of which is solely responsible for the described desirable attributes. The summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

DRAWINGS

The preferred and other implementations are disclosed in association with the accompanying drawings in which.

DETAILED DESCRIPTION

Overview

Figure 1:
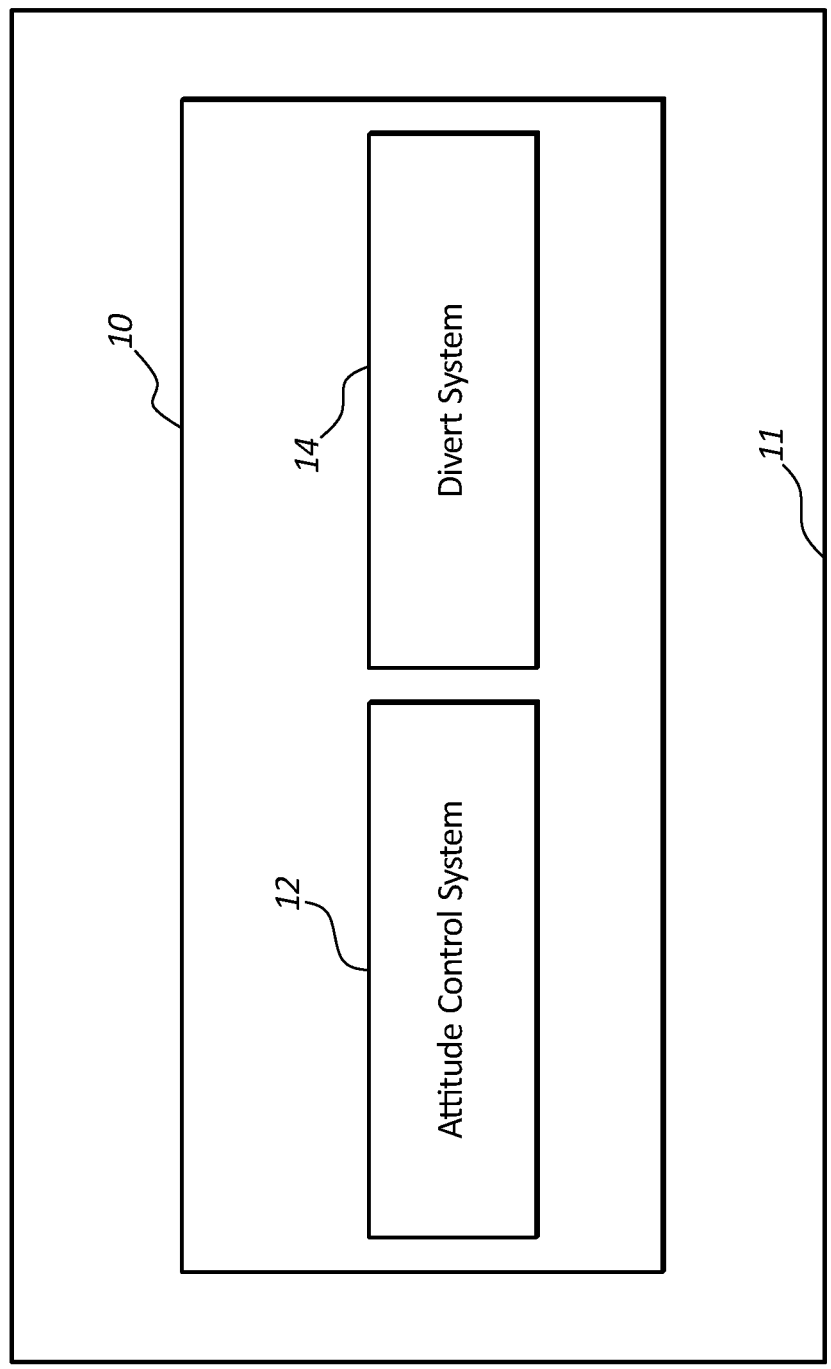
FIGS. 1-2 are conceptual diagrams of various implementations of a divert and attitude control system (DACS) including an attitude control system and a divert system.
Figure 2:
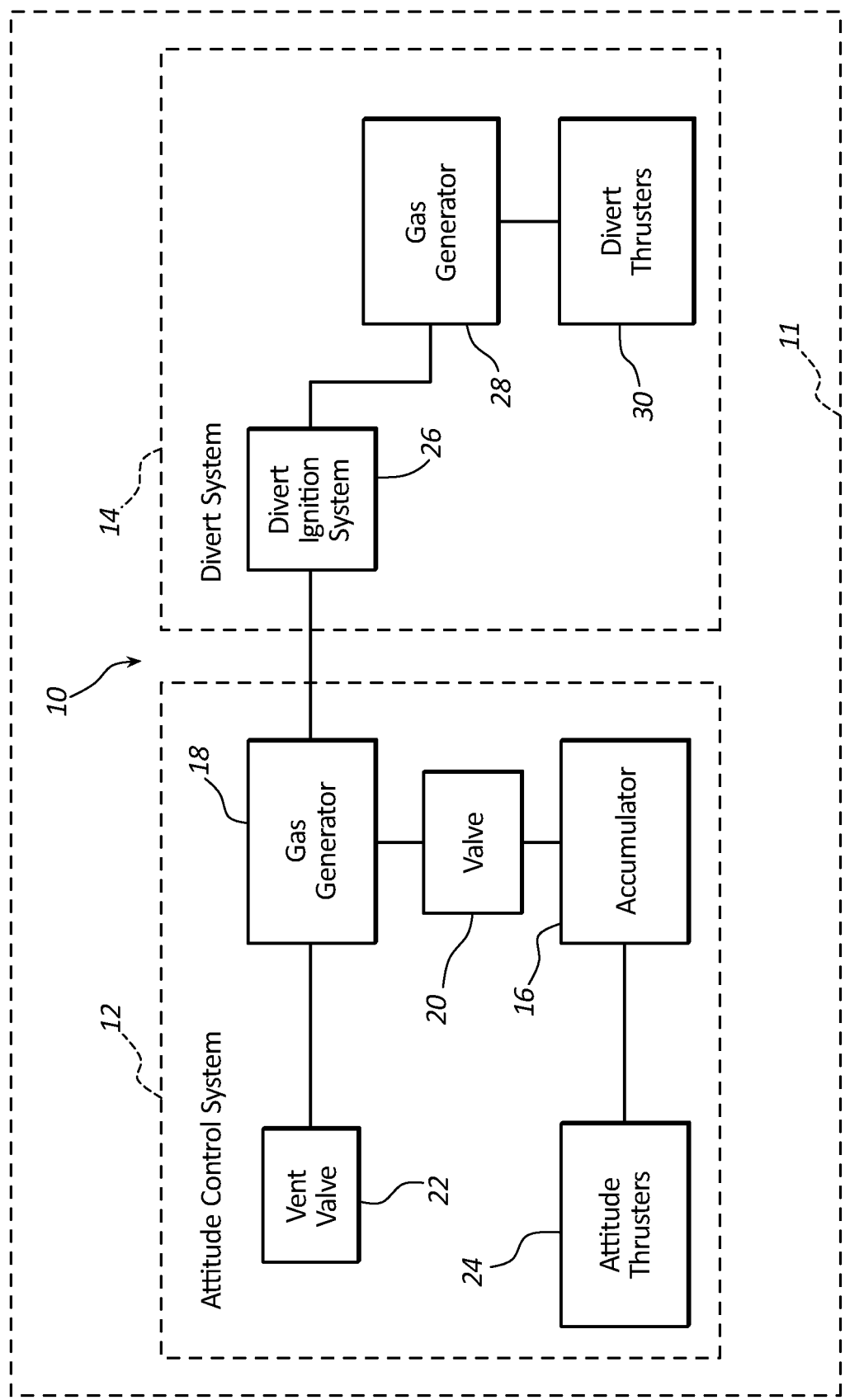

FIGS. 1-2 show conceptual diagrams of various implementations of a divert and attitude control system (DACS) 10. The DACS 10 can be used in a variety of ways and with a variety of flight systems or vehicles 11. In some implementations, the DACS is included as part of a missile defense interceptor missile launched to destroy a target such as a ballistic missile. For example, the DACS 10 can be used during the final stage of flight to maneuver a kill vehicle (KV) into the target. The DACS 10 can also be used for advanced upper stage booster divert and/or attitude control applications.

In one implementation, the DACS 10 can be included as part of the standard missile 3 (SM-3) used in current missile defense systems. For example, the DACS 10 can be part of the final stage control system that maneuvers the KV into the target. The DACS 10 can also be used with any of the other stages of the SM-3. For example, the DACS 10 can be used with the third stage rocket motor of the SM-3 to perform divert and attitude adjustment maneuvers.

The DACS 10 can be used independently or in conjunction with a propulsion rocket motor. For example, in some implementations, the KV does not include a propulsion rocket motor. In such situations, the DACS 10 can be used exclusively to maneuver the KV during the final stage of flight—e.g., adjust the attitude and trajectory of the KV to intercept the target. In some implementations, the DACS 10 is pneumatically separate from any propulsion rocket motors that may be included on the flight vehicle. This design makes it so the divert system can produce hot gas when the propulsion rocket motors are off or have separated from the flight vehicle.

In some implementations, the DACS 10 uses hot combustion gas to provide thrust for both divert and attitude adjustment maneuvers. This is especially advantageous in the context of attitude adjustments. This type of system can provide a greater amount of thrust than systems that use pressurized cold gas for attitude adjustments, which gas must be provided as a pre-pressurized container that is launched with the flight vehicle 11. Also, a hot gas system is safer to store, transport, and handle than high pressure containers.

In some implementations, the DACS 10 generates and stores the hot gas. The pressures produced by this process can be significant. In one implementation, the DACS 10 can withstand a maximum pressure of at least 1,000 psia, at least 1,500 psia, at least 2,000 psia, at least 2,500 psia, at least 3,000 psia, or at least 3,500 psia. In another implementation, the DACS 10 is designed to withstand a maximum pressure of 1,000 to 3,500 psia, 1,500 psia to 3,000 psia, or 2,000 psia to 3,000 psia.

In some implementations, the DACS 10 is a solid propellant DACS (SDACS). This means that the DACS 10 burns solid propellant to provide thrust for divert and attitude adjustment maneuvers. In general, it is preferable to use solid propellant because it is safer to store, handle, and transport than liquid propellant.

In some implementations, the solid propellant can be extinguishable. This makes it possible to repeatedly ignite and extinguish the propellant during operation, which increases the operational time of the DACS 10. In some implementations, the solid propellant can be extinguished by sudden rapid depressurization. In general, rapid depressurization involves reducing the pressure to ambient within no more than 1 second, no more than 750 ms, no more than 500 ms, or no more than 250 ms.

The DACS 10 can be extinguished and reignited any suitable number of times. In some implementations, the DACS 10 can be extinguished and reignited (or ignited and extinguished) at least 20 times during operation, at least 25 times during operation, or at least 30 times during operation.

The DACS 10 can operate for a relatively long period of time. The operational time of the DACS 10 is the period after it is initially ignited during which it can supply thrust for divert and attitude adjustment maneuvers. The operational time can include periods when the DACS 10 is extinguished. In general, it is desirable to maximize the operational time of the DACS 10 given the constraints of the particular flight vehicle. Long duration operation allows the flight vehicle to travel longer distances and operate with greater efficiency.

In one implementation, the DACS 10 has an operational time of at least 100 seconds, at least 200 seconds, at least 300 seconds, at least 400 seconds, at least 500 seconds, at least 600 seconds, at least 700 seconds, at least 800 seconds, at least 900 seconds, or at least 1000 seconds. In another implementation, the DACS 10 has an operational time of 100 to 2,000 seconds.

In some implementation, the DACS 10 can use solid propellant and satisfies one or more of the specifications shown in Table 1.

TABLE 1

Solid DACS Specifications

| Parameter | Value |
|---|---|
| Operating time | ≥300 s |
| Operating mode | Extinguishable and/or throttling |
| Ignition criteria | Hot gas storage is ≥500 psia within 0.5 s of ignition |
| Maximum mass | The maximum mass, when fully loaded with expendables, shall not exceed 30.0 lb. AIAA Standard 120-2006 shall be used as a guideline for applying mass growth and margin. |
| Maximum envelope | At least 15 DACSs shall fit inside an SM-3 BLKIIA shroud. |
| Thruster misalignment | ACS usage shall account for unbalanced divert and ACS thrust and all thruster misalignment, both by design and manufacturing error. |
| Structural stiffness | The KV first body bending will be greater than 300 Hz in free flight, including payload interfaces. Assume a rigid payload. |
| Payload interface temp | Maximum payload interface temperature will not exceed 250° F. during operation. |
| Maximum payload mass | Payload maximum mass shall not exceed 9.0 lb. |
| Split payload mass allocation | Split payload mass allocation shall be 56.77% (forward) and 43.23% (aft). |
| Split payload center-of-gravity | The split payload CG's are located 1.97 in forward of the forward interface and 1.89 in aft of the aft interface. |
| Split payload moments of inertia | The split payload moments of inertia about the payload's CG's shall be as follows (all units in lbm · in$^2$): Front: Ixx = 148.8, Iyy/Izz = 188.5 Aft: Ixx = 148.8, Iyy/Izz = 79.4 |
| Normal temp | System shall meet performance and reliability after continuous exposure to assembly and check out temperature range of +50° F. to +95° F. during the final assembly and missile encanisterization period of up to 180 days. |
| Air conditioning malfunction temp | System shall meet performance and reliability after continuous exposure to assembly and check out temperature range of 0° F. to +120° F. due to air conditioning malfunction for a period not to exceed 72 hours. There can be up to three air conditioning malfunctions during any 180 day period. |
| Storage temp | System shall meet performance and reliability after continuous exposure to storage temperature range of −20° F. to +120° F. for periods up to 2 years. The conditions apply with maximum variation in any 24 hr period of 30° F. |
| Transportation temp | System shall meet performance and reliability after exposure to transportation temp range of −20° F. to +130° F. for periods of up to 5 days. |
| Normal Pressure | System shall meet performance and reliability after exposure to assembly and checkout atmospheric pressures of 15.4-11.3 psia (sea-level to 7000 ft). |
| PHS&T Pressure | System shall meet performance and reliability after exposure to PHS&T atmospheric pressures of 15.4-2.7 psia (sea-level to 40,000 ft). |

Referring back to FIG. 1, the DACS 10 includes an attitude control system 12 (alternatively referred to as an attitude control subsystem) and a divert system 14 (alternatively referred to as a divert subsystem). It should be appreciated that the description of the DACS 10 above applies equally to one and/or both systems 12, 14. For example, the description of the operational time of the DACS 10 is applicable individually to the attitude control system 12 and/or the divert system 14.

The attitude control system 12 and the divert system 14 described in this document do not need to be used together although doing so is often preferable. The attitude control system 12 can be used with other divert systems. For example, the attitude control system 12 can be used with an off-the-shelf divert system 14 that is adapted to work with the attitude control system 12.

Likewise, the divert system 14 can be used with other attitude control systems. For example, the divert system 14 can be used with an off-the-shelf attitude control system I that is adapted to work with the divert system 14. In some implementations, the divert system 14 can be used with an attitude control system that uses cold gas to provide thrust.

The attitude control system 12 includes an accumulator 16, a gas generator 18, an accumulator valve or first valve 20, a vent valve, extinguishment valve, or second valve 22, and one or more attitude thrusters 24. The divert system 14 includes a divert valve or divert ignition valve 26, a gas generator 28, and divert thrusters 30.

Figure 3:
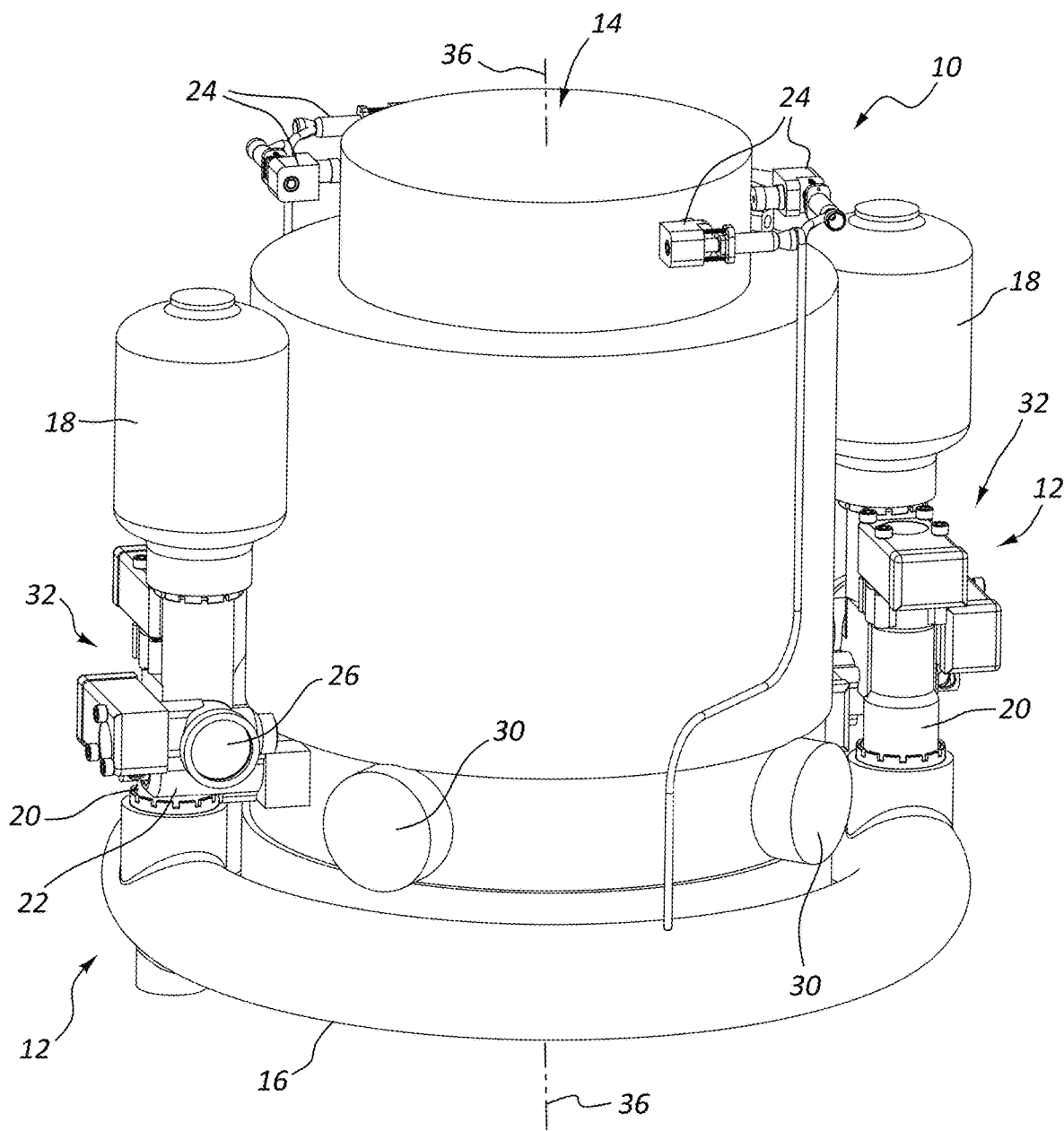
FIG. 3 is a perspective view of one implementation of the DACS in FIG. 2.
Figure 18:
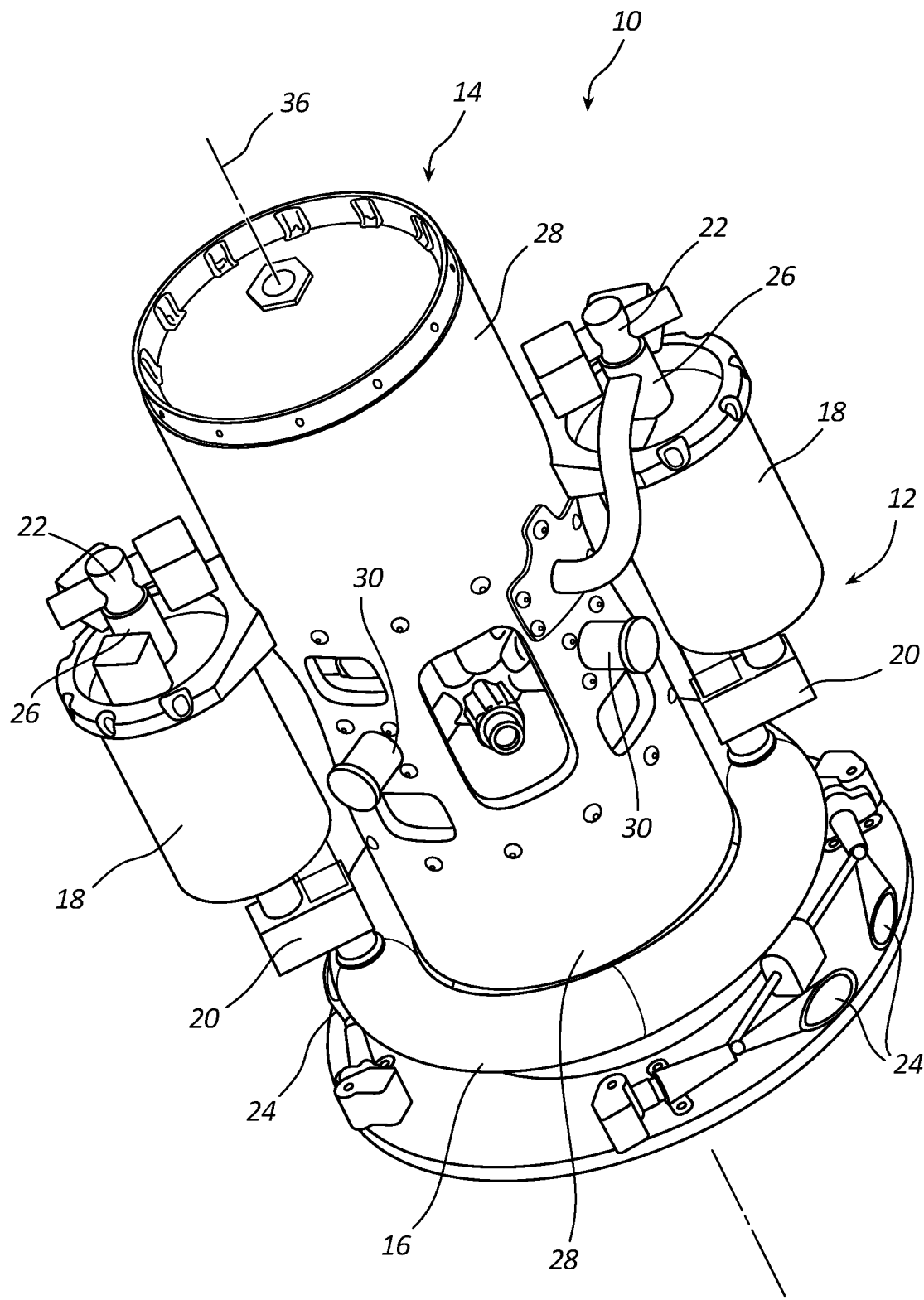
FIG. 18 is a perspective view of another implementation of the DACS in FIG. 2.

In some implementations, the systems 12, 14 are physically separate units coupled together to form the DACS 10 as shown in FIGS. 3 and 18. For example, each system 12, 14 can include its own propellant (not shown), thrusters 24, 30, and the like. In some implementations, the systems 12, 14 are pneumatically linked so that hot gas from the attitude control system 12 can be used to ignite the propellant in the divert system 14 one or more times. The divert valve 26 can be used to control the flow of hot gas between the attitude control system 12 to the divert system 14. In some other implementations, the systems 12, 14 are not pneumatically linked and operate separately.

It should be appreciated that the boundaries between the systems 12, 14 as depicted in the FIG. 2 are conceptual in nature and subject to change depending on the circumstances. For example, the divert valve 26 is shown as part of the divert system 14 in FIG. 2. However, the divert valve 26 could also be considered part of the attitude control system 12 if it is produced as part of the same unit that includes the components of the attitude control system 12. Alternatively, the divert valve 26 could be part of the unit that includes the components of the divert system 14. Likewise, the vent valve 22 is shown as part of the attitude control system 12 when it could just as easily be considered part of the divert system 14.

It should be appreciated that divert maneuvers require more force than attitude adjustments. Accordingly, the divert system 14 is generally larger than the attitude control system 12. In one implementation, the divert system 14 includes substantially more propellant than the attitude control system 12. For example, the divert system 14 can include 1.5× to 10× as much propellant, or more, as the attitude control system 12. The divert system 14 can also provide more total impulse than the attitude control system 12. For example, the divert system 14 can provide 1.5× to 10× as much total impulse, or more, than the attitude control system 12.

One implementation of the DACS 10 is shown in FIG. 3. The accumulator 16 has a circular or toroidal shape that encircles the base of the divert system 14. The attitude control system 12 includes a pair of housing assemblies 32 coupled to opposite sides of the accumulator 16. The housing assemblies 32 extend upward from the accumulator 16 adjacent to the outside of the divert system 14. The upper end of each housing assembly 32 is coupled to a gas generator 18. The attitude thrusters 24 are pneumatically linked to the accumulator 16 and extend upward near the forward end of the DACS 10.

Another implementation of the DACS 10 is shown in FIG. 18. It is roughly similar to that shown in FIG. 18. One notable change is the position of the attitude thrusters 24. They are positioned closer to and aft of the accumulator 16. Another notable change is that the DACS 10 is that the vent valves 22 and the divert ignition valve 26 have been relocated from being underneath the gas generators 18 to being on top of the gas generators 18. The divert system 14 also includes two gas generators 28 spaced apart along a longitudinal axis 36 of the divert system.

The details of the attitude control systems 12 and the divert systems 14 shown in FIGS. 3 and 18 are described in greater detail below.

Attitude Control System (ACS)

Figure 4:
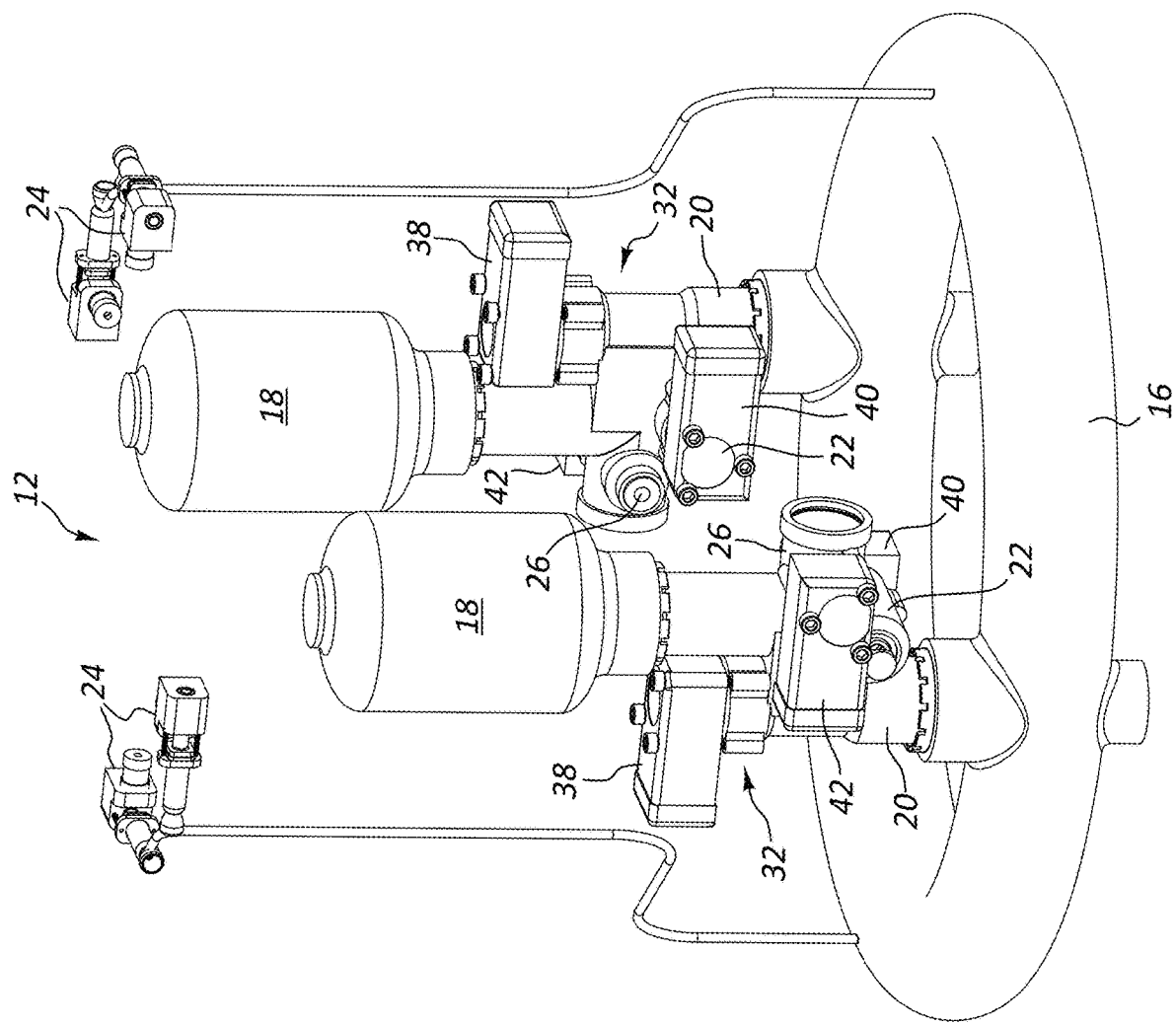
FIG. 4 is a perspective view of the attitude control system from the DACS in FIG. 3.
Figure 5:
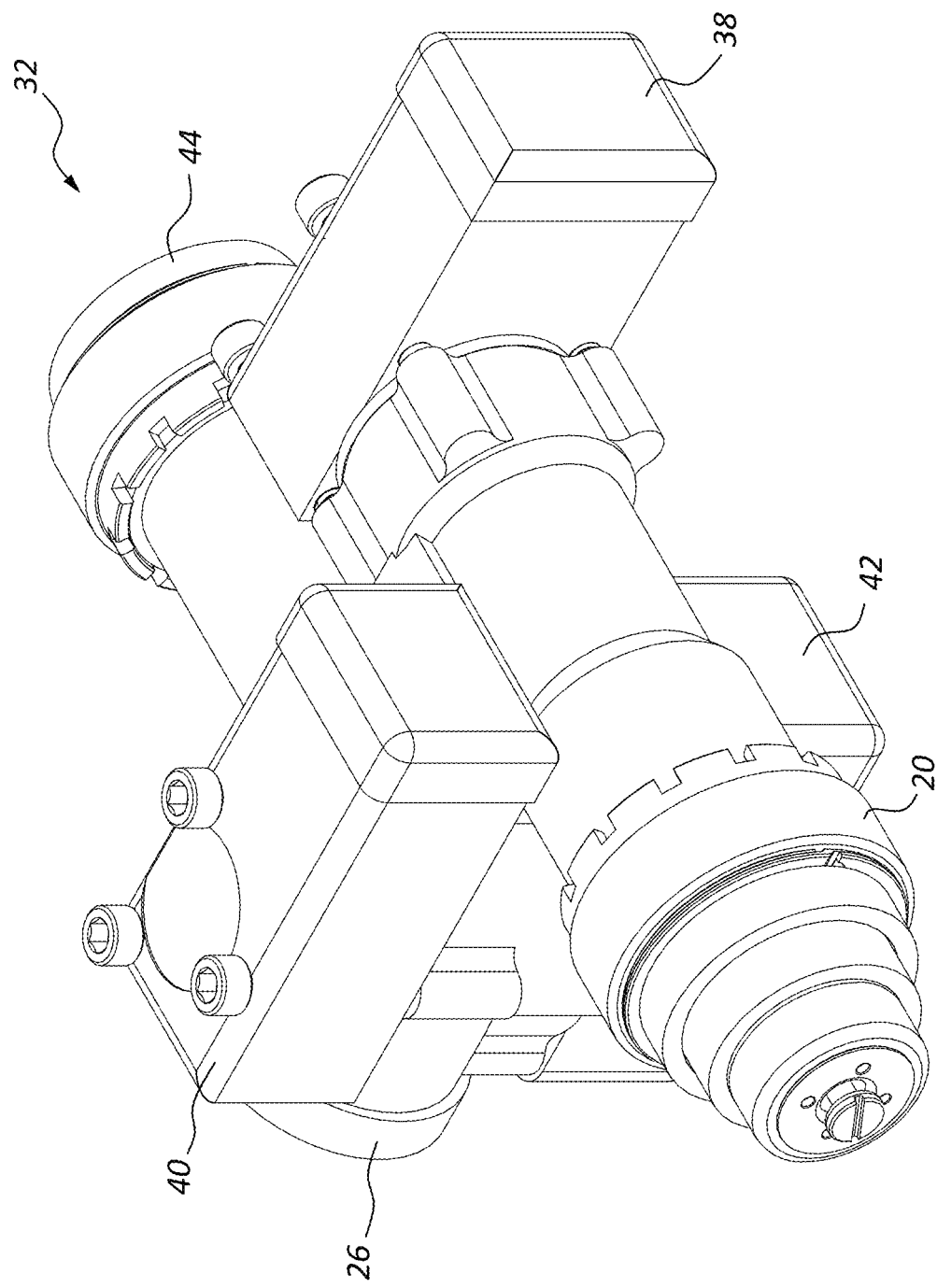
FIGS. 5-8 are perspective views of a housing assembly from the DACS in FIG. 3. The housing assembly includes an accumulator valve, vent valve, divert valve, and a passage connecting all the valves.
Figure 6:
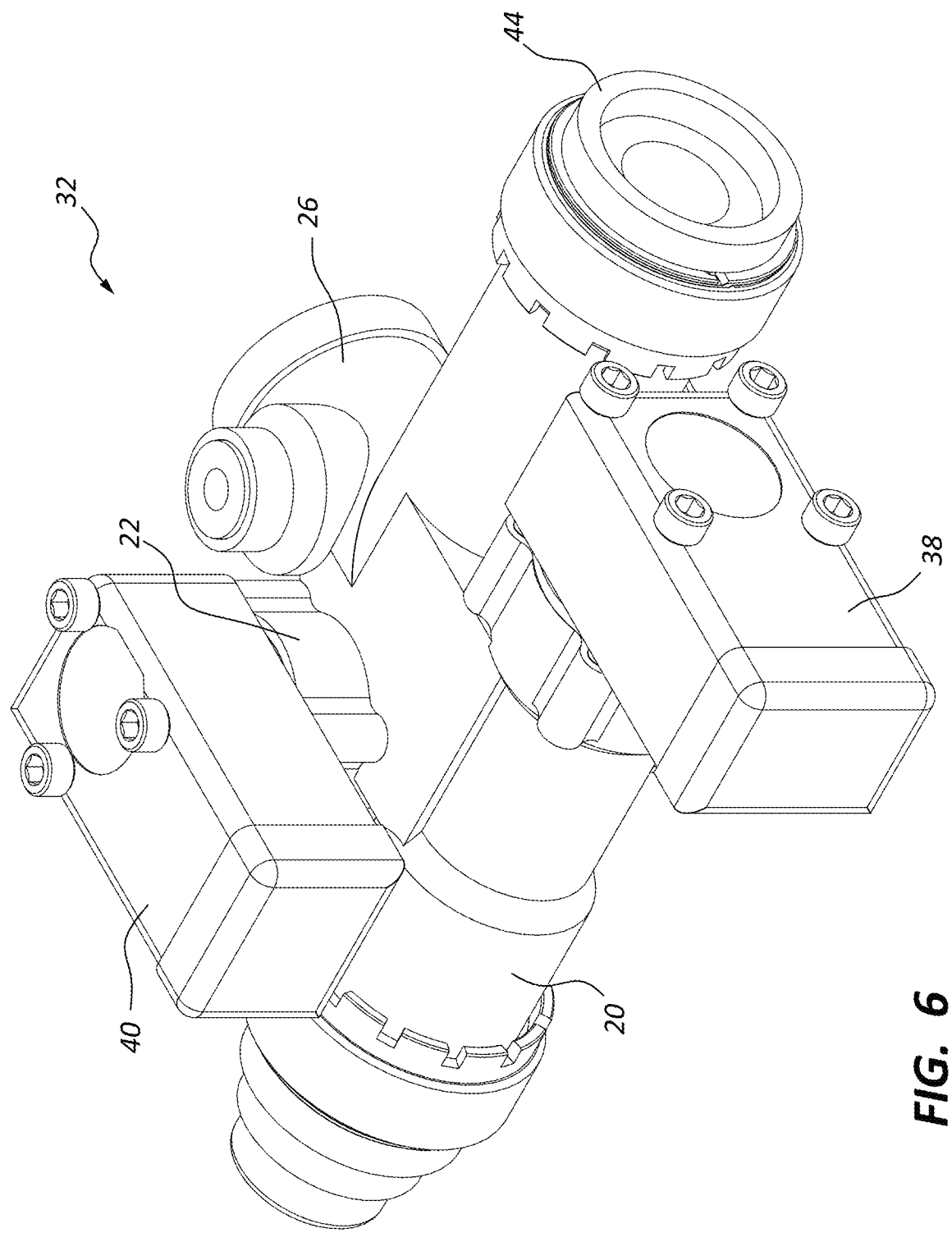
Figure 7:
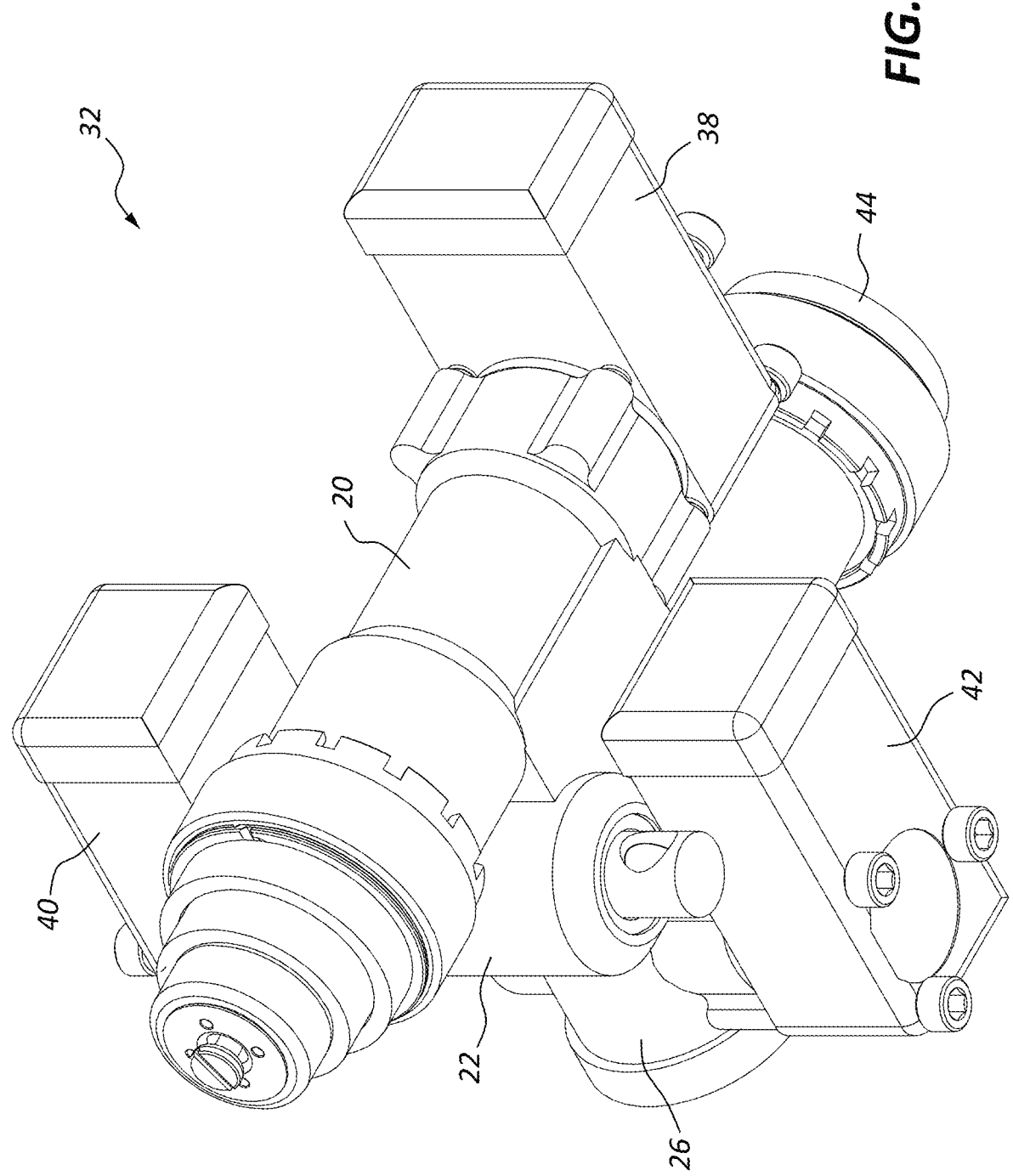
Figure 8:
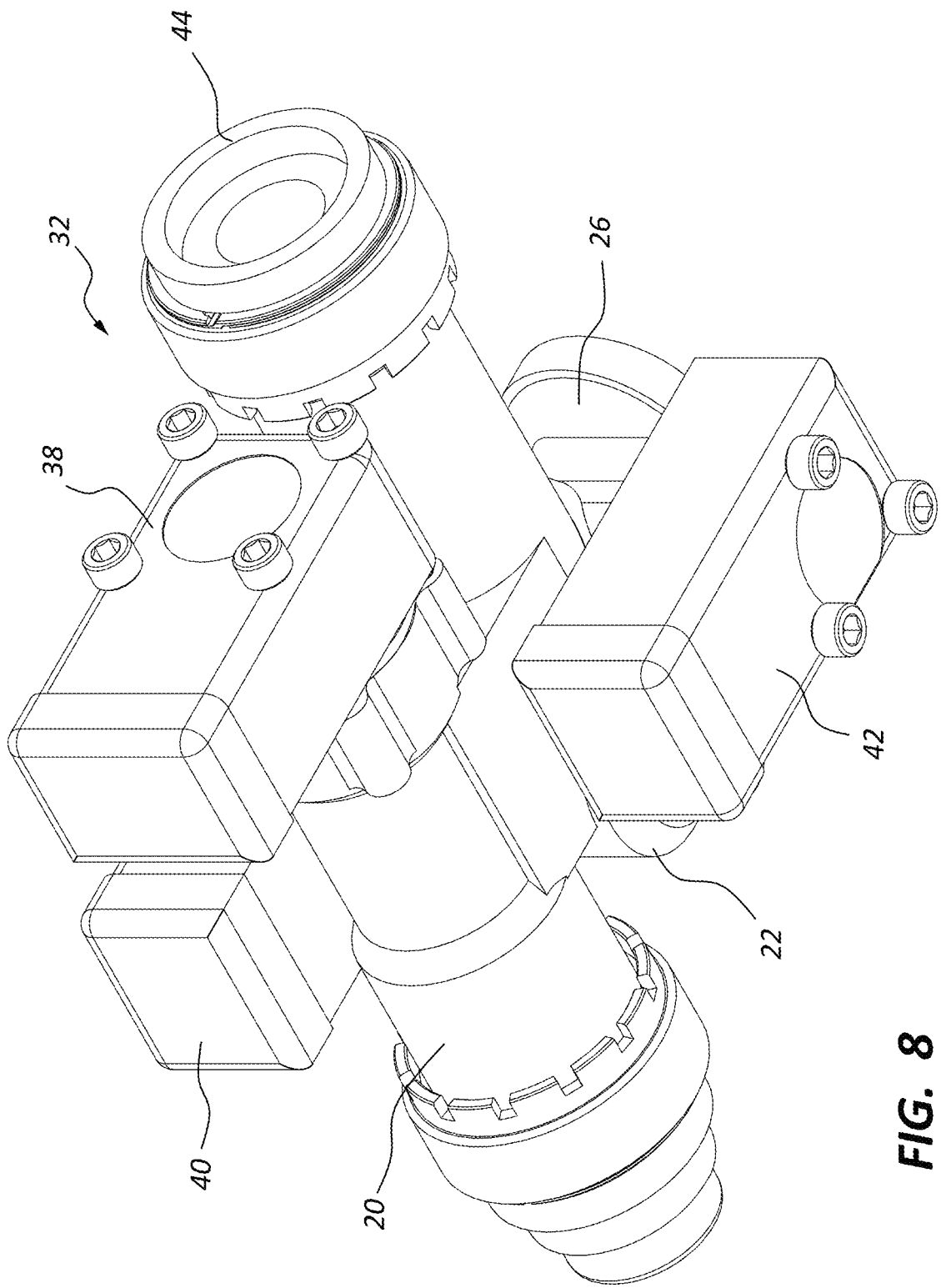
Figure 9:
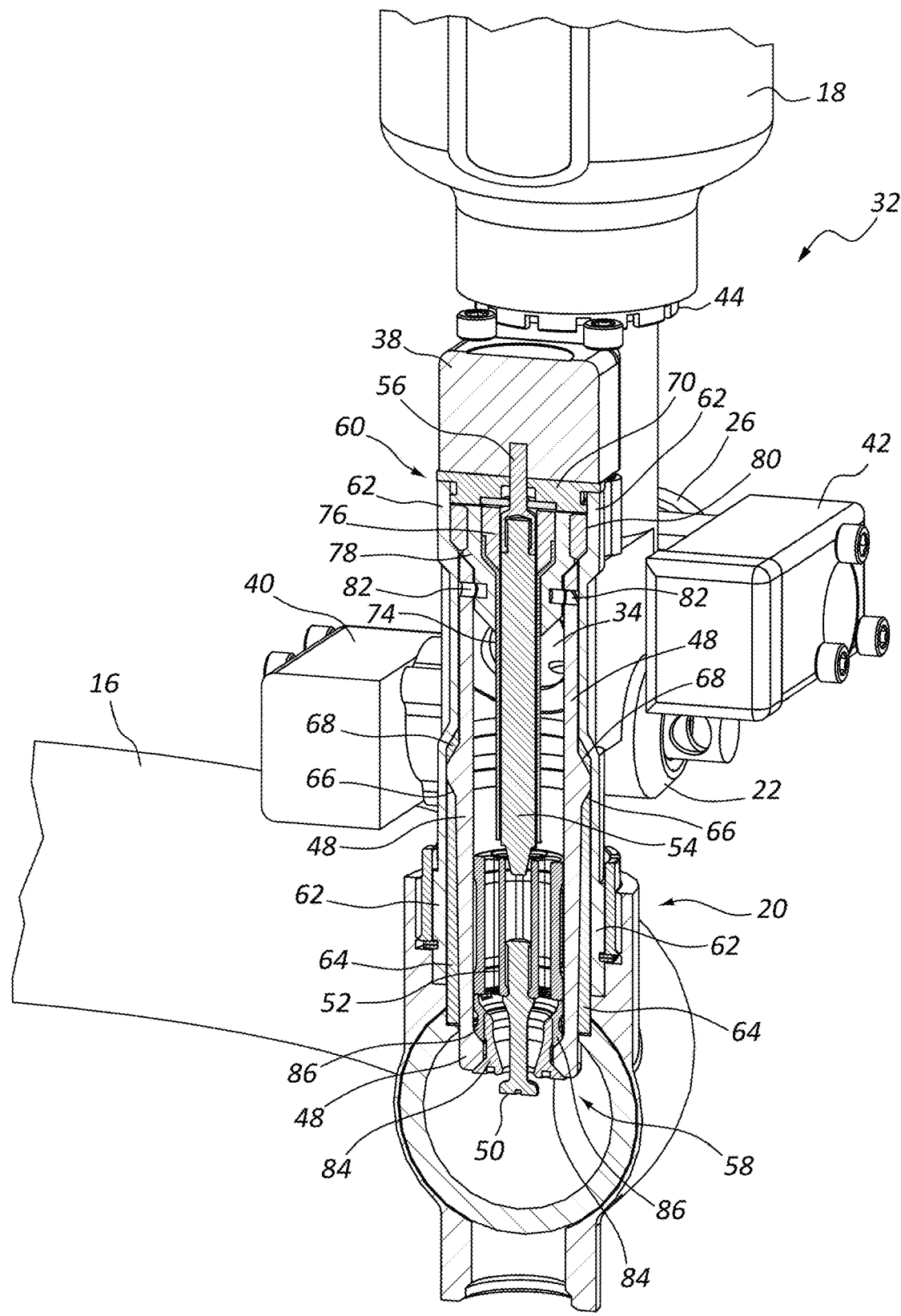
FIG. 9 is a cross sectional view of the attitude control system showing the inside of the accumulator and the accumulator valve.
Figure 10:
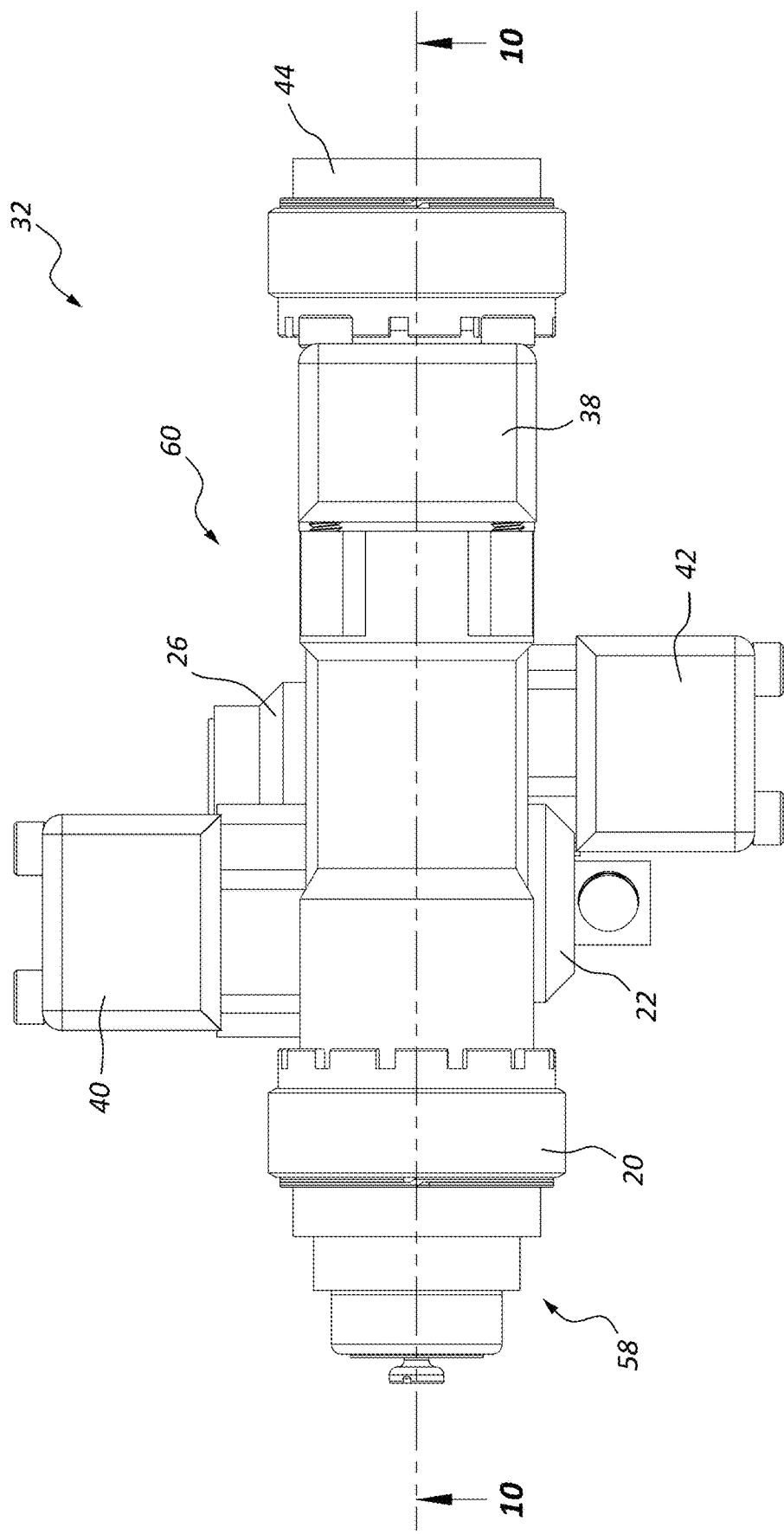
FIG. 10 is a side view of the housing assembly in FIGS. 5-8 from the side of the accumulator valve.
Figure 11:
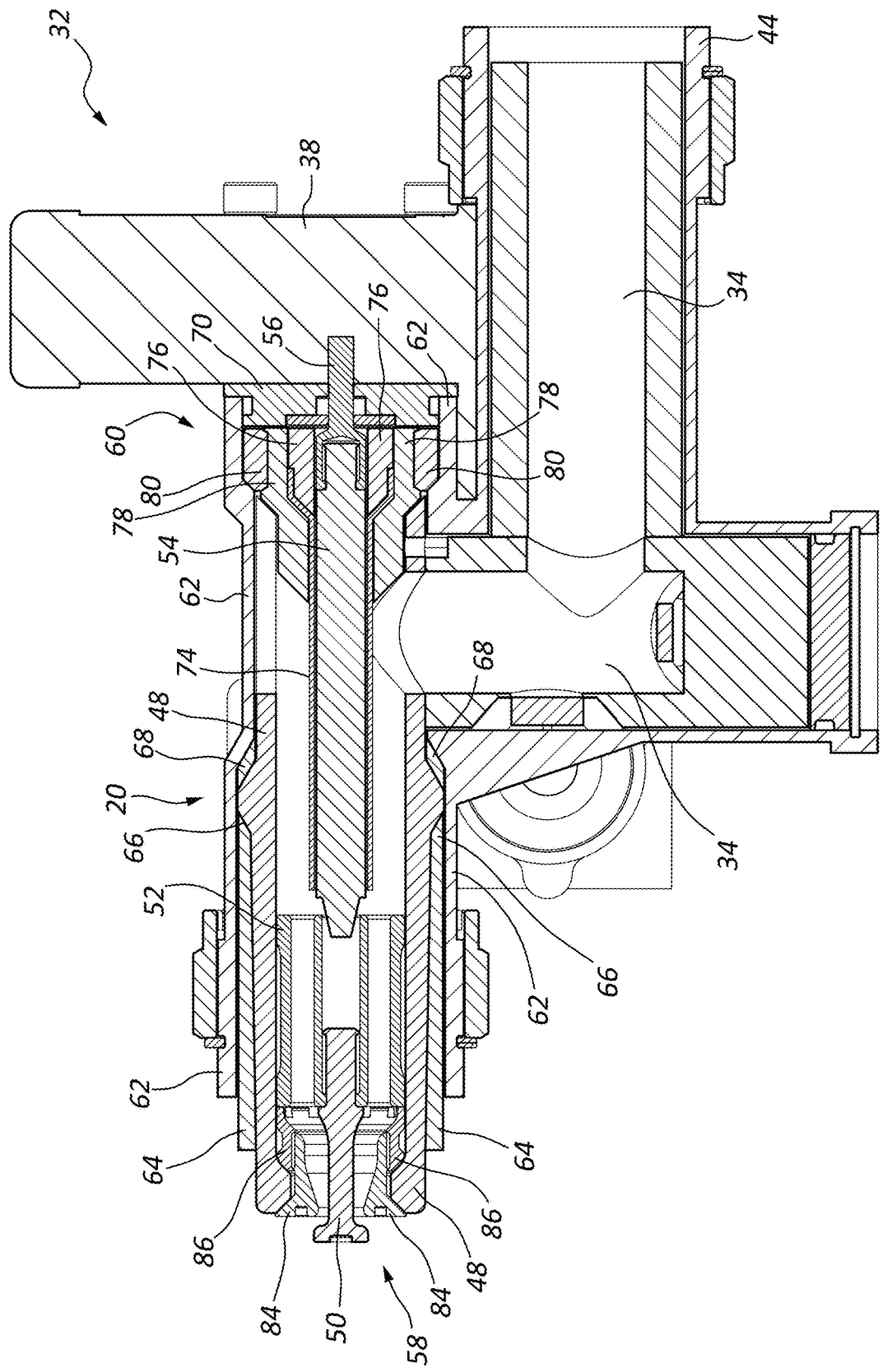
FIG. 11 is a cross sectional view of the housing assembly in FIG. 10 along line 10-10.
Figure 12:
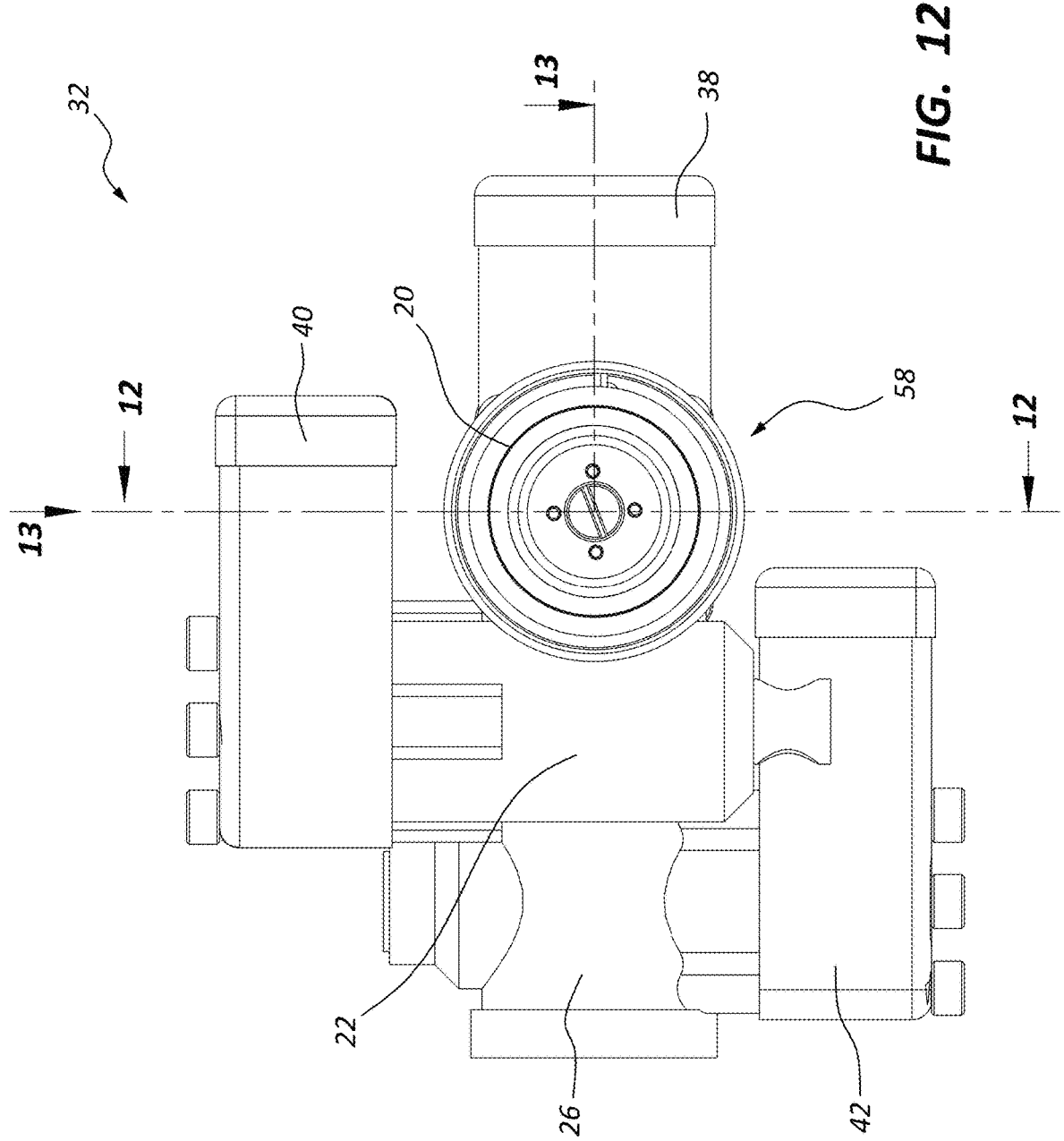
FIG. 12 is an aft of the housing assembly in FIGS. 5-8.
Figure 13:
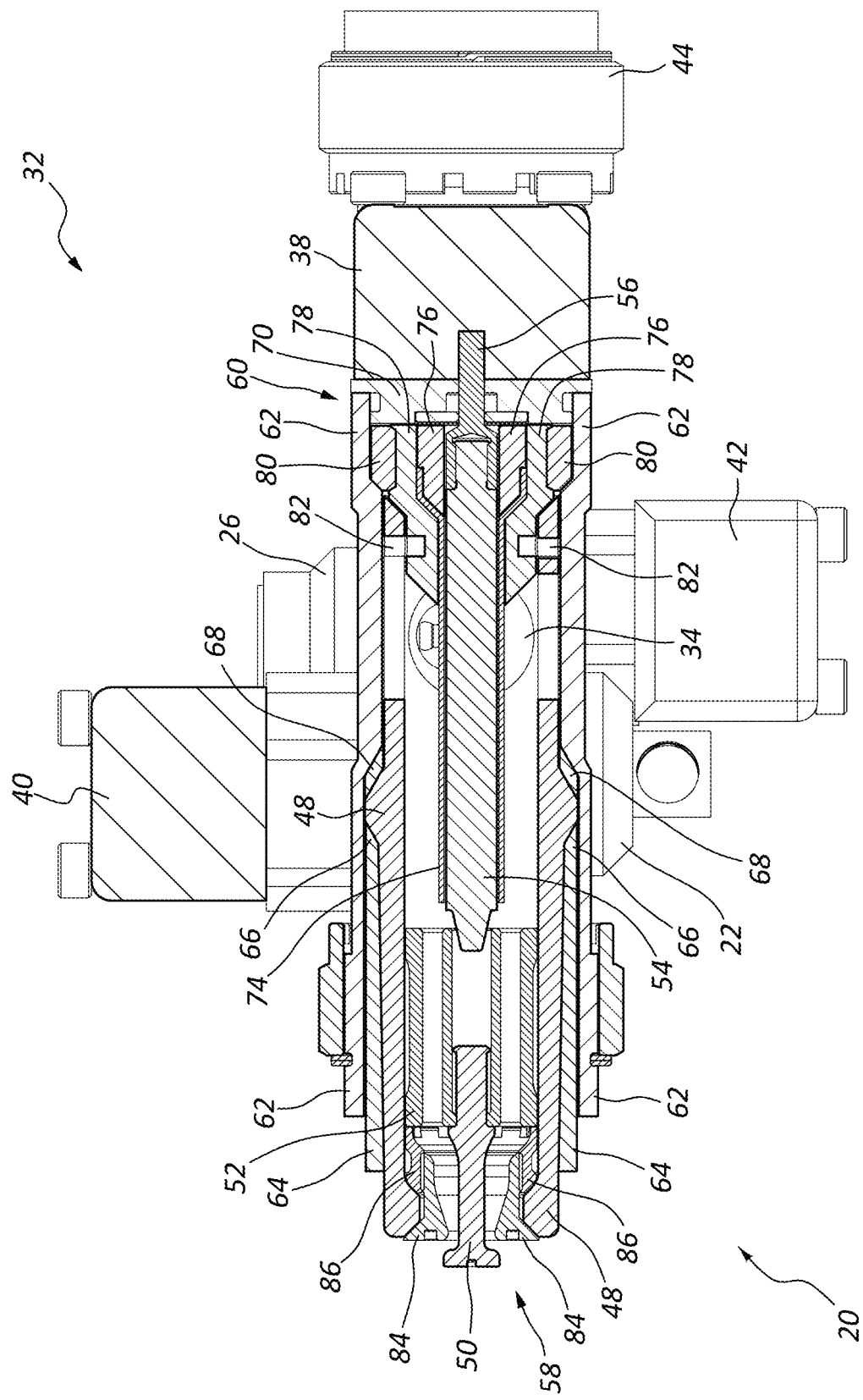
FIG. 13 is a cross sectional view of the housing assembly in FIG. 12 along line 12-12.
Figure 14:
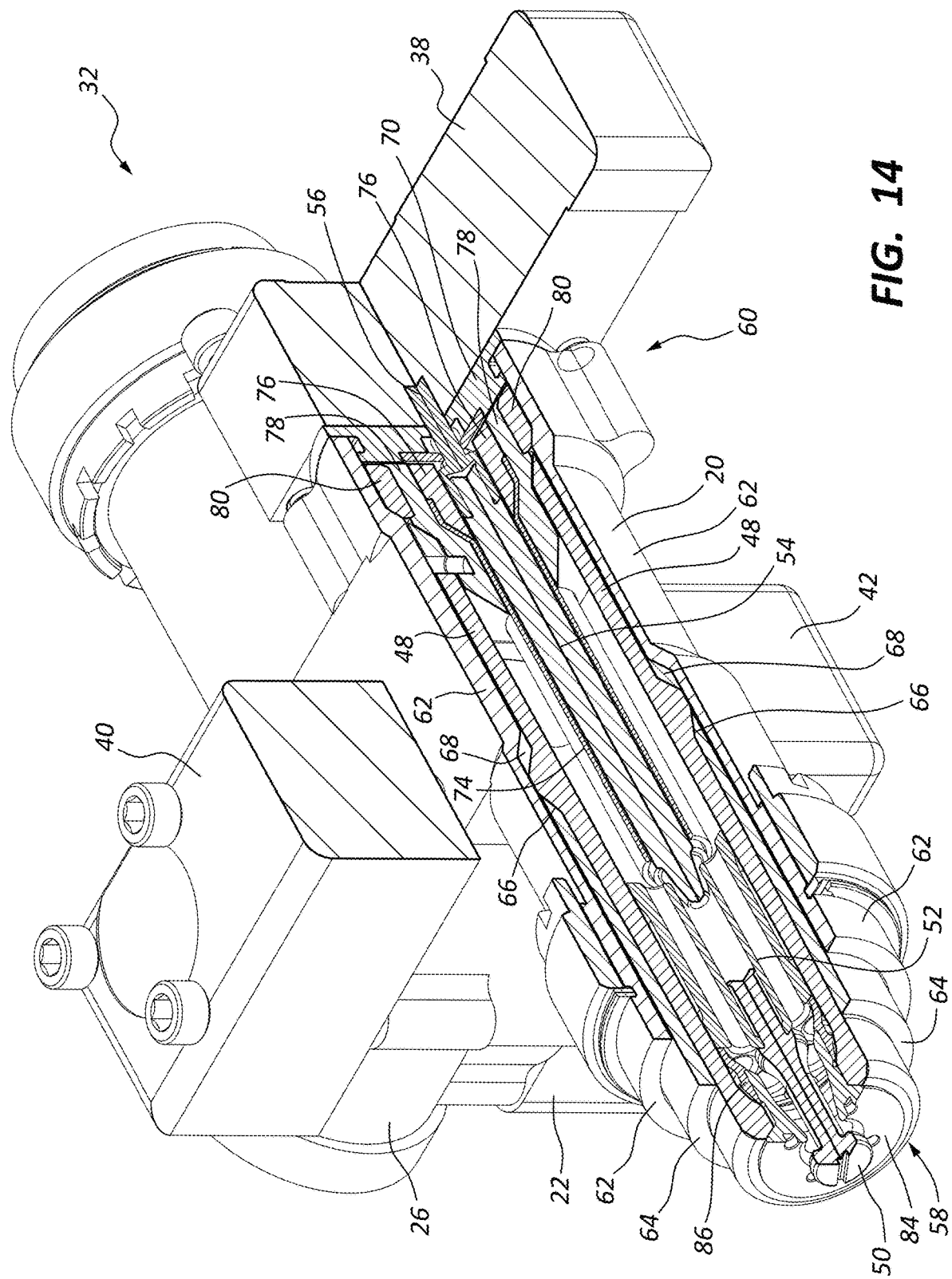
FIG. 14 is a cross sectional perspective view of the housing assembly in FIG. 12 along perpendicular lines 13-13.

FIG. 4 shows the attitude control system 12 in FIG. 3 separately from the divert system 14. Each housing assembly 32 includes an accumulator valve 20, a vent valve 22, a divert valve 26, and one or more passages 34 pneumatically linking the gas generator 18 and the valves 20, 22, 26. The passages 34 (FIGS. 9, 11, 13, and 16-14) allow hot gas to flow from the gas generator 18 to the valves 20, 22, 26. In this manner, the gas generator 18 and the valves 20, 22, 26 are pneumatically linked to each other. Perspective views of the housing assembly 32 are shown in FIGS. 5-8.

The accumulator valve 20 controls the flow of hot gas between the gas generator 18 and the accumulator 16. The vent valve 22 is used to cause a rapid depressurization of the gas generator 18 to extinguish the propellant burning inside. The divert valve 26 is used to selectively allow hot gas to flow into the divert system 14 and ignite the propellant for divert maneuvers. The valves 20, 22, 26 are operated with actuators 38, 40, 42, respectively.

In general, it is desirable to provide a single accumulator 16 even though the attitude control system 12 can include more than one of the other components. The reason a single accumulator 16 is advantageous is because it equalizes the pressure of the hot gas supplied to the attitude thrusters 24. If two accumulators 16 were used, then it increases the likelihood of a pressure differential between the accumulators 16, which could increase the variability of the thrust provided to individual attitude thrusters 24.

Despite the advantages of a single accumulator 16, it should be appreciated that other implementations can include multiple accumulators 16. For example, multiple accumulators 16 can be used if each accumulator is coupled to an independent set of thrusters that aren't designed to function together in a concerted manner.

In some implementations, the attitude control system 12 is positioned symmetrically along a lengthwise axis 36 of the flight vehicle 11 or of the DACS 10. In the implementation shown in FIG. 3, the lengthwise axis 36 extends through the center of the toroidal shape of the accumulator 16 and through the center of the divert system 14. A symmetrical design is advantageous because it evenly distributes the weight of the attitude control system 12, which helps stabilize the flight vehicle during flight.

In some implementations, the weight of the attitude control system 12 remains symmetrical throughout operation. The weight of the attitude control system 12 changes as propellant is burned in the gas generators 18. In the implementation shown in FIG. 3, the propellant is distributed equally in the gas generators 18 so that as it burns, the center of gravity of the attitude control system 12 shifts forward along the lengthwise axis 36 but doesn't shift side to side.

It should be appreciated that the attitude control system 12 can have any suitable shape and/or configuration. For example, the accumulator 16 can have a cylindrical, hexagonal, or other shape. Also, the attitude control system 12 can include a single housing assembly 32 with a single gas generator 18, accumulator valve 20, vent valve 22, and divert valve 26. In other implementations, the attitude control system 12 can include three or more housing assemblies 32 with a corresponding number of gas generators 18 and valves 20, 22, 26.

In some implementations, the attitude control system 12 can withstand the same pressures and operate for the same amount of time as the DACS 10. In general, it should be appreciated that any individual parameter disclosed in connection with the DACS 10 also applies to the attitude control system 12. For example, if the DACS 10 can withstand a given pressure or temperature, then the attitude control system 12 can withstand the same pressure or temperature. Also, the operational times of the DACS 10 apply equally to the attitude control system 12.

In some implementations, the attitude control system 12 is a stand-alone unit that can be used with any suitable divert system 14. The divert valve 26 can be considered part of the attitude control system 12 in these implementations or the divert valve 26 can be eliminated. In those situations where the divert valve 26 is included, it can be coupled to the divert system 14 to pneumatically link the two systems 12, 14. The stand-alone nature of the attitude control system 12 makes it flexible and easy to adapt to various divert systems 14 and flight vehicles.

The attitude control system 12 can operate in a variety of different ways. In some implementations, the attitude control system 12 operates as follows. An initial charge of propellant or, in other words, a start grain of propellant is positioned in the accumulator 16. The accumulator valve 20 is closed to isolate the accumulator 16 from the other components in the attitude control system.

The initial charge is ignited to activate the attitude control system 12 and pressurize the accumulator 16. The amount of propellant in the initial charge is sufficient to pressurize the accumulator 16 above an initial set point or initial threshold. The initial set point can be any suitable minimal pressure level. In one implementation, the initial charge pressurizes the accumulator 16 to at least 300 psia, at least 400 psia, at least 500 psia, or at least 600 psia.

Once the pressure in the accumulator 16 reaches the initial set point, the accumulator valve 20 is opened to allow the hot gas to flow through the passages 34 in the housing assembly 32 to the gas generator 18. The hot gas ignites the propellant in the gas generator 18, which causes the pressure to continue to rise in the housing assembly 32 and the accumulator 16 until it reaches an upper threshold or first set point. It should be noted that the vent valve 22 and the divert valve 26 are closed up to this point.

The maximum pressure can be set at any suitable amount. In one implementation, the maximum pressure is no more than 4,000 psia, no more than 3,500 psia, no more than 3,000 psia, no more than 2,500 psia, or no more than 2,000 psia. When the pressure in the accumulator 16 reaches the upper threshold, the accumulator valve 20 is closed to keep the pressurized hot gas in the accumulator 16. At the same time, the vent valve 22 is opened to rapidly depressurize the gas generator 18 and extinguish the propellant. The vent valve 22 remains open until the accumulator 16 is recharged to ensure that the propellant is fully extinguished.

In order to extinguish the propellant, the pressure in the gas generator 18 should drop rapidly to ambient levels (in space this is 0 psia). In some implementations, the pressure drops to ambient levels within no more than 1 second, no more than 750 ms, no more than 500 ms, or no more than 250 ms.

The accumulator 16 is now in a fully charged or fully pressurized condition. The hot gas in the accumulator 16 is released through the attitude thrusters 24 as attitude adjustments are made to the flight vehicle. The accumulator 16 is recharged when a lower threshold or second set point is reached. The second set point can be a minimum pressure in the accumulator 16, a set amount of time since the last recharge, or both. In one implementation, the accumulator 16 is recharged when either the pressure falls below a lower threshold or a set amount of time has passed since the last recharge.

In some implementations, the accumulator 16 is recharged when the pressure drops below 1,000 psia, below 750 psia, or below 500 psia. In other implementations, the accumulator is recharged after 2 seconds, 3 seconds, 5 seconds, 10 seconds, 20 seconds, 30 seconds, 40 seconds, or 45 seconds.

In some implementations, the accumulator 16 can be recharged more often at the beginning of the process to heat up the system hardware to operating temperature. In other words, the set amount of time between recharges can be lower initially and then increased as the system 12 heats up. The hardware absorbs heat from the hot gas. If it absorbs too much heat, then the hot gas may not successfully ignite the propellant in the gas generator 18.

The accumulator 16 is recharged by closing the vent valve 22 and opening the accumulator valve 20. Hot gas from the accumulator 16 flows to the gas generator 18 and ignites the propellant. The process of pressurizing the accumulator 16 described above is repeated.

It should be appreciated that the accumulator 16 can be recharged many times during the operational life of the attitude control system 12. In some implementations, the accumulator 16 is recharged at least 20 times, or at least 25 times. Repeatedly igniting and extinguishing the propellant in the gas generator 18 helps to extend the operation time of the attitude control system 12.

The configuration of the attitude control system 12 provides a number of advantages. One advantage is that the attitude control system 12 only needs a single igniter for its entire operational life. Once the accumulator 16 is initially pressurized, the hot gas contained in it can be used for all subsequent propellant ignitions in either or both of the attitude control system 12 and the divert system 14. This is in contrast to conventional solid propellant systems, which require a separate igniter each time the propellant is reignited.

Another advantage is that the attitude control system 12 complies with MIL-STD-1901A, which is the safety criteria for the design of munition rocket and missile motor ignition systems. One of the reasons the design of the attitude control system 12 is compliant is because the igniter and initial charge of propellant are separated from the propellant in the gas generator 18 and the propellant in the divert system 14. This means that during storage and handling the attitude control system 12 can be configured so that if the initial charge accidentally ignites it won't ignite the other propellant.

In one implementation, the attitude control system 12 can be stored with the accumulator valve 20 and the vent valve 22 open. In this state, the hot gas produced by an accidental ignition of the initial charge is immediately vented through the vent valve 22. The hot gas cannot produce enough pressure to ignite the propellant in either the gas generator 18 or the divert system 14.

In another implementation, the attitude control system 12 can be stored with the accumulator valve 20 closed and the attitude thrusters 24 open. In this implementation, the hot gas produced by an accidental ignition of the initial charge is immediately vented through the attitude thrusters 24. In yet another implementation, the attitude control system 12 can be stored with the accumulator valve 20, the vent valve 22, and the attitude thrusters 24 open. Numerous other configurations are also possible.

Low Level Attitude Control System (LLACS)

In one implementation, the attitude control system 12 is a low level attitude control system designed specifically for use with the SM-3 interceptor missile. For example, the attitude control system 12 can be used to adjust the attitude of the kill vehicle during the final stage of flight just before it impacts the target.

In one implementation, the KV includes a seeker system having various sensors, transmitters, and/or receivers that allow it to send and receive information. For example, the sensors can be used to obtain information about the target from heat signatures, light emissions, radio wave emissions, and the like. In some implementations, the sensors can be used to find and track the heat signature of the target. The attitude control system 12 can be used to adjust the attitude of the KV to point the sensor directly at the target. The attitude control system 12 can be used in numerous other ways as well.

In some implementations, the attitude control system 12 can be a small compact system that is limited in the amount of total impulse it can provide. For example, it can be configured to provide no more than 800 lbf·s of impulse, no more than 600 lbf·s of impulse, no more than 400 lbf·s of total impulse, or no more than 300 lbf·s of total impulse.

In some implementations, the low level attitude control system satisfies one or more of the specifications in Table 2 and/or Table 3. A low level attitude control system meeting these requirements may be especially suitable for use with the SM-3's KV.

TABLE 2

Low Level Attitude Control System Specifications 1

| Parameter | Value |
| --- | --- |
| Min. pressure | 500 psia |
| Nominal max. pressure | 3,000 psia |
| Recharge cycles | ≥28 |
| Max. expected operating pressure (MEOP) | 3,500 psia |
| Structural factors of safety at MEOP | $FS_{ULT} = 1.25$; $FS_{YLD} = 1.10$; $FX_{PRF} = 1.0$ |
| Configuration/layout | Common accumulator; dual gas generators and housing assemblies |
| Delivered total low level impulse | ≥200 lbf · s (≥100 lbf · s per accumulator valve) |
| Thruster(s) inlet temperature | ≤2000° F. |
| SDACS ignition capability | Pressurize 200 in³ volume to ≥500 psia in ≤0.5 s |
| System weight | ≤10 lbm |
| Propellant type | Extinguishable |
| Ignition system safety | MIL-STD-1901A compliant |

TABLE 3

Low Level Attitude Control System Specifications 2

| Parameter | Value |
| --- | --- |
| Operation time | Launch to Initiation: ≤240 s<br>Upon initiation command: ≥1000 s |
| ACS minimum angular velocity | ACS shall be capable of rotating the KV 2.0 degrees and provide stabilization within 0.5 s in pitch, yaw, and roll directions |
| ACS pointing accuracy | ACS shall be capable of stabilizing the KV within 0.02 degrees of the commanded value |
| ACS coning motion | Unknown; see total ACS impulse requirement as point of departure |
| ACS coning angular velocity | Unknown; see total ACS impulse requirement as point of departure |
| Total ACS impulse | ACS impulse shall be ≥80 lbf · s |

TABLE 3-continued

Low Level Attitude Control System Specifications 2

| Parameter | Value |
| --- | --- |
| ACS minimum impulse bit | <0.045 lbf · s during divert pulses<br><0.00044 lbf · s during low-level operation |
| ACS control authority | ACS control authority shall be no less than 1.5 for the entire operation |
| ACS duty cycle | ACS shall fire as needed during operation time |
| ACS pulse operation time | Each pulse shall range from 0.005 s to continuous |
| Response time (from ignition command) | Response time from 0 to 90% thrust command from an ignition command shall be ≤2.0 s |
| Response time (when already ignited) | Response time from 0 to 90% thrust command from a thrust command shall be:<br>Less than 4 ms during divert pulses<br>Less than 3 ms during low level operation |

Each of the components of the attitude control system 12 are described in greater detail as follows. The components can be off-the-shelf parts or custom manufactured for a specific application. The components that are subject to the most extreme conditions are more likely to be custom manufactured.

Accumulator

The accumulator 16 can have any suitable configuration. In general, the accumulator 16 is in the form of an enclosure that is capable of holding the hot gas generated by burning the solid propellant. The accumulator 16 can have a variety of shapes including those described above. The accumulator 16 can also have any number and variety of interface ports.

The accumulator 16 can have any suitable amount of internal free volume. A larger amount of free volume means that the accumulator 16 does not need to be recharged as often. However, it also means that the accumulator 16 weighs more. Thus, there is a trade-off between internal free volume and weight. In one implementation, the accumulator 16 includes at least 20 in³ of internal free volume, at least 25 in³ of internal free volume, at least 30 in³ of internal free volume, at least 35 in³ of internal free volume, at least 40 in³ of internal free volume, at least 45 in³ of internal free volume, or at least 50 in³ of internal free volume.

The accumulator 16 can be made of any suitable material that is capable of withstanding the high temperatures and high pressures produced by the hot gas. In some implementations, the accumulator 16 is made of stainless steel or a stainless steel alloy. For example, the accumulator 16 can be made of 17-4 H1150 stainless steel alloy. In other implementations, the accumulator 16 can be made of titanium.

In some implementations, the accumulator 16 satisfies one or more of the specifications set forth below in Table 4. This design of the accumulator 16 may be especially suitable for use with a low level attitude control system.

TABLE 4

Accumulator Specifications

| Parameter | Value |
| --- | --- |
| Internal free volume | ≥50 in3 |
| Configuration | Toroidal |
| Interface ports | 2x valve ports; 2x igniters; 2x thruster outlets, 1x pressure transducer |
| Operating pressure/MEOP | 500 to 3,000 psia/3,500 psia |
| Factors of safety at MEOP | $FS_{ULT} = 1.25$; $FS_{YLD} = 1.10$; $FX_{PRF} = 1.0$ |

Gas Generator

The gas generator 18 is coupled to a forward or first end 44 of the housing assembly 32. In general, the gas generator 18 is a container configured to hold the propellant during storage and operation of the attitude control system 12. It should be appreciated that the gas generator 18 can have any suitable size and shape.

In some implementations, the gas generator 18 is a cylindrical canister. One end of the canister is coupled to the forward end 44 of the housing assembly 32. In other implementations, the gas generator 18 can have a spherical, hexagonal, or other shape. The gas generator 18 can be made of any suitable material. In general, the gas generator 18 should be capable of withstanding the temperatures and pressures associated with combustion of the propellant. In some implementations, the gas generator 18 can be made of the same material as the accumulator 16.

The gas generator 18 can include any type of propellant. In one implementation, the propellant is solid propellant. In another implementation, the propellant is extinguishable. In yet another implementation, the propellant is an extinguishable, solid propellant. The propellant can be purchased commercially as an off-the-shelf product or custom designed for use with the gas generator 18.

In some implementations, the gas generator 18 satisfies one or more of the specifications set forth below in Table 5. This design of the gas generator 18 may be especially suitable for use with a low level attitude control system.

TABLE 5

Gas Generator Specifications

| Parameter | Value |
| --- | --- |
| Max. propellant grain diameter | 2.6 inches |
| Internal free volume | ≥2 in$^3$ (includes plumbing) |
| Propellant type | Extinguishable |
| Operating pressure/ MEOP | 500 to 3,000 psia/3,500 psia |
| Factors of safety at MEOP | $FS_{ULT}$ = 1.25; $FS_{YLD}$ = 1.10; $FX_{PRF}$ = 1.0 |

Accumulator Valve

The accumulator valve 20 moves between an open position where hot gas can flow into and out of the accumulator 16 and a closed position where hot gas is prevented from flowing into and out of the accumulator 16. The accumulator valve 20 is shown in the open position in FIGS. 9, 11, and 13-14.

The accumulator valve 20 is subject to some of the harshest conditions in the attitude control system 12. It is one of the few components that is subjected to high temperatures and high pressures for the entire duration of the operation of the attitude control system 12. Most of the other components have an opportunity to cool off at one point or another. The high temperatures and high pressures place a tremendous amount of stress and strain on the accumulator valve 20.

It should be appreciated that in some implementations, the accumulator valve 20 can be an off-the-shelf valve or can be adapted from an off-the-shelf valve. For example, an off-the-shelf valve may be suitable for situations having relatively lower temperatures and pressures and when the attitude control system 12 isn't a mission critical component. In other implementations, the accumulator valve 20 can be custom designed for the specific application.

The accumulator valve 20 seals the accumulator 16 shut between recharge cycles. The accumulator valve 20 should not leak more than a minor or insubstantial amount. If the accumulator valve 20 leaks more than this, then the accumulator 16 will need to be recharged more often and the gas generator 18 will need to be enlarged to hold more propellant, both of which are undesirable.

FIGS. 9-14 show various cross-sectional views of the accumulator valve 20. The accumulator valve 20 also includes a poppet 50, a poppet guide 52, a valve shaft 54, and a valve shaft adapter 56. These components move lengthwise (axially) inside the accumulator valve 20 to open and close it.

The accumulator valve 20 includes a first or proximal end 58 and a second or distal end 60. The accumulator valve 20 includes an actuator seal plate 70 positioned at the second end 60. The actuator 38 is coupled to the actuator seal plate 70. The actuator seal plate 70 prevents the hot gas from escaping through the second end 60 of the accumulator valve 20.

The actuator 38 engages the valve shaft adapter 56 at the second end 60 of the accumulator valve 20. The actuator 38 opens the accumulator valve 20 by pushing the valve shaft 54 lengthwise towards the first end 58. The valve shaft 54 contacts and pushes the poppet guide 52 lengthwise, which, in turn, pushes the poppet 50 open. In one implementation, the poppet 50 is coupled to and moves in tandem with the poppet guide 52.

In some implementations, the only way to close the accumulator valve 20 is with the force of the pressure in the accumulator 16. The actuator 38 only opens the accumulator valve 20; it doesn't close it. After the initial charge has pressurized the accumulator 16, the actuator 38 opens the accumulator valve 20 to allow hot gas to flow to the gas generator 18. In this state, the pressure is higher in the accumulator 16 and lower in the gas generator 18 creating a pressure gradient from the former to the latter. The actuator 38 holds the accumulator valve 20 open as the hot gas flows from the accumulator 16 to the gas generator 18.

When the propellant ignites, the pressure gradient reverses so that the pressure is higher in the gas generator 18 and lower in the accumulator 16 causing the hot gas to flow in the opposite direction. The actuator 38 no longer holds the accumulator valve 20 open. Instead, the flow of hot gas holds it open. When the accumulator 16 is fully recharged, the vent valve 22 opens causing the pressure gradient to reverse again. Hot gas flows from accumulator 16 to the vent valve 22. The actuator 38 moves the valve shaft 54 lengthwise back towards the second end 60 of the accumulator valve 20 and the flow of hot gas pushes the poppet 50 closed.

In one implementation, the valve shaft 54 only contacts the poppet guide 52 when the accumulator valve 20 is open. When it is closed, the valve shaft 54 is retracted towards the second end 60 of the accumulator valve 20 far enough that it no longer contacts the poppet guide 52. This provides a thermal break between the valve shaft and the poppet guide 52, which reduces the heat load on the actuator 38 thereby extending its useful life.

It should be appreciated that the poppet 50, poppet guide 52, valve shaft 54, and valve shaft adapter 56 can be made of any suitable material. All of these components are subjected to high temperatures, especially the first three, and should be made of materials that are capable of withstanding the temperatures. In some implementations, the poppet 50 can be made of rhenium molybdenum and the poppet guide 52 and the valve shaft 54 can be made of a ceramic matrix composite.

In some implementations, the accumulator valve 20 includes a shield or shaft shield 74 that surrounds the valve shaft 54. The shield 74 can be made of any suitable high temperature resistant material such as rhenium molybdenum.

The accumulator valve 20 includes a main body 48 through which the hot gas flows. The main body 48 is positioned in a valve housing 62. A layer of main body insulation 64 is provided between the valve housing 62 and main body 48 near the first end 58 of the accumulator valve 20, which is the area that gets the hottest. The main body insulation 64 prevents heat transfer from the main body 48 to the valve housing 62. In one implementation, the accumulator valve 20 is designed to prevent the valve housing 62 from exceeding a temperature of 1,000° F.

In one implementation, the area 66 where the distal end of the main body insulation 64 and the main body 48 meet is tapered to reduce the stress produced when the main body insulation 64 expands due to the heat. Another insulating component or insulating washer 68 is provided just slightly distal of the area 66 to reduce the heat transfer and seal the interface between the main body 48 and the valve housing 62 at this location.

It should be appreciated that the main body 48, valve housing 62, main body insulation 64, and insulating component 68 can be made of any suitable materials. In some implementations, the main body 48 is made of the same ceramic matrix composite material as the poppet guide 52 and valve shaft 54. The valve housing 62 can be made of a light, durable metal such as titanium.

The insulation 64 can be any suitable material that significantly inhibits heat transfer from the main body 48 to the valve housing 62. In one implementation, the insulation 64 is ethylene propylene diene monomer (M-class) rubber (EPDM). The insulating component 68 can also be made of any suitable material that significantly inhibits heat transfer from the main body 48 to the valve housing 62. In one implementation, the insulating component 68 can be made of silica-phenolic material.

As already mentioned, in some implementations, the main body 48, the poppet guide 52, and the valve shaft 54 are made of a ceramic matrix composite material. Any suitable ceramic matrix composite materials can be used. In one implementation, the main body 48, the poppet guide 52, and the valve shaft 54 are made of carbon zirconium oxide carbide (C—ZrOC) and/or carbon silicon carbide (C—SiC).

Figure 15B:
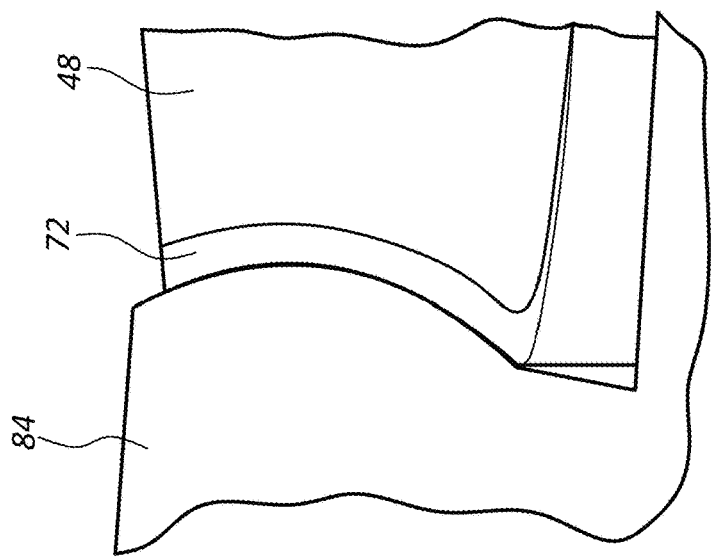
FIGS. 15A-15B are perspective views of one implementation of a throat area of the accumulator valve.
Figure 15A:
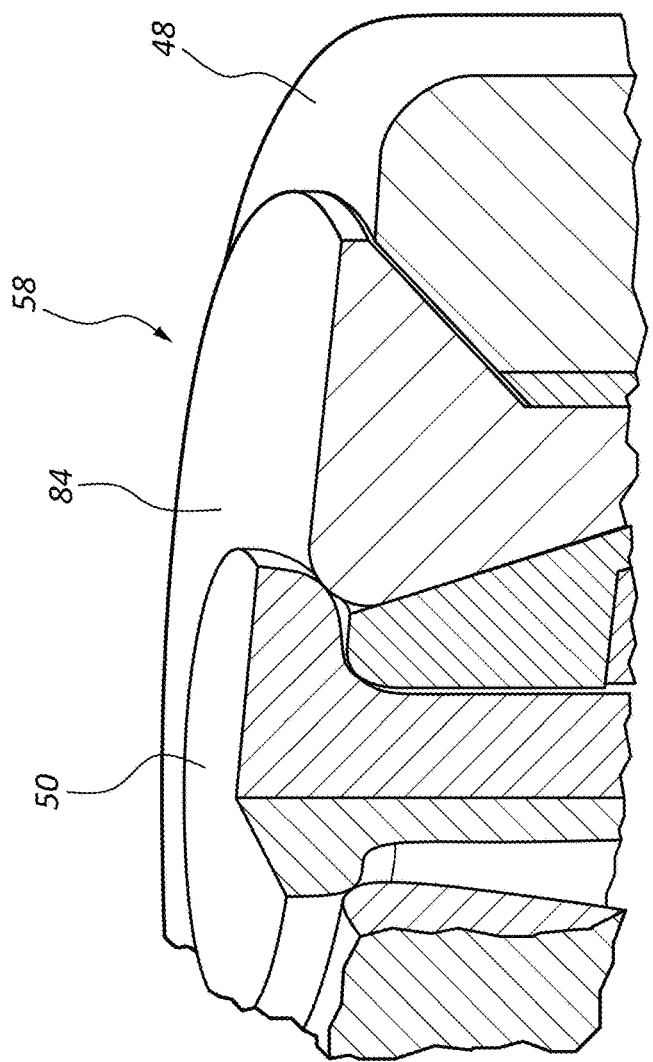

Ceramic matrix composites are inherently porous. Those components that are under pressure, such as the main body 48, may leak hot gas through the ceramic matrix composite. In some implementations, the ceramic matrix composites can be coated with a seal coating 72 (FIG. 15). For example, the main body 48 can be coated on the inside and outside surface with a seal coating 72. Any suitable material can be used for the seal coating. In one implementation, the seal coating is a thin coating of silicon carbide (SiC).

Ceramic matrix composite materials are excellent structural insulators. They exhibit structural strength over extreme temperatures while also providing great insulator properties. They also dimensionally stable over a wide temperature range. The ceramic matrix materials with the best properties for use in the accumulator valve 20 are C—ZrOC and C—SiC.

Ceramic matrix composites are a subgroup of composite materials as well as a subgroup of technical ceramics. They are made of ceramic fibers embedded in a ceramic matrix, thus forming a ceramic fiber reinforced ceramic material. The matrix and fibers can consist of any ceramic material, whereby carbon and carbon fibers can also be considered a ceramic material. In general, the names of ceramic matrix composites include a combination of the type of fiber/type of matrix. For example, C—C stands for carbon fiber reinforced carbon (carbon/carbon), or C—SiC for carbon fiber reinforced silicon carbide.

Ceramic matrix composites are typically manufactured using the following three step process. The first step is to lay-up and fixate the fibers shaped as the desired component. The second step is to infiltrate the fibers with the matrix material. The third step is machining the component and, if required, further treatments like coating or impregnation of the intrinsic porosity.

The first and the last step are almost the same for all ceramic matrix composites: In step one, the fibers, often called rovings, are arranged and fixed using techniques used in fiber reinforced plastic materials, such as lay-up of fabrics, curtain needled, filament winding, braiding, and knotting. The result of this procedure is called fiber preform or simply preform.

For the second step, five different procedures can be used alone or in combination with each other to fill the ceramic matrix in between the fibers of the preform: (1) deposition out of a gas mixture, (2) pyrolysis of a pre-ceramic polymer, (3) chemical reaction of elements, (4) sintering at a relatively low temperature in the range 1000-1200° C., and/or (5) electrophoretic deposition of a ceramic powder. Procedures one, two and three find applications with non-oxide ceramic matrix composites, whereas the fourth is used for oxide ceramic matrix composites. It should be appreciated that all of these procedures have sub-variations, which differ in technical details.

The third and final step of machining—e.g., grinding, drilling, lapping or milling—is typically done with diamond tools. Ceramic matrix composites can also be processed with a water jet, laser, or ultrasonic machining.

In some implementations, the main body 48, the poppet guide 52, and the valve shaft 54 are made using a braided preform. The braided preform provides greater strength per mass versus other preforms such as curtain needled preforms. For example, the wall thickness of the main body 48 can be reduced by half or more while still maintaining the same pressure rating when a braided preform is used versus a curtain needled preform.

The braided structure provides greater strength because the fibers can be oriented in the desired manner with minimal cutting. In contrast, the fibers in a curtain needled preform are cut in a Cartesian orientation to fabricate a circular component. Cutting the fibers in this manner reduces the strength and pressure rating of the resulting ceramic matrix composite. In some implementations, the main body 48, the poppet guide 52, and the valve shaft 54 can be made of C—ZrOC or C—SiC ceramic matrix composites manufactured using a braided preform.

Referring back to FIG. 9, the accumulator valve 20 can be coupled to the accumulator 16 in such a manner that part of the accumulator valve 20 extends into the accumulator 16. This configuration is advantageous because it reduces the overall weight and profile of the attitude control system 12.

In some implementations, the main body 48 extends into the accumulator 16. When the accumulator 16 is recharged, the main body 48 is pressurized with hot gas. In this state, the main body 48 functions as a pressure vessel. When the accumulator 16 is full and the vent valve 22 is opened, the pressure inside the main body 48 drops to ambient. In this state, the portion of the main body 48 that extends into the accumulator 16 is under hoop compression by the pressurized gas in the accumulator 16.

In some implementations, the valve shaft 54 can be held in place at the second end 60 of the accumulator valve 20 by a first spacer 76, a second spacer 78, and a nut 80. The second spacer 78 is coupled to the main body 48 using radial pins 82. The nut 80 can be a castle nut that engages threads on the outside of the second spacer 78. As the nut 80 is tightened, it bears down on the valve housing 62 and pulls the second spacer 78 and main body 48 towards the second end 60 of the accumulator valve 20 thereby compressing the insulating component 68.

It should be appreciated that the spacers 76, 78 can be made of any suitable material. In one implementation, the spacers 76, 78 are made of an insulating material that inhibits heat transfer to the actuator 38. For example, the spacers 76, 78 can be made of a silica phenolic material and/or a carbo phenolic material.

The accumulator valve 20 includes a throat 84 and a throat retainer 86. The poppet 50 contacts the throat 84 to close the accumulator valve 20. The throat 84 is coupled to the main body 48 at the first end 58 of the accumulator valve 20. The main body 48 includes a narrow section in this area. The throat 84 and throat retainer 86 are positioned on opposite sides of the narrow section of the main body 48 with the throat 84 on the exterior side and the throat retainer 86 on the interior side. The throat retainer 86 is coupled to the throat 84 so that the narrow section of the main body 48 is sandwiched in between.

It should be appreciated that the throat 84 and the throat retainer 86 can be coupled together in any suitable manner. In one implementation, the throat 84 and the throat retainer 86 are coupled together using threads. The threads can be oriented in such a way that when the throat 84 and the throat retainer 86 are heated, the threads tighten and form a seal that prevents gas from escaping between the throat 84 and main body 48.

It should be appreciated that the throat 84 and the throat retainer 86 can be made of any suitable materials. In one implementation, the throat 84 and the throat retainer 86 can be made of a material that is capable of withstanding high operating temperatures and high velocity gas flows. For example, the throat 84 and the throat retainer 86 can be made of rhenium molybdenum and/or molybdenum.

Referring to FIG. 15, the interface between the throat 84 and the main body 48 is shown. This is one of the areas that can potentially leak if these surfaces do not form an adequate seal. One of the difficulties with this interface is that the throat 84 typically has a much higher modulus than the main body 48, which means the surface of the main body 48 will conform to the surface of the throat 84. In one implementation, a slight radius of curvature is provided on the backside of the throat 84 to form a corresponding curve on the main body 48. This configuration effectively seals the interface between these two components.

In some implementations, the accumulator valve 20 satisfies one or more of the specifications set forth below in Table 6. This design of the accumulator valve 20 may be especially suitable for use with a low level attitude control system.

TABLE 6

Accumulator Valve Specifications

| Parameter | Value |
| --- | --- |
| Contraction ratio | Min. 3:1 relative to propellant grain |
| Natural throat area | Scaled to >1.1x operational throat |

TABLE 6-continued

Accumulator Valve Specifications

| Parameter | Value |
| --- | --- |
| Permissible leak rate | TBD |
| Response time | ≥2 in/s to 90% full stroke |
| Max. total stroke | ≤0.300 in |
| Duty cycle | ≥28 close/open/close cycles; random operation over 300 s |

Vent Valve

Figure 16:
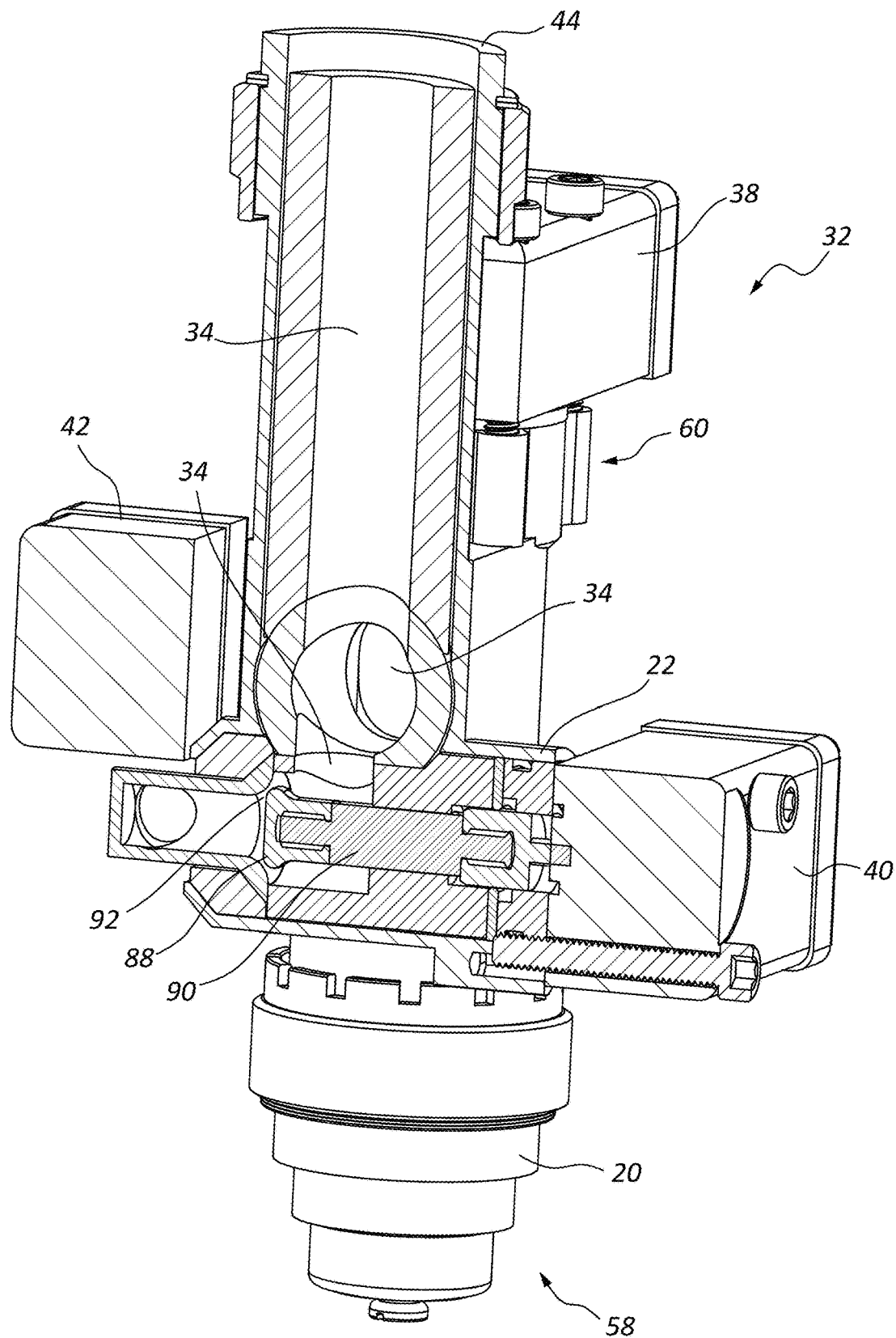
FIG. 16 is a cross sectional perspective view of the vent valve.

Referring to FIG. 16, one implementation of the vent valve 22 is shown. The vent valve 22 includes many of the same components as the accumulator valve 20. For example, the vent valve 22 includes a poppet 88, valve shaft 90, and throat 92. The vent valve 22 moves between an open position where the poppet 88 is spaced apart from throat 92 and a closed position where the poppet 88 is in contact with the throat 92. In one implementation, the actuator 40 moves the valve shaft 90 lengthwise to move the poppet 88 between the open and closed position.

It should be appreciated that the components in the vent valve 22 can be made of any suitable material including those already mentioned above in connection with the accumulator valve 20. For example, the poppet 88 and the throat 92 can be made of rhenium molybdenum and the valve shaft 90 can be made of Inconel 718 or a ceramic matrix composite.

The vent valve 22 can be an off-the-shelf component that is used as is or adapted for use with the attitude control system 12, or it can be a custom designed component. In some implementations, the vent valve 22 satisfies one or more of the specifications set forth below in Table 7. This design of the vent valve 22 may be especially suitable for use with a low level attitude control system.

TABLE 7

Vent Valve Specifications

| Parameter | Value |
| --- | --- |
| Contraction ratio | Min. 3:1 relative to propellant grain |
| Natural throat area | Scaled to ≥1.1x operational throat |
| Permissible leak rate | TBD |
| Response time | ≥2 in/s to 90% full stroke |
| Max. total stroke | ≤0.300 in |
| L* (at max free volume) | ≥200:1 |
| Pdot rate (at max free volume) | ≤10,000 psia/s |
| Duty cycle | ≥28 close/open/close cycles; random operation over 300 s |

Divert Valve

Figure 17:
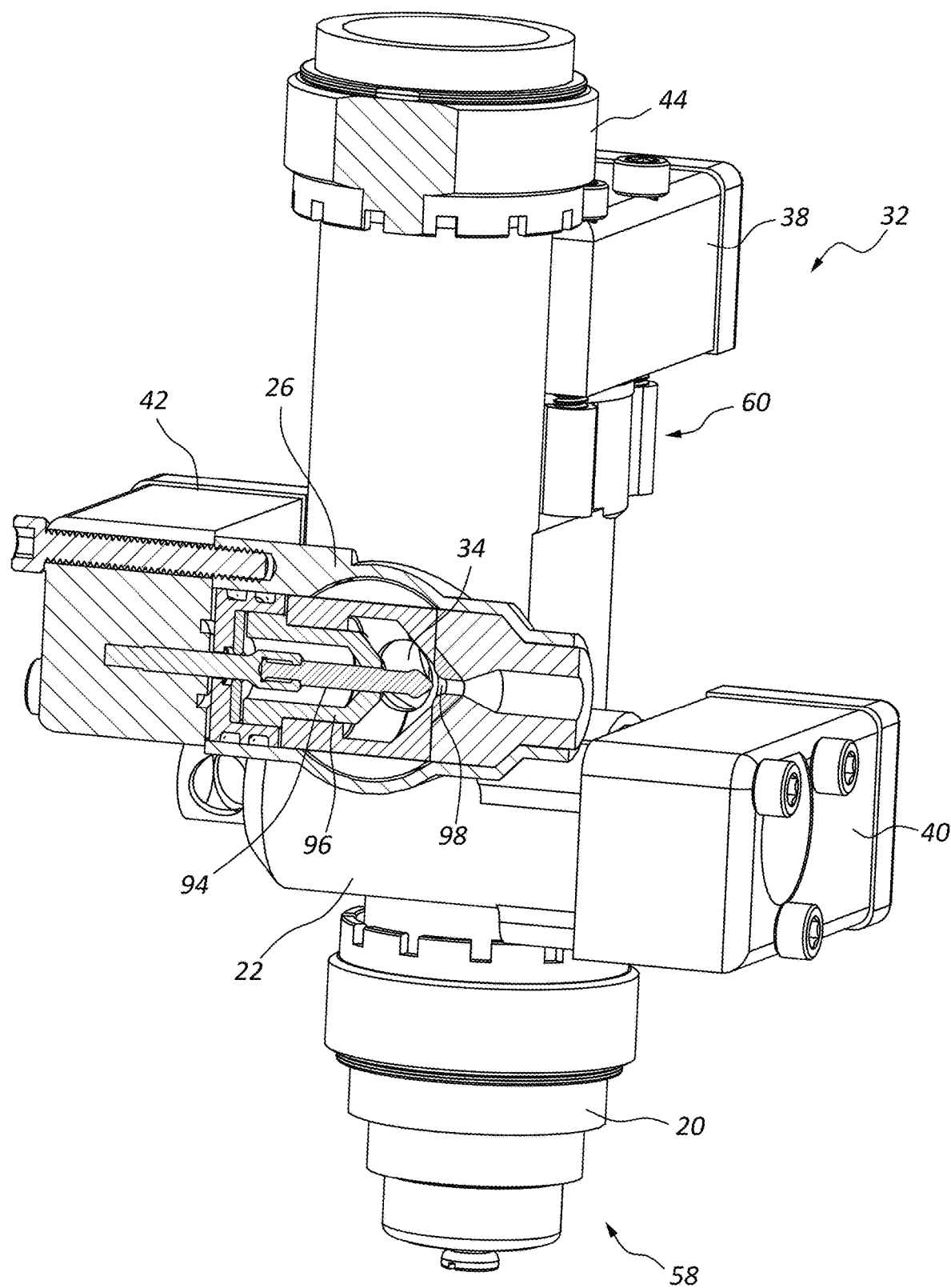
FIG. 17 is a cross sectional perspective view of the divert valve.

Referring to FIG. 17, one implementation of the divert valve 26 is shown. The divert valve 26 includes many of the same components as the accumulator valve 20. For example, the divert valve 26 includes a pintle 94, pintle guide 96, and throat 98. The divert valve 26 moves between an open position where the pintle 94 is spaced apart from throat 98 and a closed position where the pintle 94 is in contact with the throat 98. In one implementation, the actuator 42 moves the pintle 94 lengthwise into and out of contact with the throat 98 to close and open the divert valve 26.

It should be appreciated that the components in the divert valve 26 can be made of any suitable material including those already mentioned above in connection with the accumulator valve 20. For example, the pintle 94 and the throat 98 can be made of rhenium molybdenum and the pintle guide 96 can be made of Inconel 718 or a ceramic matrix composite.

The divert valve 26 can be an off-the-shelf component that is used as is or adapted for use with the attitude control system 12, or it can be a custom designed component. In some implementations, the divert valve 26 satisfies one or more of the specifications set forth below in Table 8 and/or Table 9. This design of the divert valve 26 may be especially suitable for use with a low level attitude control system.

TABLE 8

Divert Valve Specifications 1

| Parameter | Value |
|---|---|
| Contraction ratio | Min. 3:1 relative to propellant grain |
| Operating throat area | 0.00399 in$^2$ |
| Natural throat area | 0.00439 in$^2$ (ø0.075 in) |
| Pintle slope | 0.05 in$^2$/in |
| Expansion ratio | Max 2:1 relative to operating throat area |
| Permissible leak rate | TBD |
| Response time | ≥2 in/s to 90% full stroke |
| Max. total stroke | ≤0.300 in |

TABLE 9

Divert Valve Specifications 2

| Parameter | Value |
|---|---|
| Required pressure in DACS chamber | 500 psia |
| Fill time for ignition | ≤2.0 s |
| DACS chamber volume | 10 in$^3$ at start 116 in$^3$ at end |
| Divert system ignition valve (DSIV) ballistic requirements | |
| Nominal DSIV control pressure | 2000 psia |
| Maximum expected operating pressure | 3300 psia |
| Leak rate through DSIV valve | TBD |
| DSIV Sizing requirements | |
| Operating throat area (Aero.) | 0.008659 in$^2$ |
| Throat area margin | 1.20 |
| Throat area (+margin) | 0.010391 in$^2$ |
| Natural throat diameter | 0.115 in |
| Valve slope | 0.06 in$^2$/in |
| Throat geometry | TBD |
| Nozzle/exit | |
| Maximum allowable divergent half-angle (at exit) | ≤10° |
| Maximum exit diameter | ≤0.149 in |
| DSIV inlet | |
| Inlet tube/barrel flow area | ≥0.025977 in$^2$ |

Attitude Thrusters

It should be appreciated that any suitable thrusters 24 can be used with the attitude control system 12. In general, it is desirable to use attitude thrusters 24 that seal tightly when closed and offer proportional control (versus on/off control). The attitude thrusters 24 can provide accurate thruster delivery and minimum impulse bit (MIB) throughout depressurization of the accumulator 16.

Operation of the attitude thrusters 24 when the accumulator 16 is not being recharged provides the flight vehicle with inherent quiescent thruster delivery that enhances target acquisition capability for flight vehicles such as the KV. The attitude thrusters 24 are preferably lightweight and low cost due to maintaining the gas temperature in the accumulator <2000° F. enabling uninsulated metallic manifolds and thruster designs. The attitude thrusters 24 can be placed as far aft as practical to increase pitch/yaw moment capability, which minimizes the attitude control system impulse and thruster levels.

In some implementations, the attitude thrusters 24 satisfy one or more of the specifications set forth below in Table 10. This design of the attitude thrusters 24 may be especially suitable for use with a low level attitude control system.

TABLE 10

Attitude Thruster Specifications

| Parameter | Value |
|---|---|
| Peak thrust | 2.5 lbf |
| Thrust rate | 125 lbf/s |
| Frequency response | 25 Hz operation at ± 1% amplitude and 90° phase |
| Thrust resolution | 0.3 lbf |
| Max. impulse (per thruster) | 50 lbf · s |

Actuators

The actuators 38, 40, 42 can be any suitable actuators. In one implementation, one or more of the actuators 38, 40, 42 are off-the-shelf actuators that are used as it or adapted for use with the valves 20, 22, 26. In another implementation, the actuators 38, 40, 42 are custom designed.

In some implementations, the actuators 38, 40, 42 and/or any other actuator described in this document satisfy one or more of the specifications set forth below in Table 11. Actuators satisfying these requirements may be especially suitable for use with a low level attitude control system.

TABLE 11

Actuator Specifications

| Parameter | Value |
|---|---|
| Operation type | Proportionally commanded |
| Stroke length | 0.350 inches (+0.025/−0.000) |
| Operating load | 300 lbf, tension and compression (t&c) |
| Min. load vs. position profile | 300 lbf over entire stroke (t&c) |
| Inertial load | 0.05 lbm |
| Min. slew rate | ≥4 in/s over entire stroke and at 300 lbf (t&c) loading |
| Min. frequency response | 25 Hz at ±1% amplitude at −3 dB or 90° phase lag at 300 lbf loading |
| Position accuracy | ≤0.002 in over entire stroke and at 300 lbf (t&c) loading |
| Position command | threshold ≤0.002 in over entire stroke and at 0 and 300 lbf (t&c) loading |
| Duty cycle | Continuous operation for 300+ s at 1 Hz cycling, 100% amplitude, and 100 lbf loading |
| Ambient altitude/pressure | Sea-level to high altitude |
| Ambient operation temp | 40° F. to 120° F. |
| Temperature at interface | Linear temperature increase from 75° F. to 300° F. over 300 s |

The attitude control system 12 shown in FIG. 18 uses similar components and operates similarly to that shown in FIG. 3. The description of the various components above applies equally to the same or similar components shown in FIG. 18 unless noted otherwise. Also, the description of the operation of the attitude control system 12 applies equally to that shown in FIG. 18 unless noted otherwise.

One notable aspect of the attitude control system in FIG. 18 is that the vent valves 22 and the divert ignition valves 26 are coupled to the forward end of the gas generators 18. The vent valves 22 and divert ignition valves 26 operate in the same or similar manner as described above.

One thing to note is the divert ignition valves 26 are coupled to the gas generators 18. This means that hot gas is only available when propellant in the gas generators 18 is burning. It should be noted, however, that the divert system 14 can include separate igniters to ignite the propellant in the gas generators 28 when hot gas from the attitude control system 12 is unavailable.

In other implementations, the divert ignition valves 26 can be coupled to the accumulator 16 instead of or in addition to being coupled to the gas generators 18. In these configurations, the propellant in the gas generators 18 does not need to be burning to provide hot gas to the divert system 14. However, the accumulator must contain hot gas, which means it must have been initially ignited and/or the gas generators 18 initially ignited in order to fill the accumulator 16 with hot gas.

Divert System

Referring to FIG. 18, the divert system 14 includes the divert ignition valves 26, the gas generators 28, and the divert thrusters 30. The divert system 14 can also include one or more igniters, which can be used to ignite the propellant in the gas generators 28. Any suitable igniters can be used. In some implementations the igniters are barbered pulse igniters.

Figure 34:
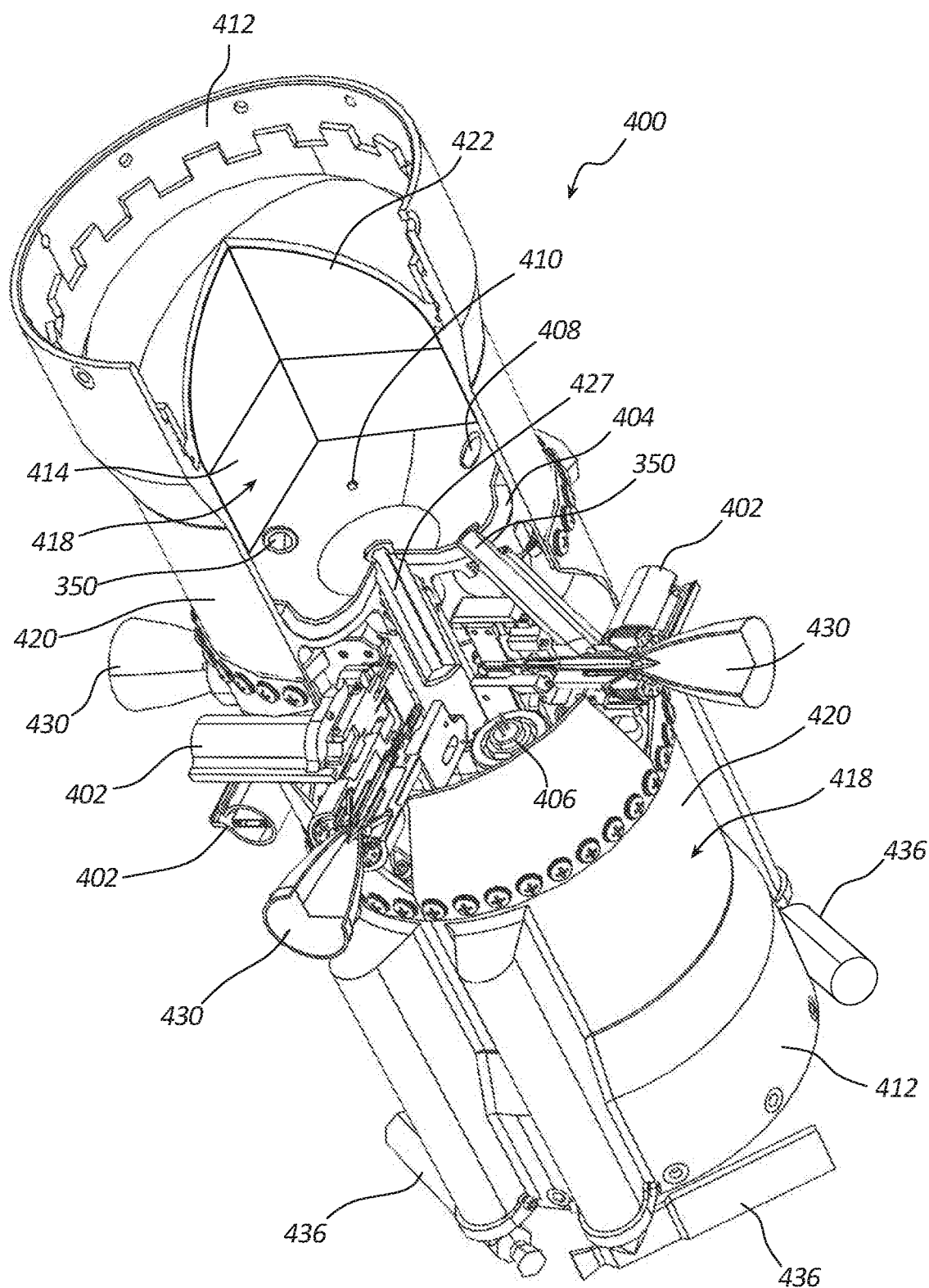
FIG. 34 is a perspective view of a partial cross section of the prototype divert system in FIGS. 32 and 33.
Figure 35:
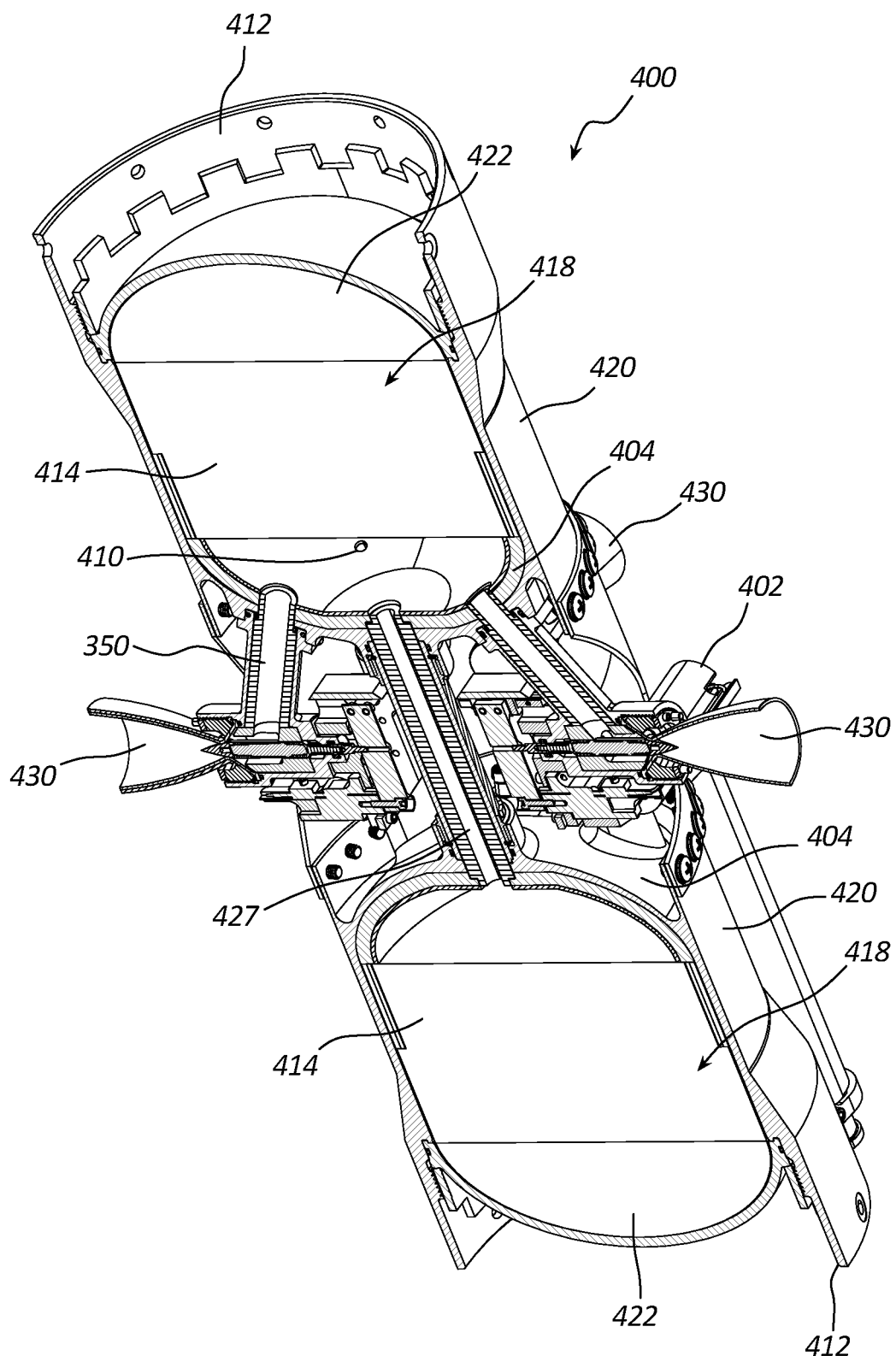
FIG. 35 is a cross sectional view along a lengthwise axis of the prototype divert system in FIGS. 32 and 33.
Figure 36:
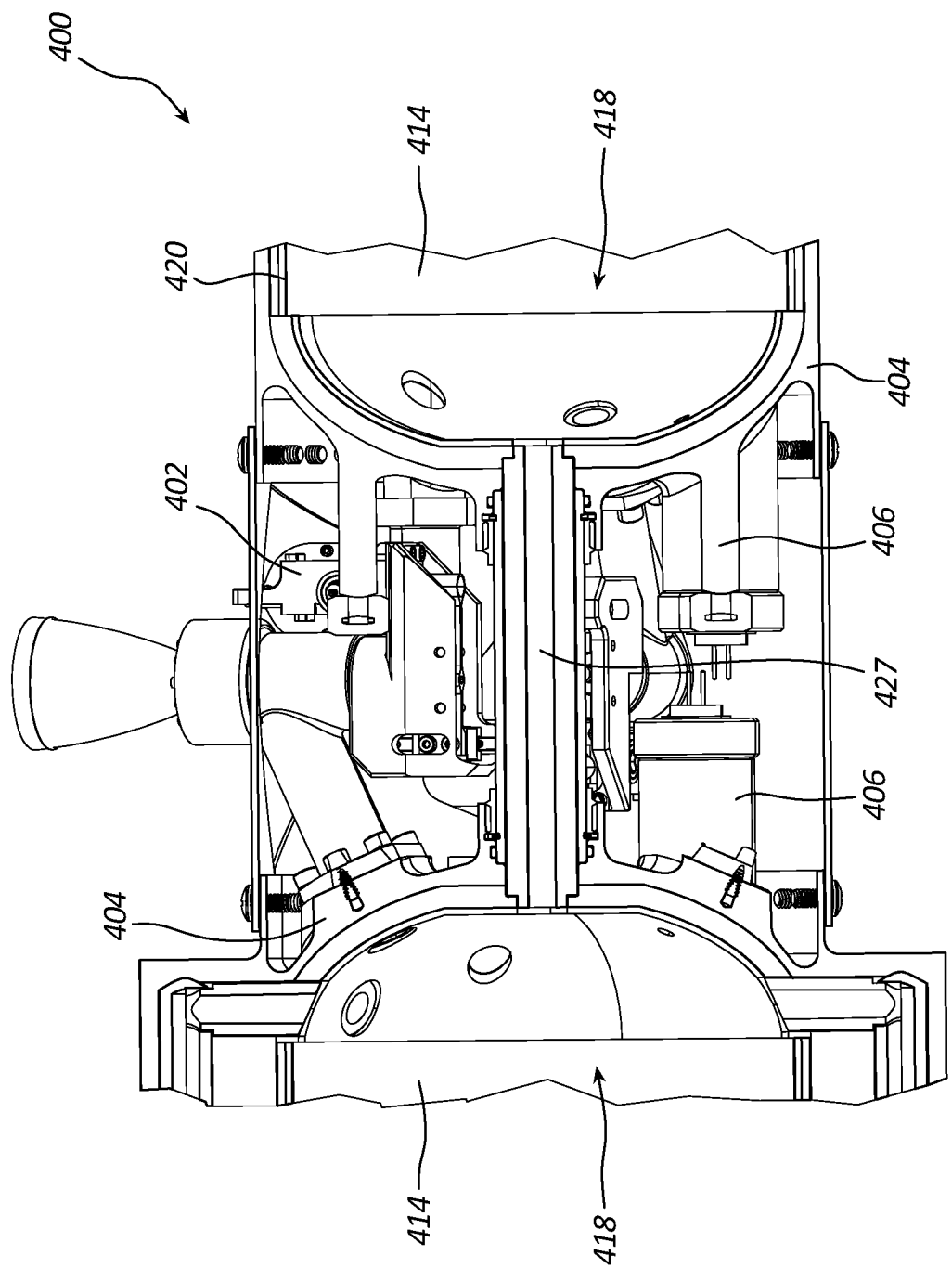
FIG. 36 is a cross sectional view of the central area between the gas generators of the prototype divert system in FIGS. 32 and 33.
Figure 38:
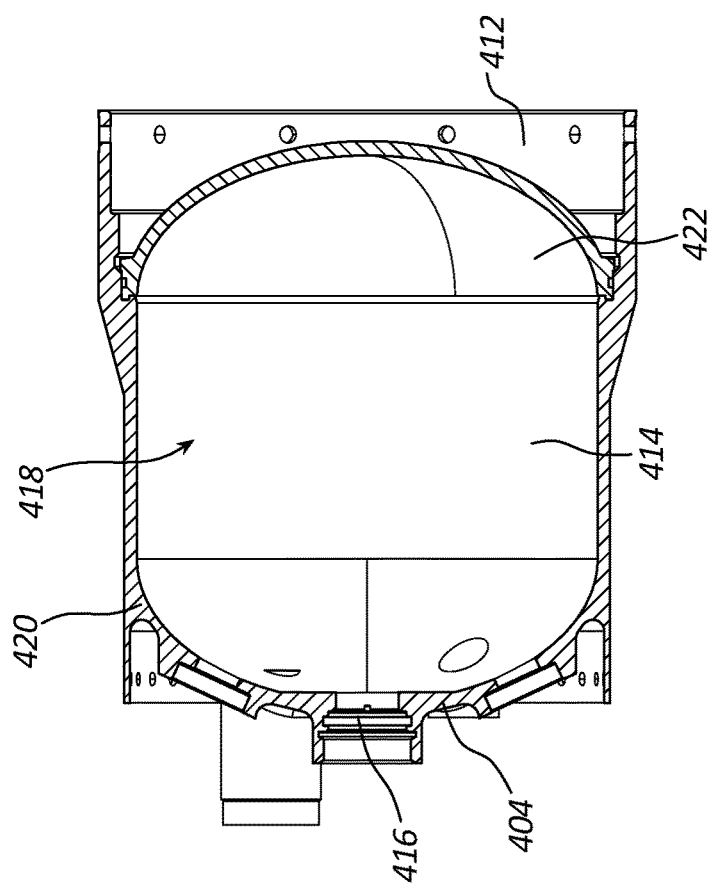
FIG. 38 is a cross sectional view of the gas generator from the prototype divert system in FIGS. 32 and 33.
Figure 37:
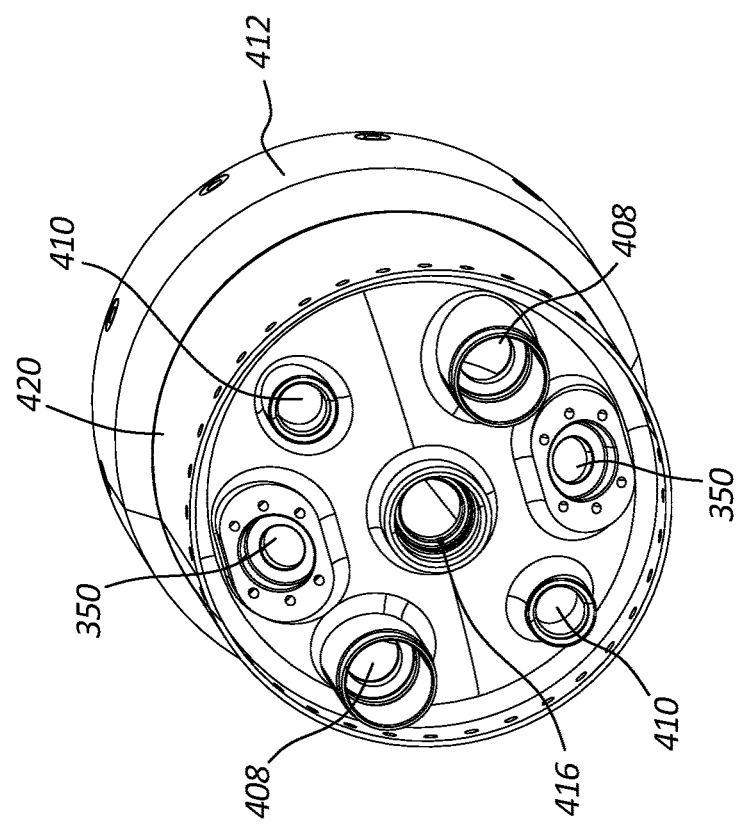
FIG. 37 is a perspective view of the gas generator from the prototype divert system in FIGS. 32 and 33.
Figure 39:
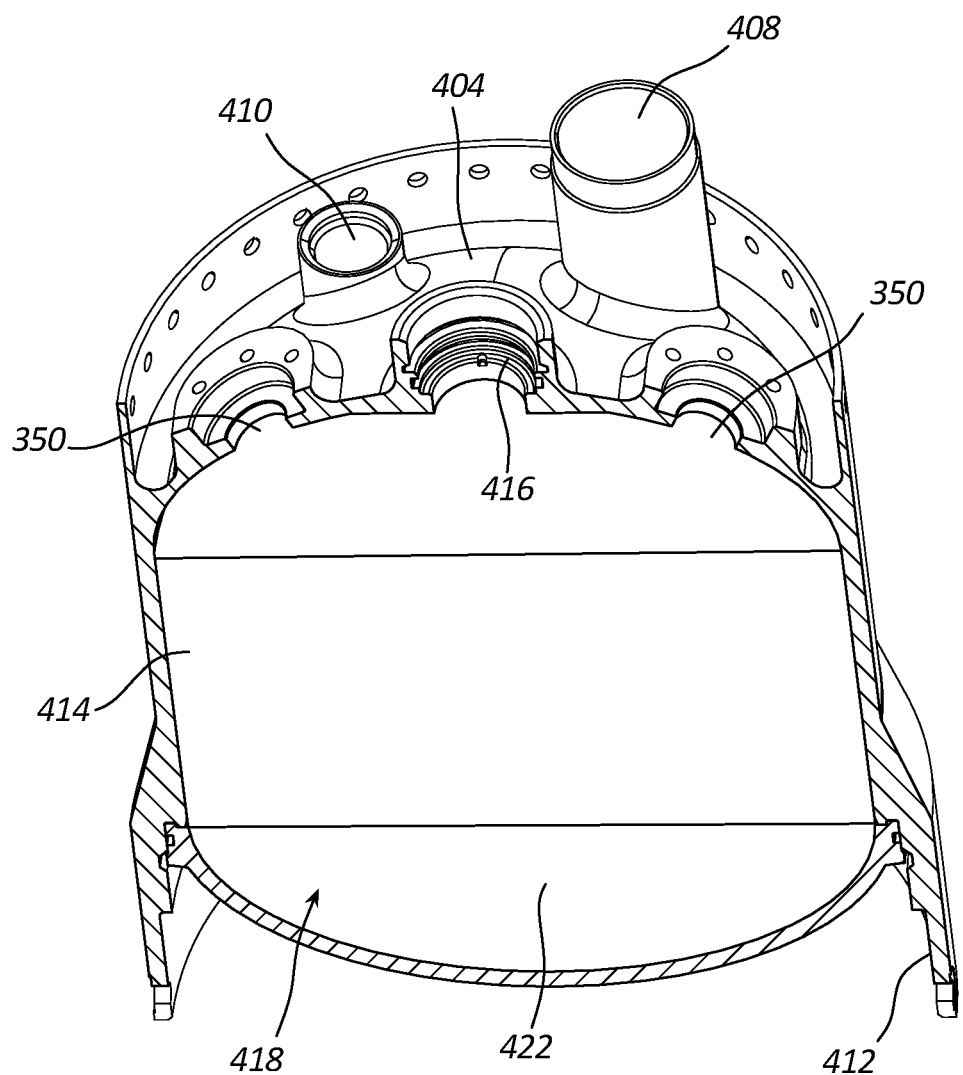
FIG. 39 is a perspective view of a cross section of the gas generator from the prototype divert system in FIGS. 32 and 33.

The gas generators 28 are spaced apart and pneumatically linked by a tube 27 (FIGS. 34-36) extending lengthwise between them. The gas generators 28 operate together to generate hot gas for the divert thrusters 30. The divert system 14 shown in FIG. 18 includes four divert thrusters 30. Each gas generator 28 is coupled to two of the divert thrusters through openings 350 (FIG. 34) in the side walls.

The nozzles of the divert thrusters 30 can be positioned to exhaust combustion gases to produce thrust along radial lines separated by 90-degree intervals. In some implementations, the nozzles are positioned so that a plane passing through the center of each nozzle also passes through, or proximate to, a center of mass of the DACS 10 or the flight vehicle 11.

The divert system 14 can include any suitable number of divert thrusters 30 arranged in any suitable configuration. For example, the divert system 14 conclude at least 3 divert thrusters, at least 4 divert thrusters, at least 5 divert thrusters, at least 6 divert thrusters, at least 7 divert thrusters, at least 8 divert thrusters, at least 9 divert thrusters, or at least 10 divert thrusters. The divert thrusters 30 can also be coupled to the gas generators 28 in any suitable manner. It is generally preferable to couple roughly the same number of divert thrusters 30 to each gas generator 28.

The gas generators 28 are positioned opposite each other along the lengthwise axis 36 of the DACS 10 and/or the flight vehicle 11. The gas generators 28 are preferably positioned symmetrically on the lengthwise axis 36 so that as the propellant burns, it has no effect or only a minimal effect on the overall center of gravity of the DACS 10 and/or the flight vehicle 11.

Figure 19:
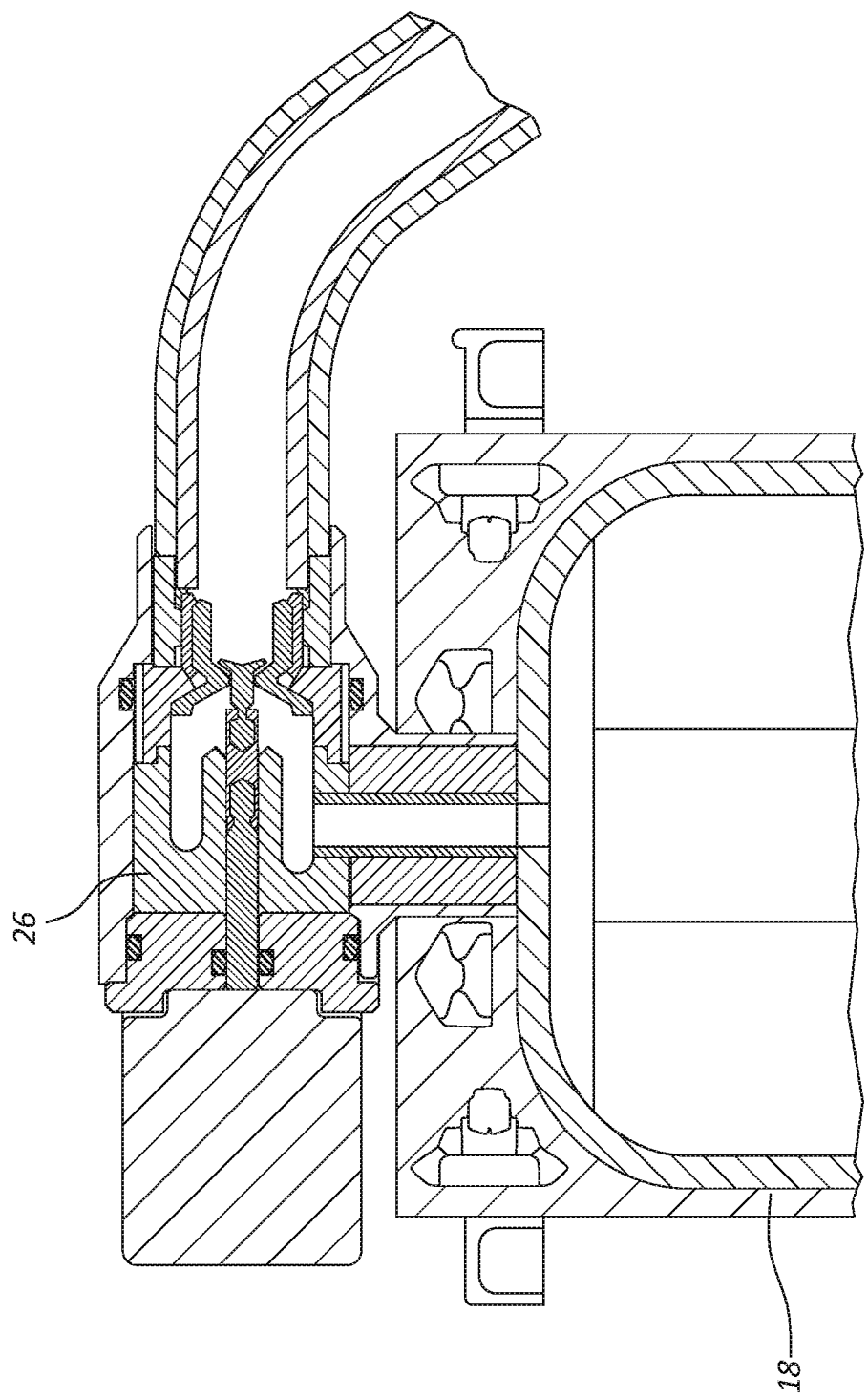
FIG. 19 is a cross-sectional view of the divert ignition valve used with the DACS in FIG. 18.

The divert ignition valves 26 can have any suitable configuration and be made of any suitable materials. In some implementations, the divert ignition valves 26 can be configured the same or similarly to the accumulator valves 20 including being made of the same or similar materials as the accumulator valves 20. In other implementations, the divert ignition valves 26 can be configured the same or similarly to any other valve described in this document or the incorporated documents. FIG. 19 shows a cross sectional view of one implementation of the divert ignition valves 26 coupled to the gas generator 18. The vent valve 22 is omitted from FIG. 19.

In some implementations, the divert system 14 can withstand the same pressures and operate for the same amount of time as the DACS 10. In general, it should be appreciated that any individual parameter disclosed in connection with the DACS 10 also applies to the divert system 14. For example, if the DACS 10 can withstand a given pressure or temperature, then the divert system 14 can withstand the same pressure or temperature. Also, the operational times of the DACS 10 apply equally to the divert system 14.

In some implementations, the components in the divert system 14 can be the same or similar to the components described in connection with similar or analogous components in the attitude control system 12. For example, the various components in the divert system 14 can be the same or similar structurally and be made of the same or similar materials as those in the attitude control system 12.

The divert system 14 can operate in a variety of different ways. In some implementations, the divert system 14 operates as follows. The propellant in the gas generators 28 is ignited by hot gas from the attitude control system 12 or by igniters included as part of the divert system 14. The divert thrusters 30 are closed as pressure builds in the gas generators 28.

The pressure in the gas generators 28 builds until it reaches a threshold such as 500 psia. At this point, the divert thrusters 30 are opened to maintain the pressure at about 500 psia. When used to maintain the pressure, the divert thrusters 30 are operated in a way that does not impart a net thrust on the flight vehicle 11. The divert thrusters 30 can also be operated to provide a net thrust on the flight vehicle 11 in any direction.

Upon completion of the divert maneuvers, the propellant in the gas generators 28 is extinguished by simultaneously opening all or enough of the divert thrusters 30 thereby causing rapid depressurization and extinguishment of the propellant grain. The divert system 14 enters a hold mode until another divert operation is needed, at which time the process is repeated.

The divert system 14 can have numerous configurations. For example, in some implementations, the divert system 14 can be rapidly depressurized using vent valves coupled to the gas generators 28.

In general, the divert system 14 provides the lateral motion of the flight vehicle 11, and the attitude control system 12 provides the angular control to stabilize pointing and control divert direction. The design of the attitude control system 12 can be simplified if the center of gravity of the flight vehicle 11 (e.g., kill vehicle) is aligned with the divert thrusters 30 and remains aligned throughout operation. This can generally be achieved by positioning some of the avionics components aft of the DACS 10. This is called a split configuration as opposed to a unitary layout. The split design may be attractive because the DACS 10 is often the highest-risk assembly on the flight vehicle 11.

The divert system 14 can be used to perform a variety of divert maneuvers, especially in the context of a KV. These include a divert maneuver using remote sensor data before the operation of the seeker, a divert maneuver after seeker acquisition, a divert maneuver after seeker discrimination, and a divert maneuver just before intercept. Of these divert maneuvers, the discrimination divert can be the most demanding and can be reduced by the incorporation of a more capable IR seeker. One of the main factors when design a KV is the allocation of impulse to the possible divert maneuvers.

In one implementation, the divert system satisfies one or more of the specifications in Table 12 below. A divert system meeting these requirements may be especially suitable for use with the SM-3's KV.

TABLE 12

Divert System Specifications

| Parameter | Value |
| --- | --- |
| Operation Time | Launch to initiation: ≤240 s |
| | Upon initiation command: ≥1000 s |
| Divert minimum impulse bit | <1.8 lbf. s |
| Total divert total delta-V | Divert system delta-V shall be ≤1900 ft/s |
| Divert initial loaded acceleration | Greater than or equal to 1.5 G's |
| Divert final acceleration | Greater than or equal to 2.0 G's |
| Divert duty cycle | ≤4 pulses over 1000 s period |
| Divert pulse operation time | Each pulse shall last ≤4 s |
| Response time (from ignition command) | Response time from 0 to 90% thrust command from an ignition command shall be ≤2.0 s |
| Response time (when already ignited) | Response time from 0 to 90% thrust command from a thrust command shall be ≤10 ms |

Satellite Positioning System

Figure 48:
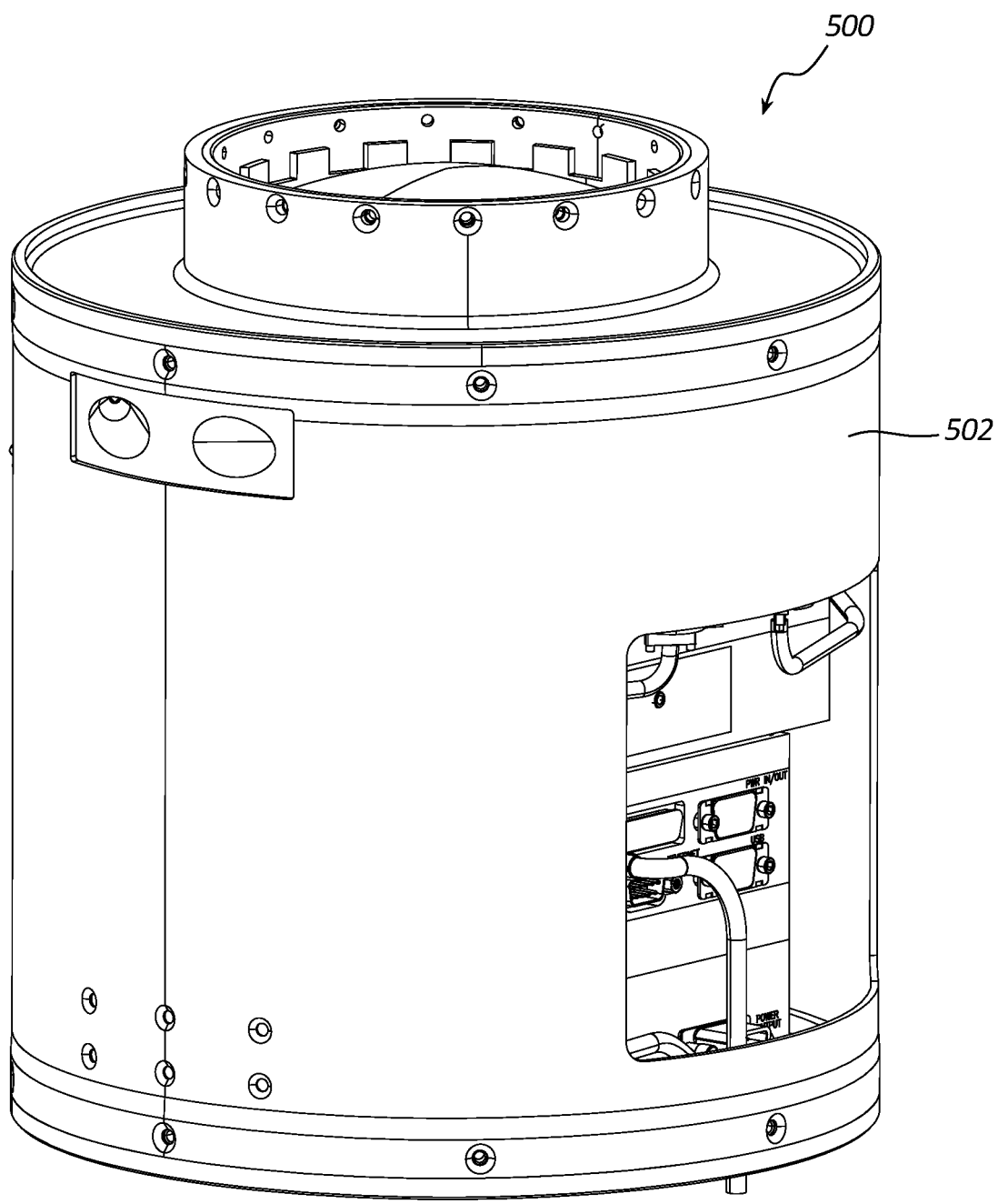
FIG. 48 is a perspective view of a reaction control system for a launch vehicle.
Figure 49:
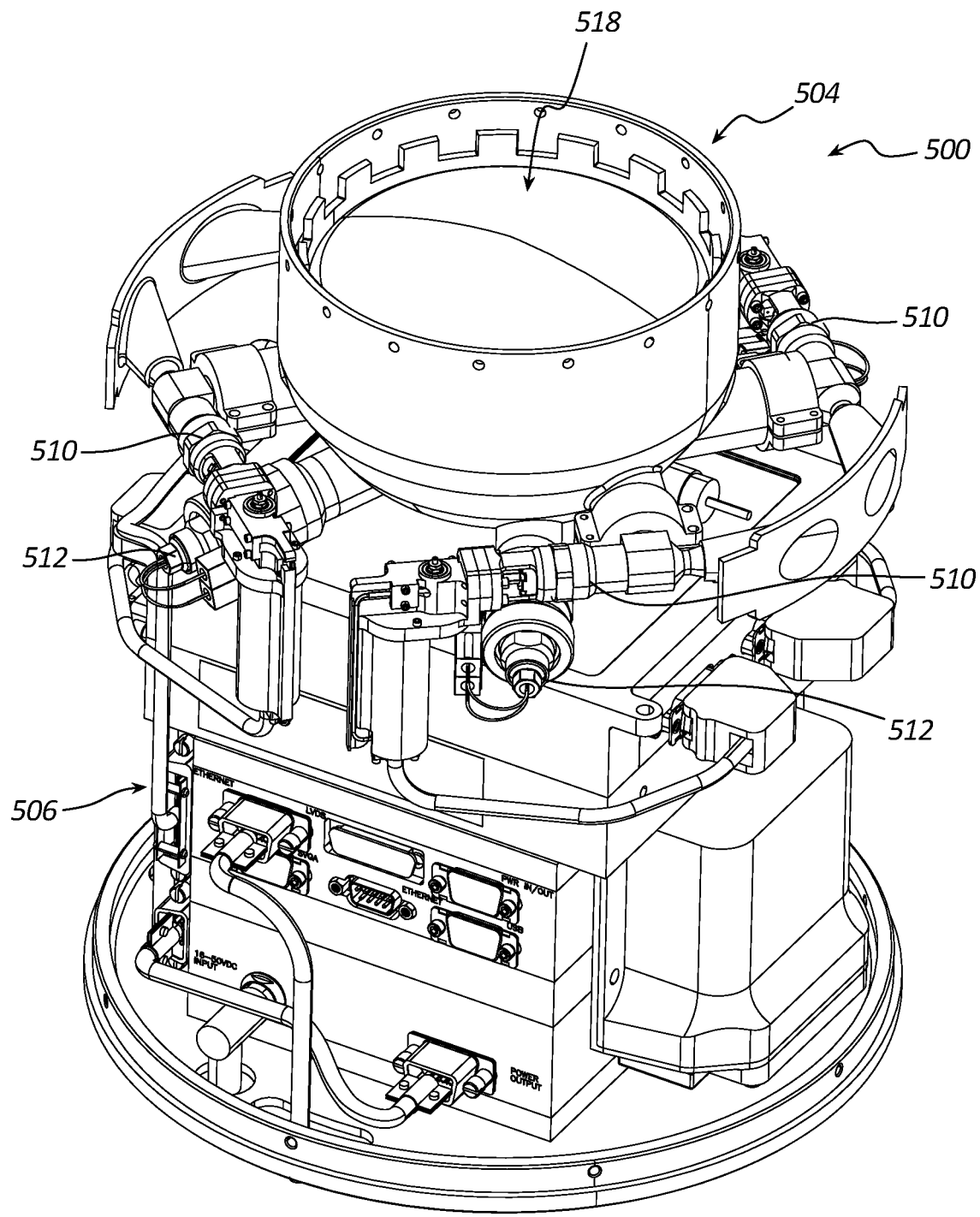
FIG. 49 is a perspective view of the reaction control system in FIG. 48 with the outer housing removed.

FIGS. 48 and 49 show perspective views of one implementation of a reaction control system (RCS) 500. The RCS 500 is a spacecraft system that uses thrusters to provide attitude control and sometimes translational movement. The RCS 500 is especially suitable for use with small spacecraft such as those used to launch satellites and the like.

The RCS 500 is capable of providing small amounts of thrust in any desired direction or combination of directions. The RCS 500 is also capable of providing torque to allow control of rotation (roll, pitch, and yaw).

The RCS 500 can be used for any of the following: attitude control during re-entry, station keeping in orbit, close maneuvering during docking procedures, control of orientation, or "pointing the nose" of the craft, a backup means of deorbiting, and/or ullage motors to prime the fuel system for a main engine burn.

In some implementations, the RCS 500 is configured to be used with launch vehicles such as single-stage sub-orbital launch vehicles and multi-stage orbital launch vehicles. The launch vehicles can be those that only use solid propellant making them much easier to prepare and launch. Examples of such launch vehicles include the SPACELOFT and SPYDER systems available from UP Aerospace.

Figure 50:
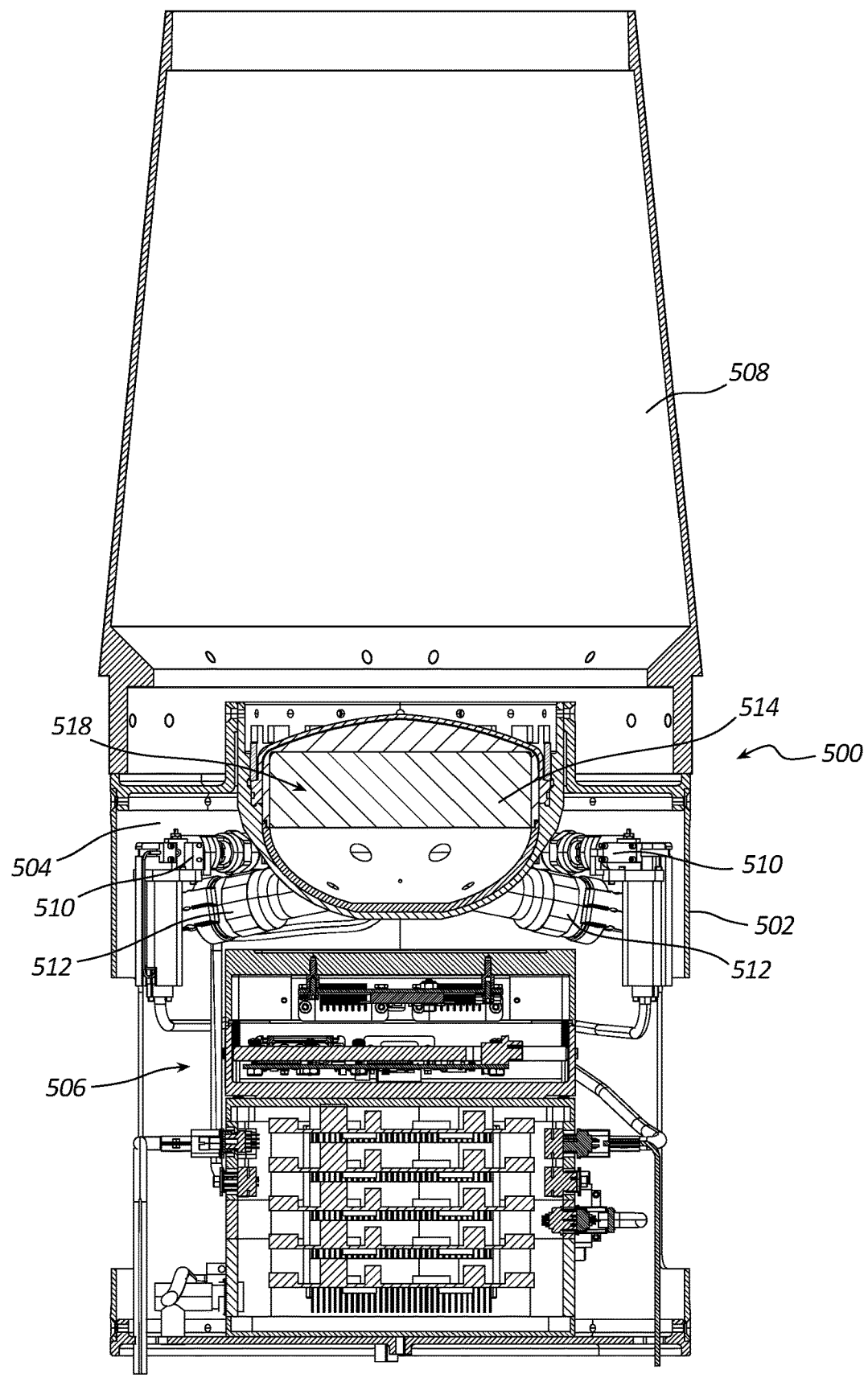
FIG. 50 is a cross sectional view of the reaction control system in FIG. 48 coupled to the after of a nose cone of a launch vehicle.
Figure 51:
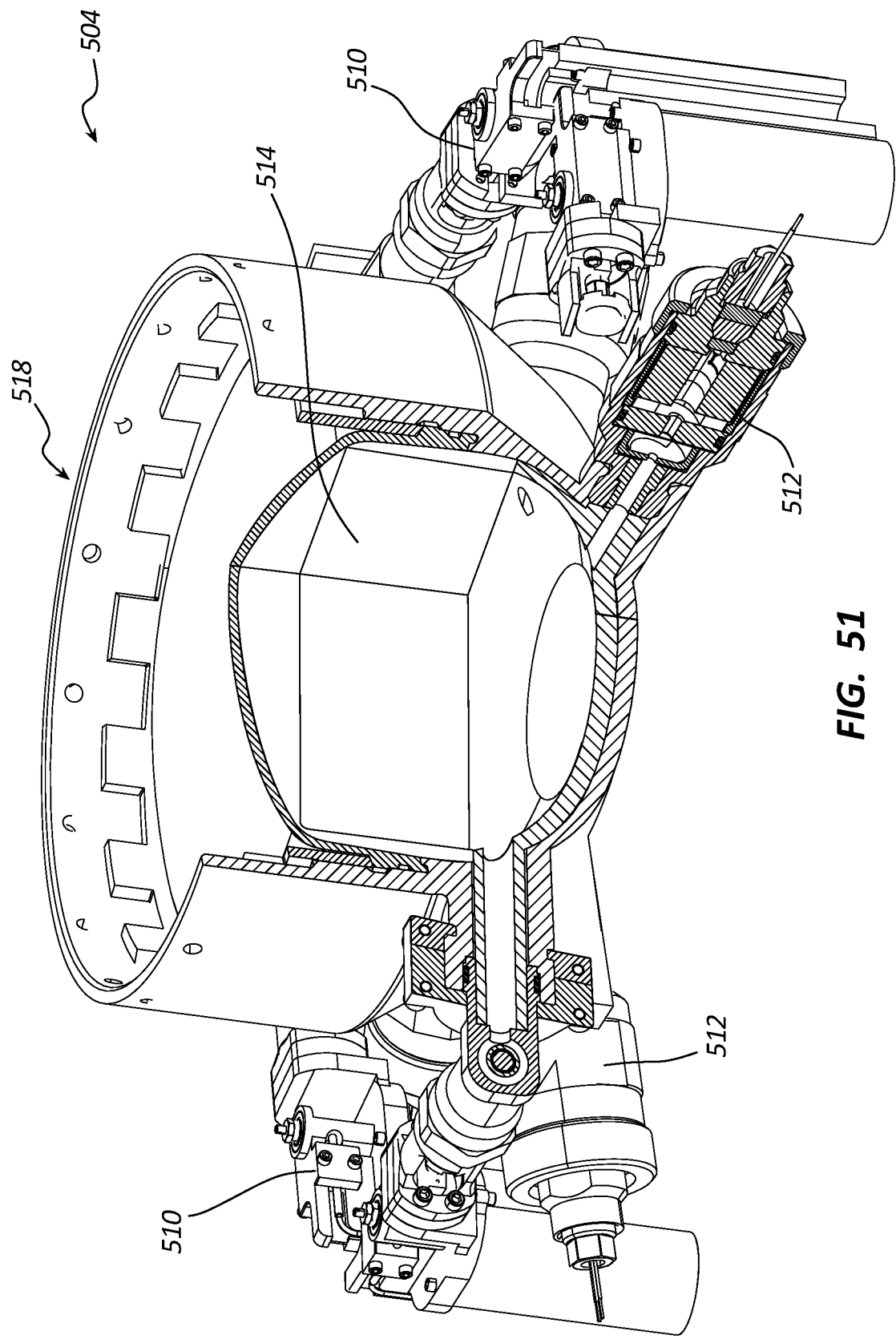
FIG. 51 is a perspective view of a partial cross section of the thrust system from the reaction control system in FIG. 48.
Figure 52:
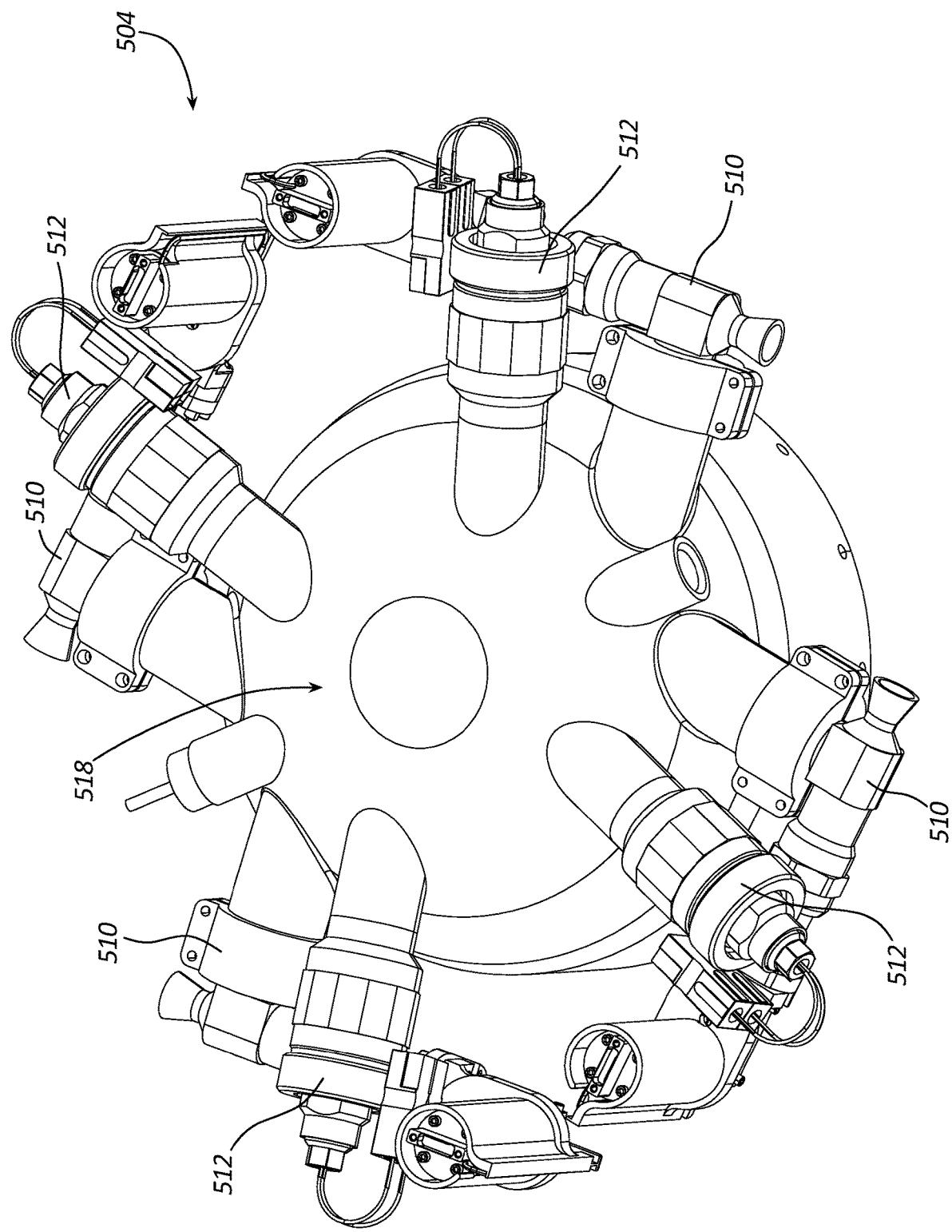
FIG. 52 is an aft or bottom perspective view of the thrust system from the reaction control system in FIG. 48.
Figure 53:
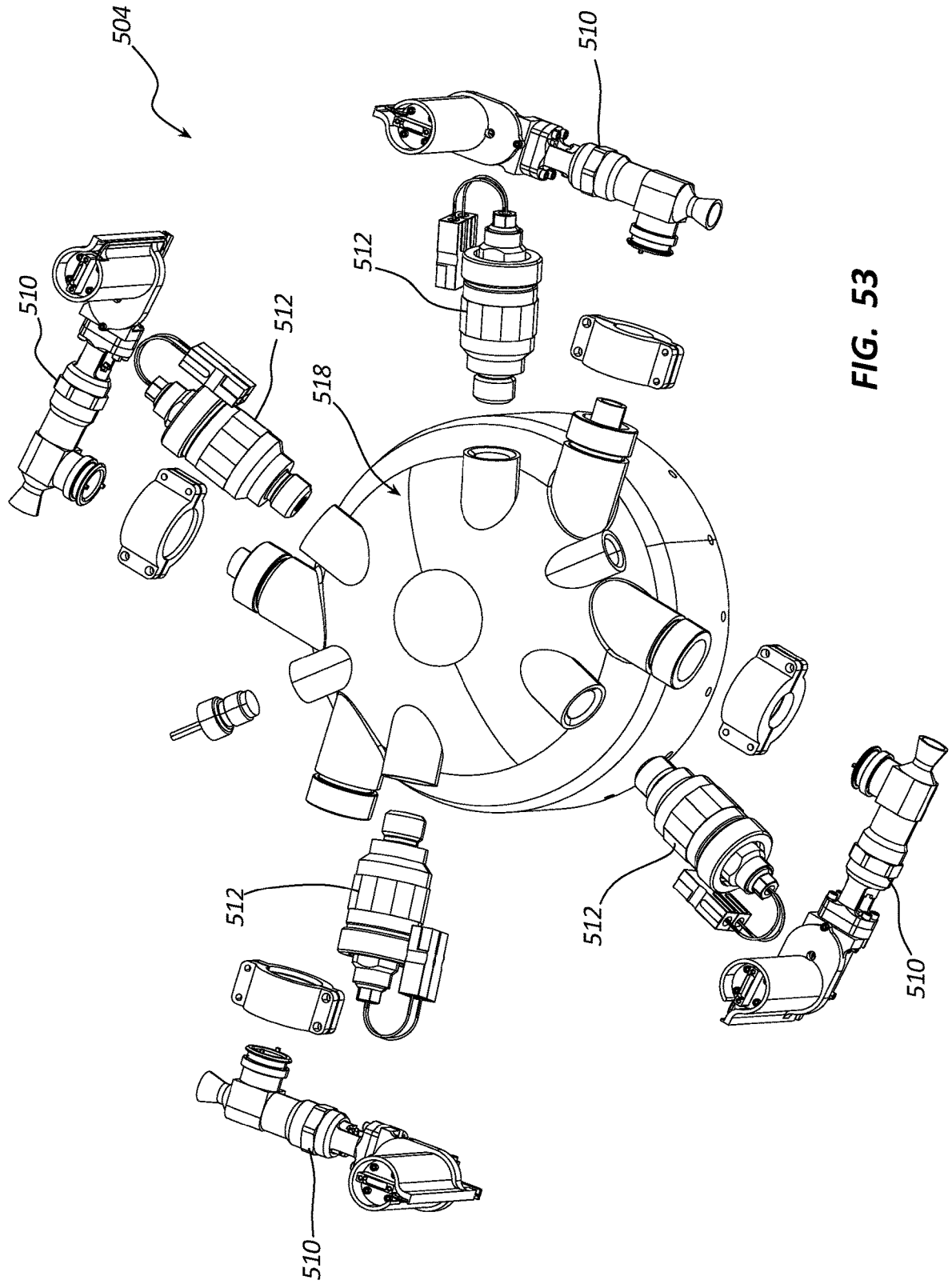
FIG. 53 is a partially exploded top perspective view of the thrust system in FIG. 52.

The RCS 500 includes an outer casing or housing 502 enclosing a thrust system 504 and an avionics system 506. The housing 502 can have any suitable configuration that allows the RCS 500 to be coupled to the relevant launch vehicle. The housing 502 shown in FIG. 48 is configured to be compatible with the payload transport system PTS10 enveloped used by UP Aerospace. FIG. 50 shows a cross sectional view of the RCS 500 coupled to the aft of the nose cone 508 of a launch vehicle. The housing 502 can also include various access panels to provide access to the components inside.

The thrust system 504 includes a gas generator 518 pneumatically linked to thrusters 510. The thrust system 504 also includes igniters 512. The gas generator 518 includes solid propellant 514 that can be repeatedly ignited and extinguished to provide multiple thrust pulses. The igniters 512 are used to ignite the solid propellant 514. The solid propellant 514 can be ignited as many times as there are igniters 512.

It should be appreciated that the thrust system 504 can include any suitable number of igniters 512. In some implementations, the thrust system includes at least two igniters 512, at least three igniters 512, or at least four igniters 512.

The solid propellant 514 is extinguished by rapidly depressurizing the gas generator 518. This can be accomplished in a number of ways. In some implementations, the gas generator 518 is rapidly depressurized by fully opening all of the thrusters 510. In other implementations, this is accomplished by opening any suitable number of thrusters 510 any suitable amount that is sufficient to cause rapid depressurization of the gas generator 518.

When the propellant is burning, the thrusters 510 can be used to: (a) maintain the pressure in the gas generator 518 within a range such as those given in connection with the DACS 10 and/or (b) impart thrust on the launch vehicle to change its trajectory and/or attitude. Preferably, the propellant is only ignited long enough to operate the thrusters to produce the desired trajectory/attitude adjustments. This reduces the amount of hot gas that is vented to maintain the pressure with the desired range in the gas generator 518.

In some implementations, the components in the RCS 500 can be the same or similar to the components described in connection with similar or analogous components in the DACS 10 (including the attitude control system 12 and/or the divert system 14). For example, the various components in the divert system 14 can be the same or similar structurally and be made of the same or similar materials as those in the attitude control system 12.

This means the gas generator 518 can be the same or similar to any of the gas generators 18, 28, 418. The thrusters 510 can be the same or similar to any of the thrusters 24, 30, 430. These components can also be the same or similar to any similar component that is described in the incorporated documents. For example, the thrusters 510 can be the same or similar to those described in the incorporated document titled "Hot Gas Thruster." Nearest other examples are also possible.

The avionics system 506 includes those components used to control and operate the RCS 500. In some implementations, this includes actuation and actuation control electronics, control processor, data acquisition I/O, power regulation, power supply (battery), signal conditioning, embedded software, and cable and harnessing.

Figure 56:
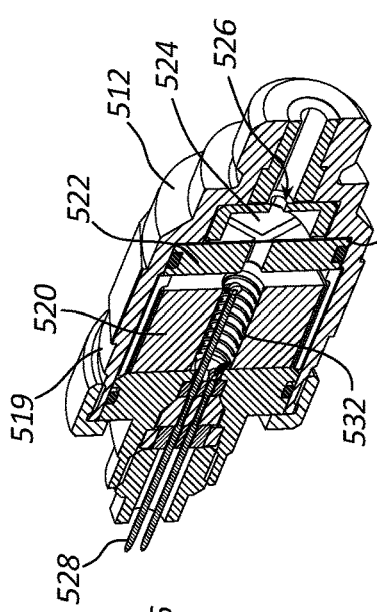
FIG. 56 is a perspective view of a cross section of the igniter in FIG. 54.
Figure 55:
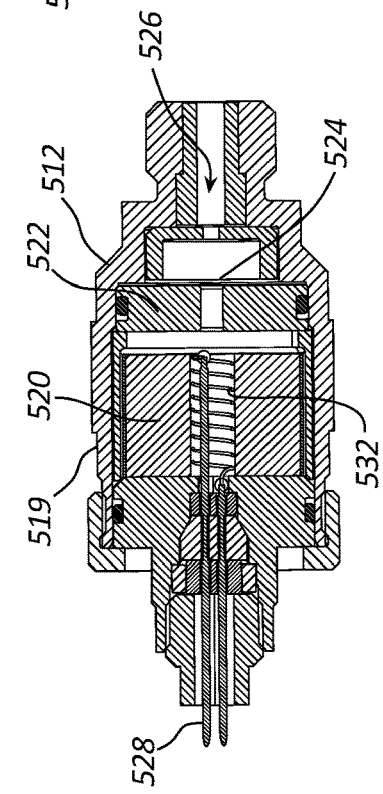
FIG. 55 is a cross-sectional view of the igniter in FIG. 54.
Figure 57:
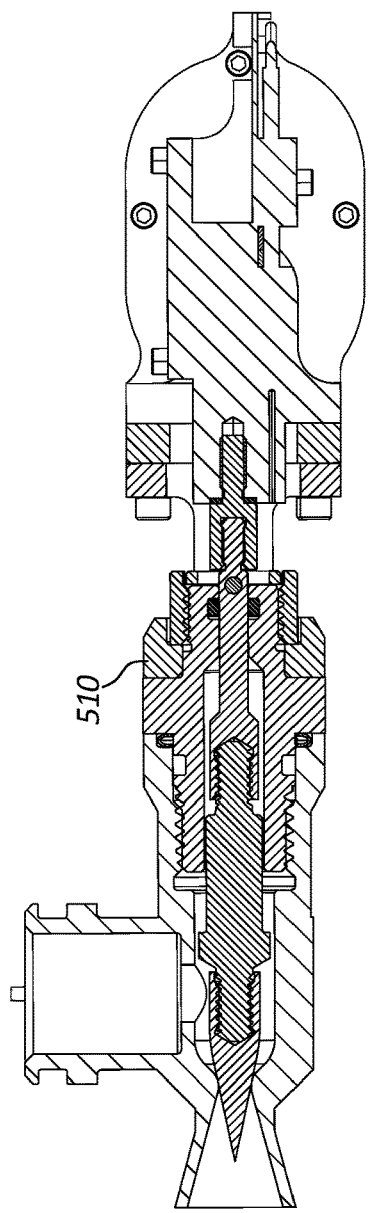
FIG. 57 is a cross sectional view of a thruster from the reaction control system in FIG. 48.
Figure 54:
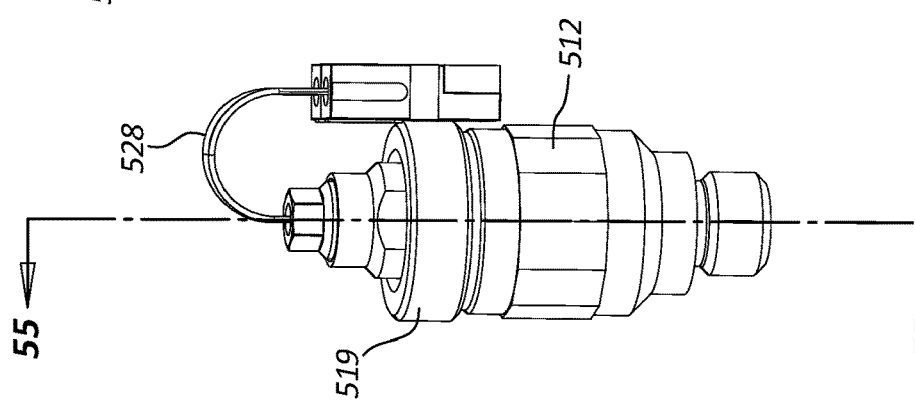
FIG. 54 is a perspective view of an igniter that can be used with the reaction control system in FIG. 48.

In some implementations, the igniter 512 can be configured in the manner shown in FIGS. 54-56. The igniter 512 includes a housing 519, a propellant grain 520, a barrier support disk 522, a barrier 524, a throat 526. Insulated copper wire 528 extends through the housing 519 and is connected to exposed nichrome wire 532. The nichrome wire 532 is positioned adjacent to the propellant grain 520. When a voltage is applied to the wire 528, it heats the nichrome wire 532, which ignites the propellant grain 520. The hot gas produced by the burning propellant bursts the disk and enters the gas generator 518 igniting the propellant 514. The igniter 512 can be sized to light at final free volumes without over-pressurizing at initial free volumes.

Figure 58:
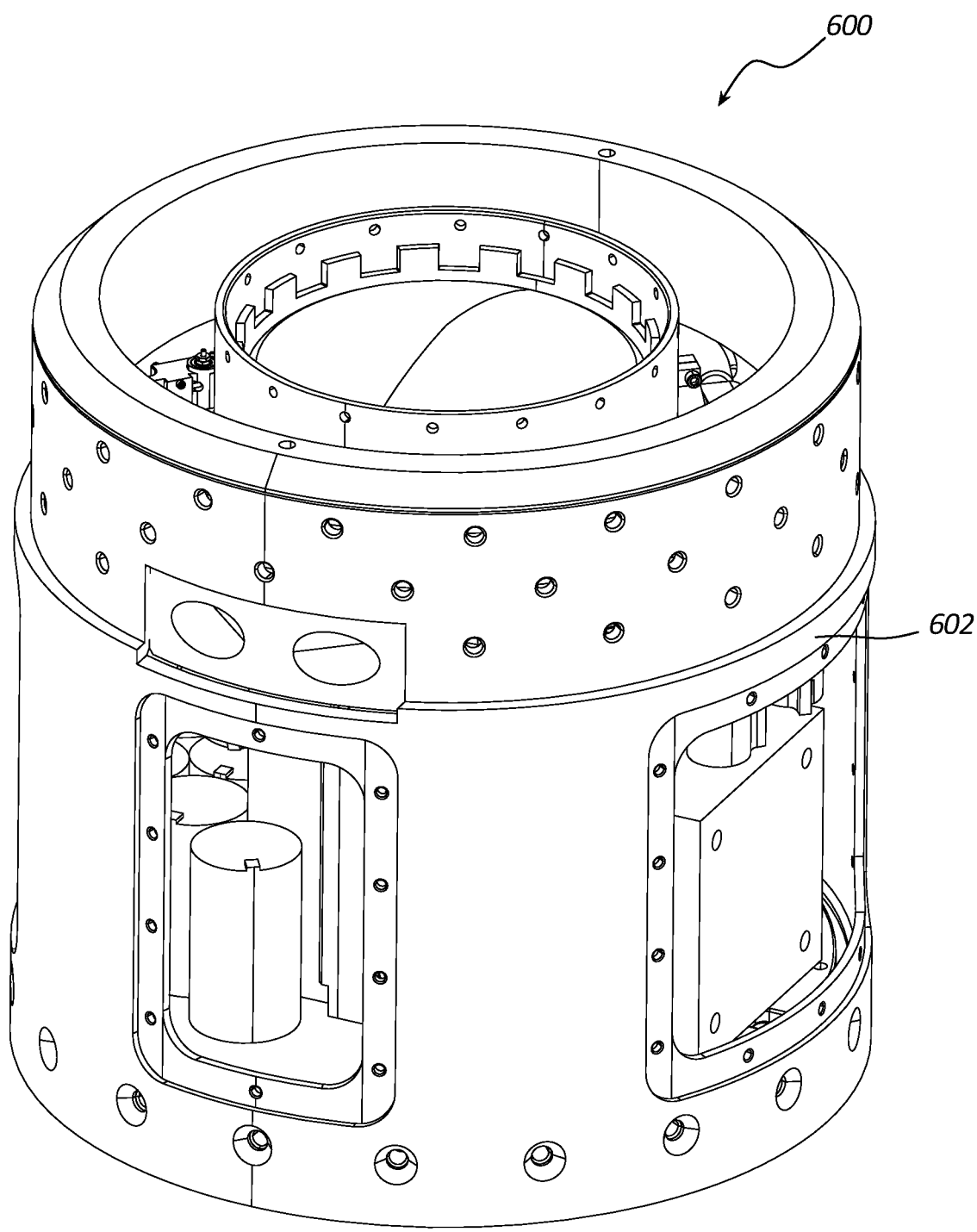
FIG. 58 is a perspective view of another reaction control system for a launch vehicle.
Figure 59:
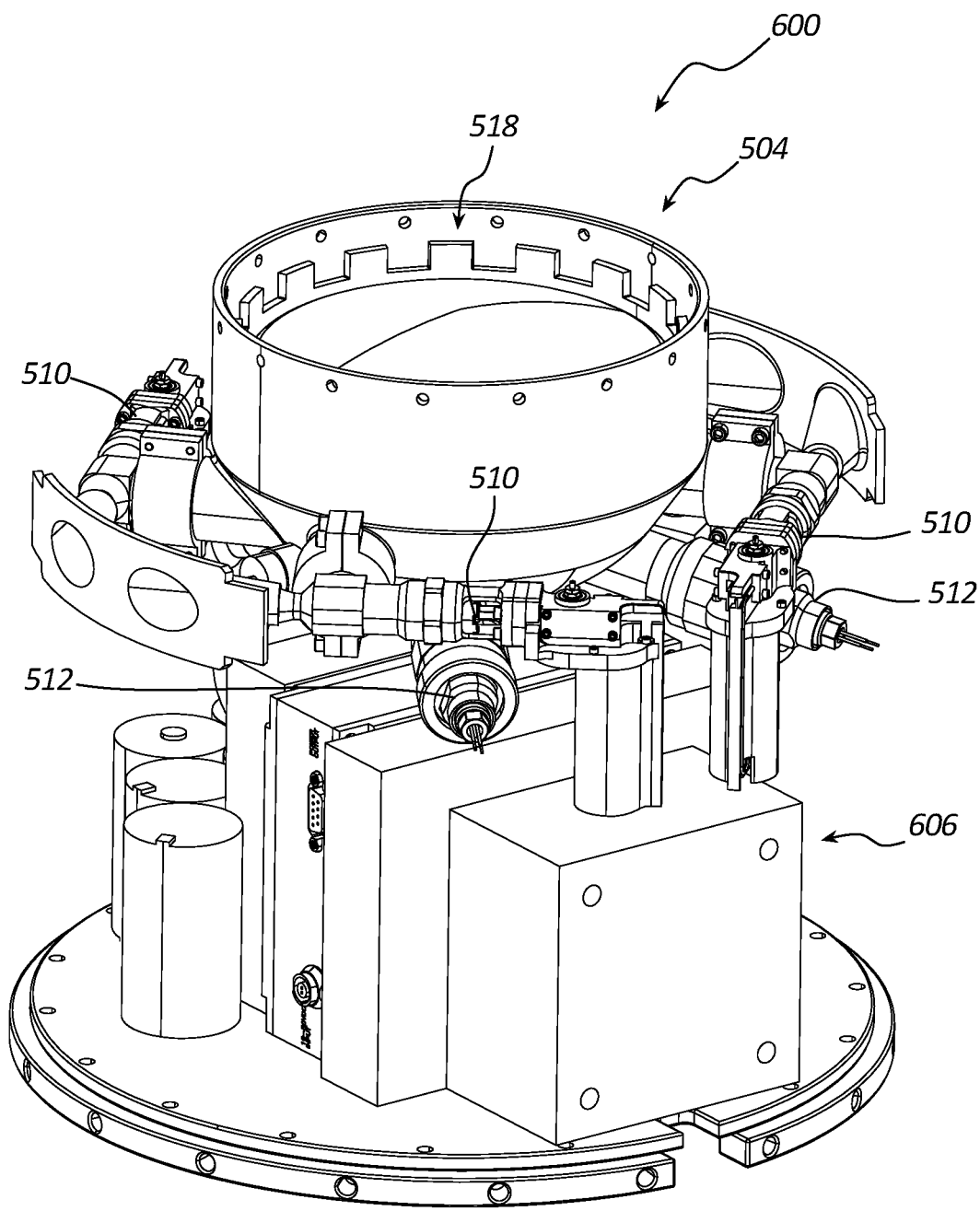
FIG. 59 is a perspective view of the reaction control system in FIG. 58 with the outer housing removed.

FIGS. 58 and 59 show perspective views of another implementation of an RCS 600 configured to fit in SpaceLoft's avionics envelope that currently houses its cold gas system. The RCS 600 includes a housing 602, the thrust system 504, and an avionics system 606. FIG. 58 shows the thrust system 504 and the avionics system 606 in the housing 602. FIG. 59 shows the RCS 600 with the housing 602 removed.

Figure 60:
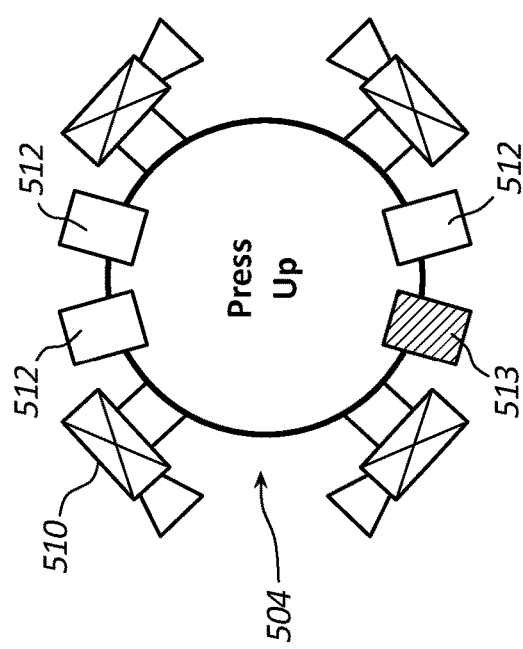
FIGS. 60-63 illustrate the operation of a reaction control system.

FIGS. 60-63 illustrate the operation of the thrust system 504. FIG. 60 shows the initiation of the thrust system 504 from an off state. The igniter 513 is ignited (the other igniters 512 have not been ignited), bursts the barrier 524, and ignites the propellant grain 514 in the gas generator 518. The proportional thrusters 510 take over and the thrust system 504 transitions into thrust mode. The thrusters 510 are closed in FIG. 60.

Figure 61:
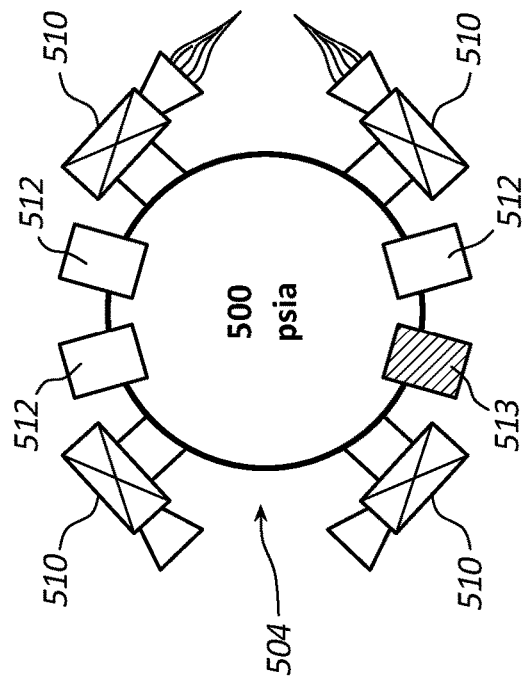

FIG. 61 shows the thrust mode of the thrust system 504. The thrusters 510 maintain the pressure at a given level such as 500 psia. The thrusters direct the hot gas to deliver a given amount of thrust (e.g., 9 lbf) in any direction. The nominal thrust duration can be any suitable period of time such as 4 seconds. The igniter barriers 524 prevent the igniter propellant grain 520 in the unspent igniters 512 from igniting. The thrust system 504 transitions to extinguishment mode.

Figure 62:
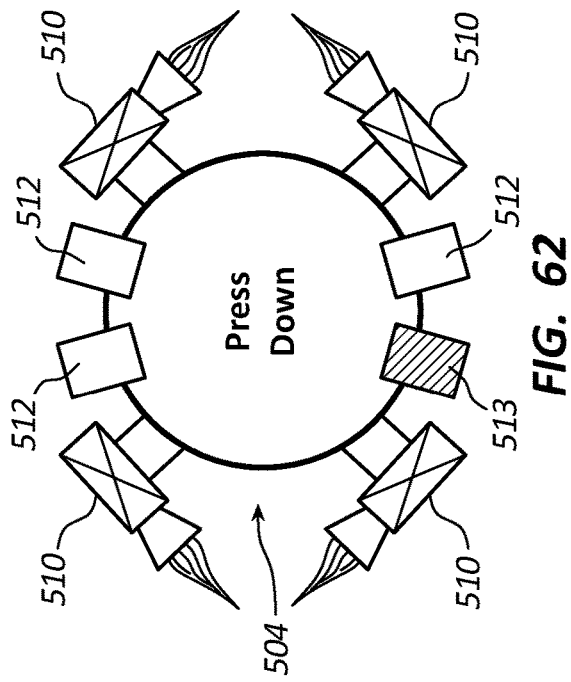

FIG. 62 shows the extinguishment mode of the thrust system 504. All of the thrusters 510 are commanded fully open. The large change in throat area and rapid depressurization rate (the rate can be the same as that disclosed for the DACS 10) extinguishes the propellant grain 514. The thrust system 504 transitions into hold mode.

Figure 63:
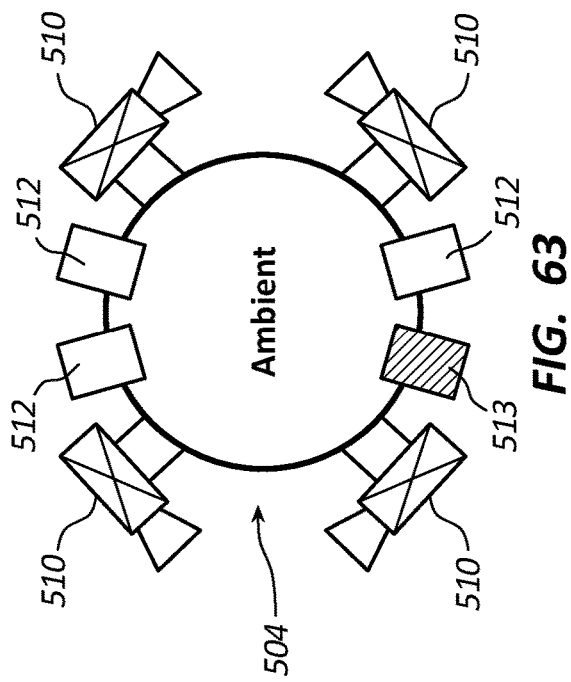

FIG. 63 shows the hold mode of the thrust system 504. During hold times, the thrusters 510 remain open. The RCS 500, 600 enters low power, idle mode. Health and functional checks may be performed in hold mode. The thrust system 504 transitions into initiation mode upon command from the launch vehicle.

In some implementations, the various RCS 500, 600 satisfy one or more of the specifications set forth below in Table 13. This design of the RCS 500, 600 may be especially suitable for use with small spacecraft used to launch satellites.

TABLE 13

Reaction Control System Specifications

| Parameter | Value |
|---|---|
| Total weight | 18 lbf |
| Packaged impulse | 230 lbf · s |
| Total burn time | 18 s |
| Pulses | 4x |
| Deliverable system thrust | 13 lbf · s |
| Avionics operation time | Duration of mission |
| Delivered thrust pulse time | ≤8 seconds per pulse |
| | ≤4 discrete pulses |
| Initiation delay | <1.5 sec to 90% design thrust |
| Initiator charge, final delivered | 450 ± 50 psia |
| Initiator barriers | Burst at 600 ± 50 psia. |
| | Seal from manifold side up to MEOP |
| Generated RCS thrust | 12 lbf |
| Delivered RCS thrust magnitude error | <2% |
| Delivered RCS thrust misalignment | <2° |
| RCS MEOP | 550 psia |
| GG dimensions | OD: 4.49 in |
| | L: 1.73 in |
| Mechanical interface | 21804-00180-01 |
| Electrical interface | 21804-00184-01 |
| Software interface | 21804-00188-01 |

EXAMPLES

The following examples are provided to further illustrate the disclosed subject matter. They should not be used to constrict or limit the scope of the claims in any way.

Example 1

Figure 20:
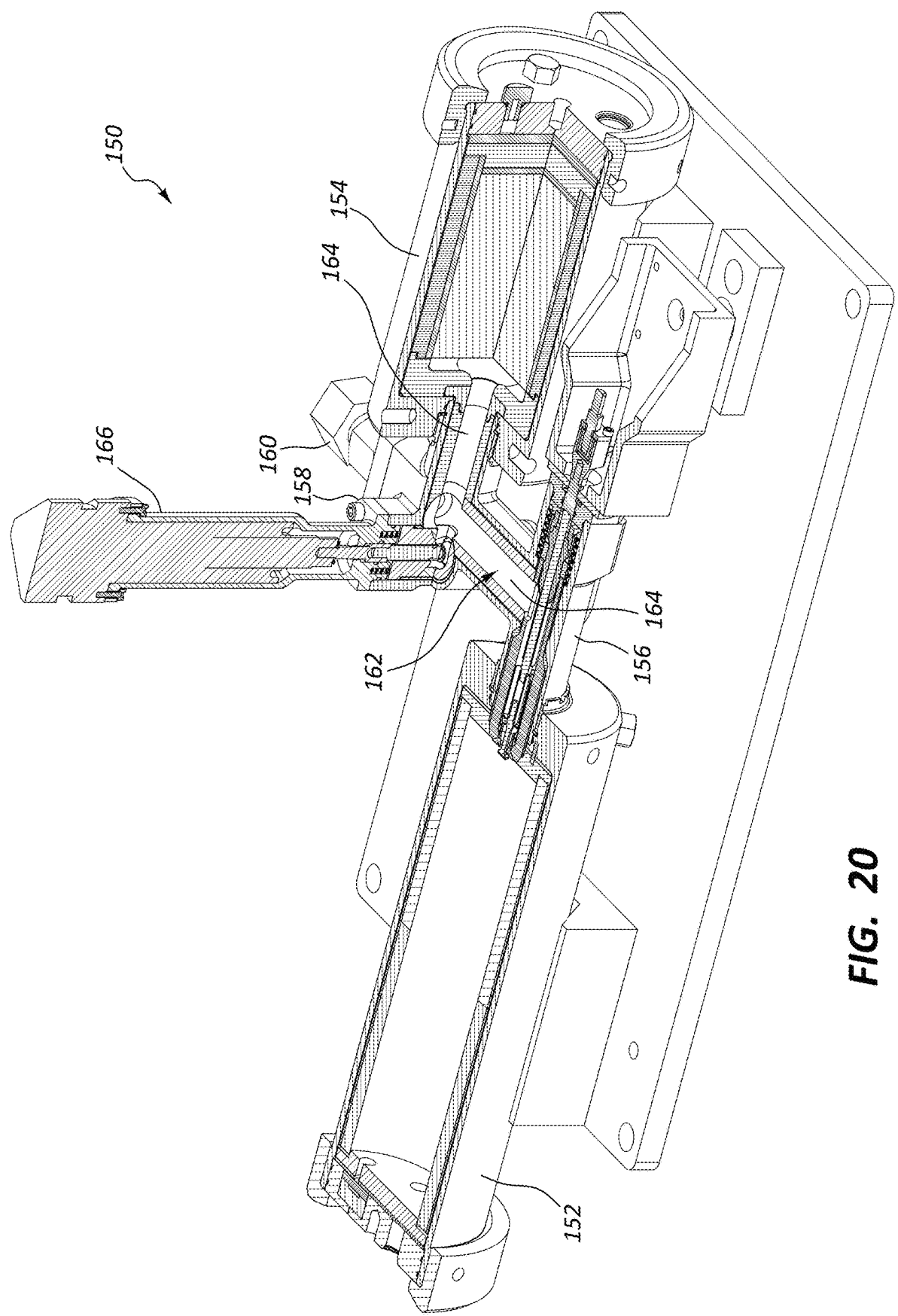
FIG. 20 is a partial cross-sectional perspective view of a prototype attitude control system. The system includes an accumulator, gas generator, an accumulator valve positioned between the accumulator and the gas generator, and a vent valve used to extinguish the gas generator.
Figure 21:
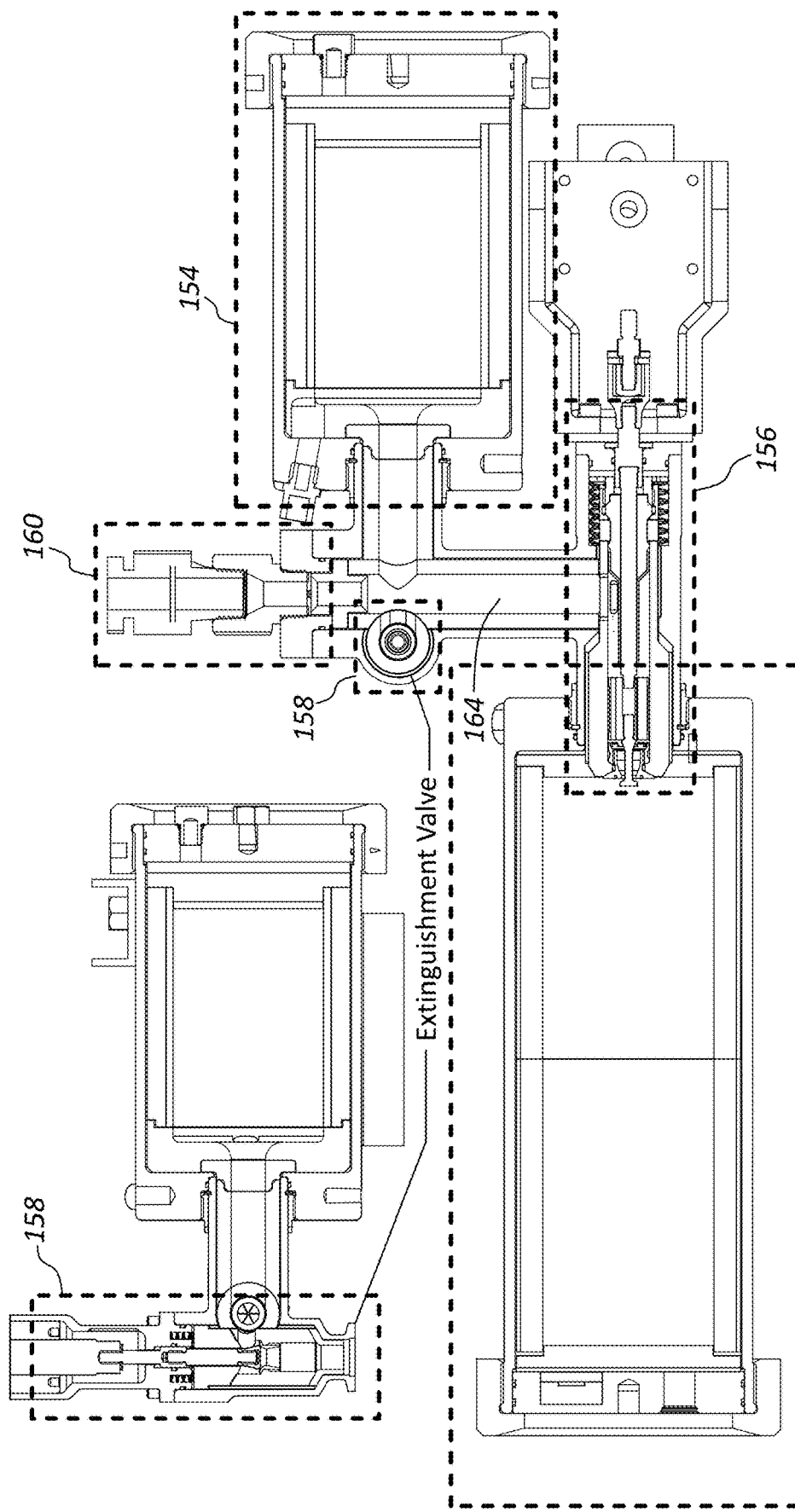
FIG. 21 is a cross-sectional top view of the prototype attitude control system with the major components delineated by dashed rectangles.

A hot fire test of a hot gas attitude control system 150 was performed using the prototype system shown in FIGS. 20-21. The prototype system 150 was used to demonstrate the feasibility of such a system when used as part of a solid propellant DACS (SDACS) for a guided missile. The hot gas attitude control system would provide hot gas to: (1) the thrusters that control the attitude of the guided missile and (2) the propellant in the divert system to ignite one or more times as part of a divert operation.

It should be noted that the prototype system 150 is not identical to a system that would be used on a guided missile. However, the components, internal materials, ballistic configuration and envelope of the prototype system 150 are representative of a flight design. Thus, the prototype hardware and associated hot fire test results can be used to assess the feasibility of flight ready low level attitude control system design such as the one shown above.

The prototype system 150 included an accumulator 152, a gas generator (GG) 154, an accumulator valve 156, a vent valve or extinguishment valve 158, an expansion port 160, and an accumulator valve housing assembly 162. The prototype system 150 also included an accumulator valve actuator (not shown) and a vent valve actuator 166. The actuators are conventional actuators used in these types of applications. The prototype system 150 included various sensors (not shown) to collect important operational characteristics such as pressure and temperature.

As shown in FIGS. 20-21, the gas generator 154, the accumulator valve 156, the vent valve 158, and the expansion port 160 were all operatively coupled to the accumulator valve housing assembly 162. The accumulator valve housing assembly 162 included a central passage 164 through which hot gas can flow between each of the attached components. The accumulator valve 156 was positioned between the accumulator 152 and the passage 164 to control the flow of hot gas to and/or from the accumulator 152.

The prototype system 150 was set up as follows. A start propellant grain was positioned in the accumulator 152 with the rest of the propellant being in the gas generator 154. The expansion port 160 was capped with a burst disk. The expansion port 160 was included so that a divert system can be coupled to the system 150 in future tests. In such a configuration, a divert system ignition valve would be coupled to the expansion port 160 to selectively and repeatedly allow hot gas into the divert system to ignite the propellant for divert operations.

Figure 24:
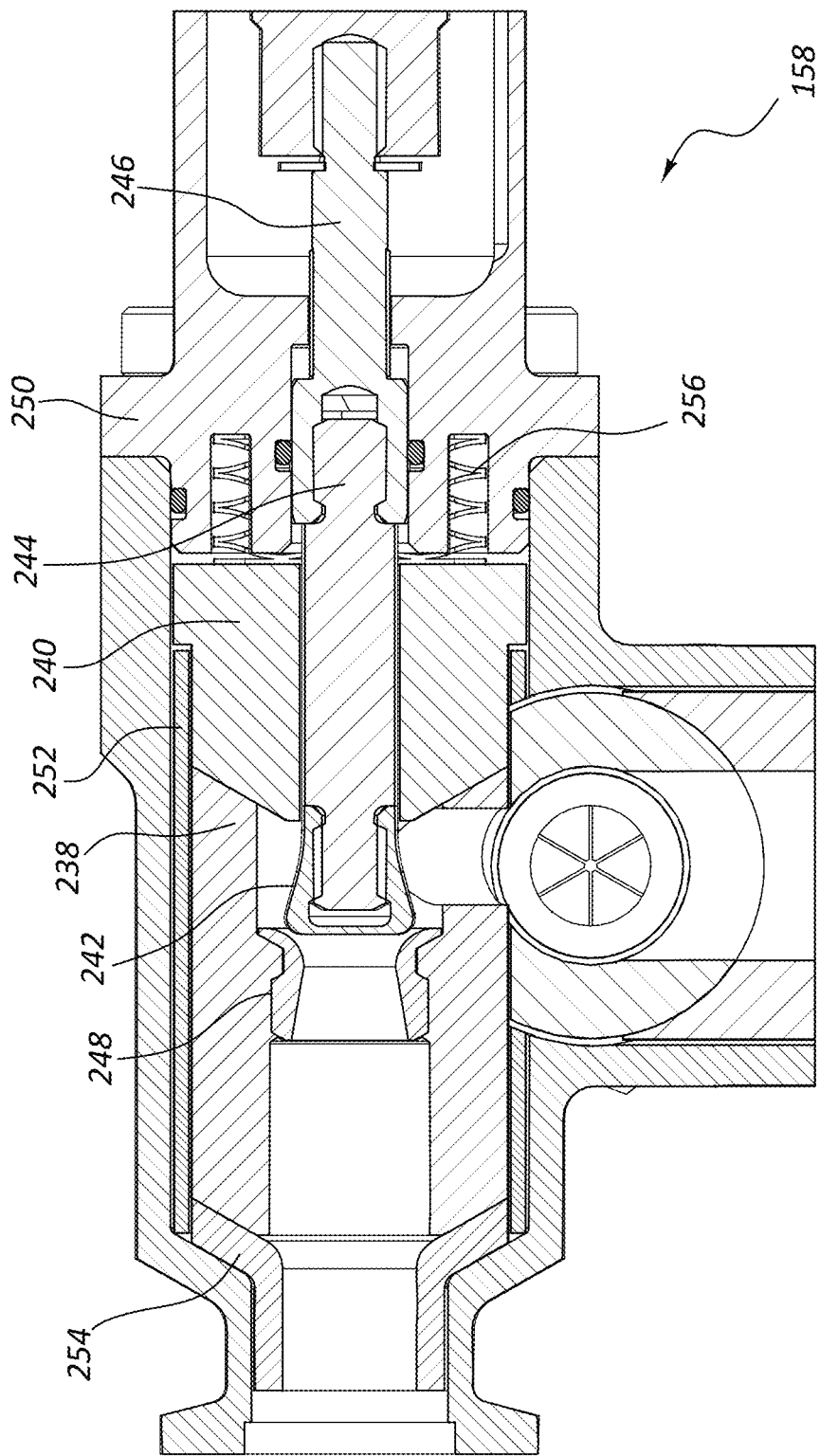
FIG. 24 is a cross-sectional view of the vent valve in the prototype attitude control system.
Figure 25:
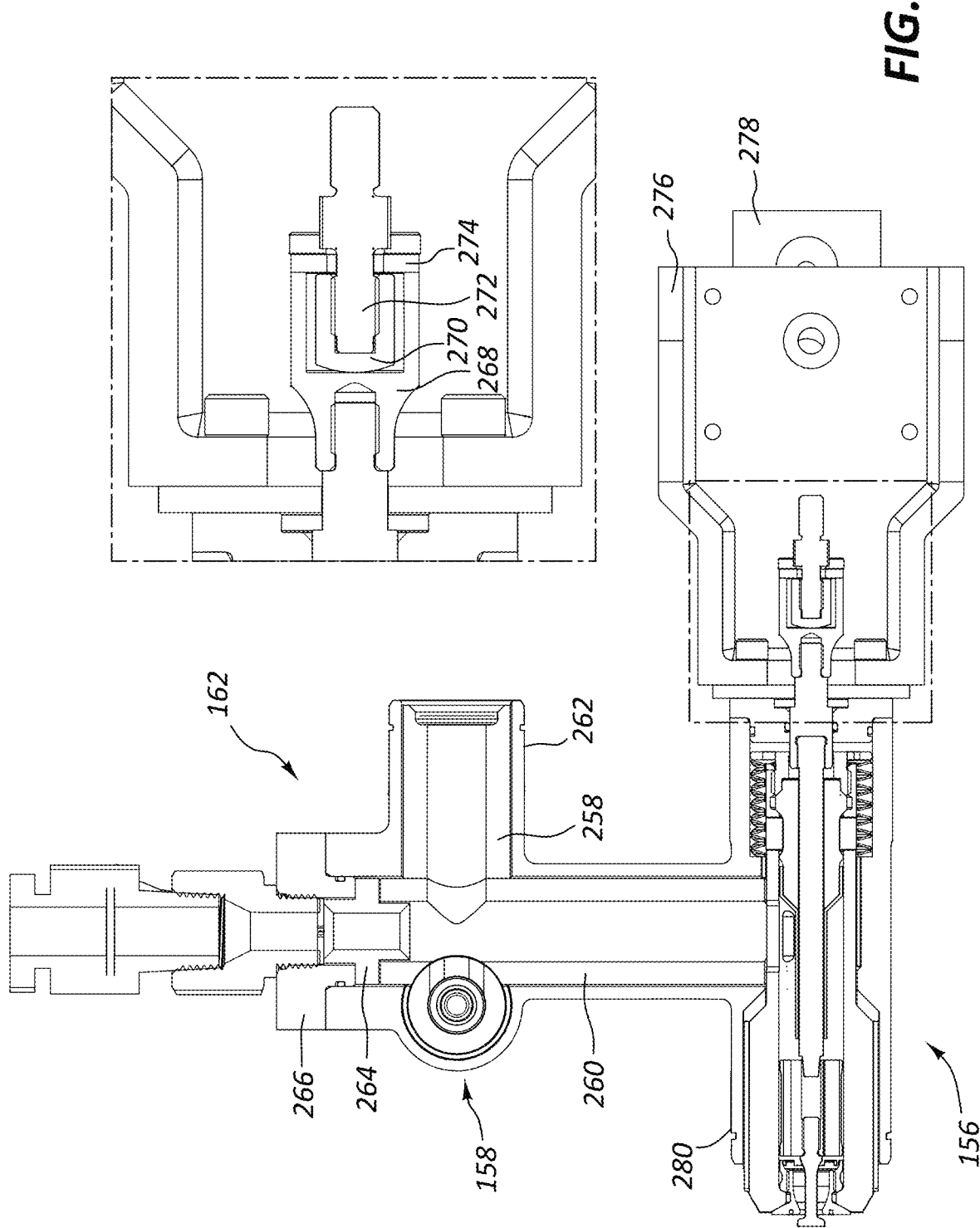
FIG. 25 is a cross-sectional view of the accumulator valve housing assembly in the prototype attitude control system.
Figure 26:
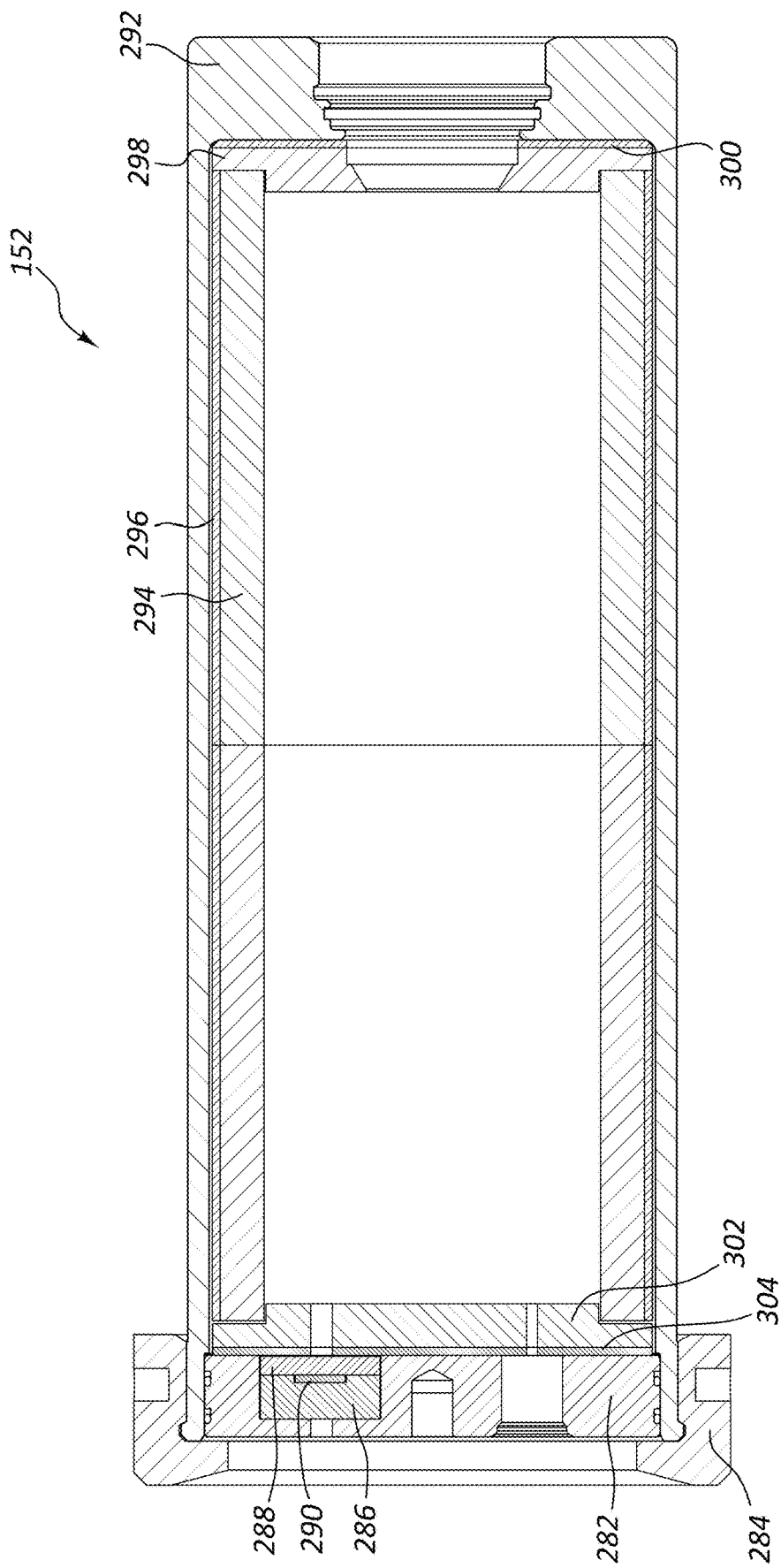
FIG. 26 is a cross-sectional view of the accumulator housing in the prototype attitude control system.

FIGS. 22-27 and Table 14 to Table 19 show the structure and materials for the accumulator 152 (FIG. 26; Table 18), gas generator 154 (FIG. 27; Table 19), accumulator valve 156 (FIGS. 22-23; Table 15), vent valve (FIG. 24; Table 16), and the accumulator valve housing assembly 162 (FIG. 25; Table 17).

TABLE 14

Description of Materials

| Material | Description |
|---|---|
| Moly | Molybdenum |
| ReMo | Rhenium molybdenum |
| 17-4 H1150 | 17-4 H1150 stainless steel alloy |
| C-ZrOC | Carbon zirconium oxide carbide ceramic matric composite |
| S-phenolic | Silica phenolic |
| C-phenolic | Carbon phenolic |
| EPDM | Ethylene propylene diene monomer (M-class) rubber |
| Inconel 718 | Nickel chromium alloy |
| 300 Series | 300 series austenitic stainless steel |
| Garolite | Reinforced phenolic material |
| Garolite CE | Medium weave cotton cloth phenolic |

TABLE 15

Figure 22:
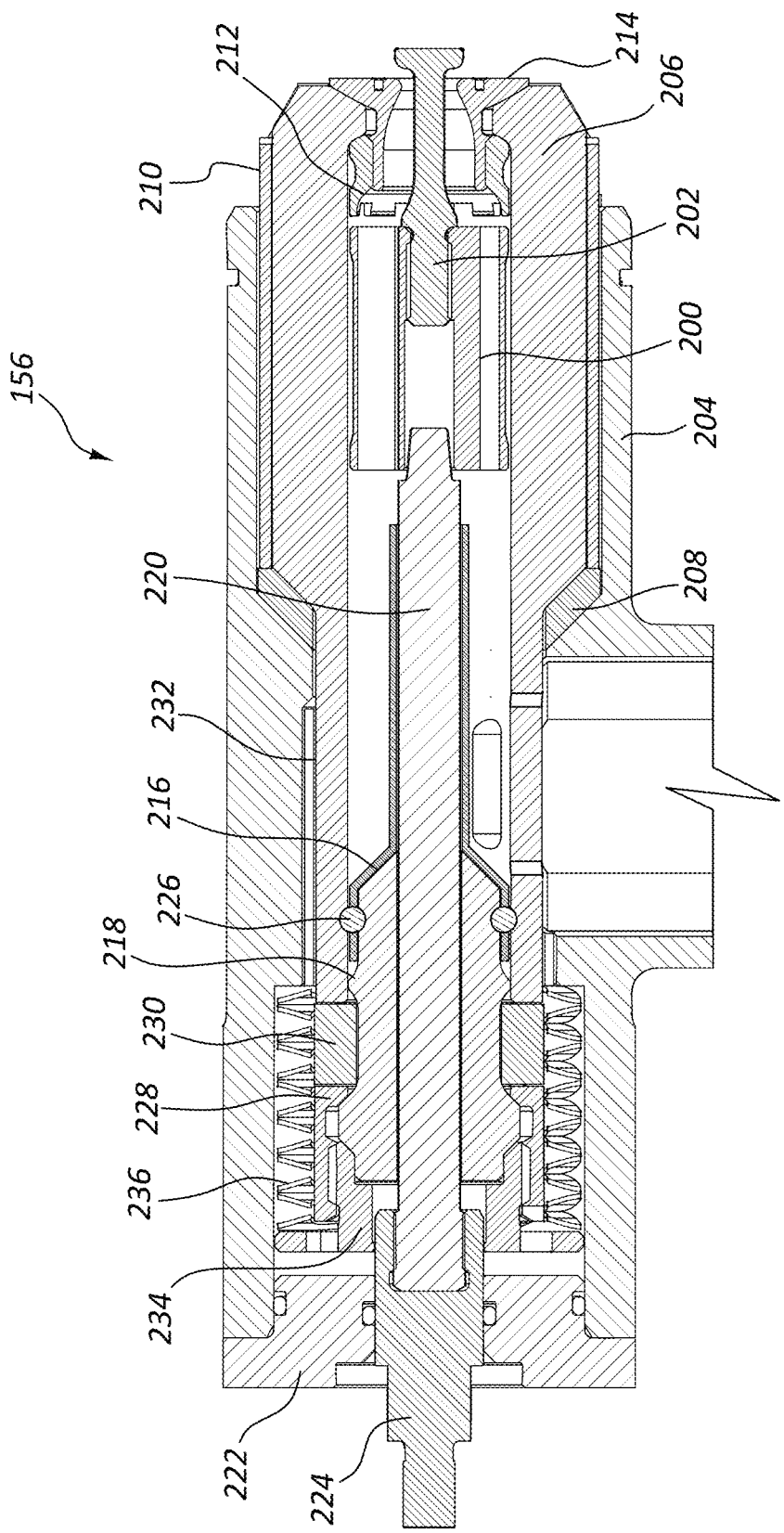
FIG. 22 is a cross-sectional view of the accumulator valve in the prototype attitude control system.
Figure 23:
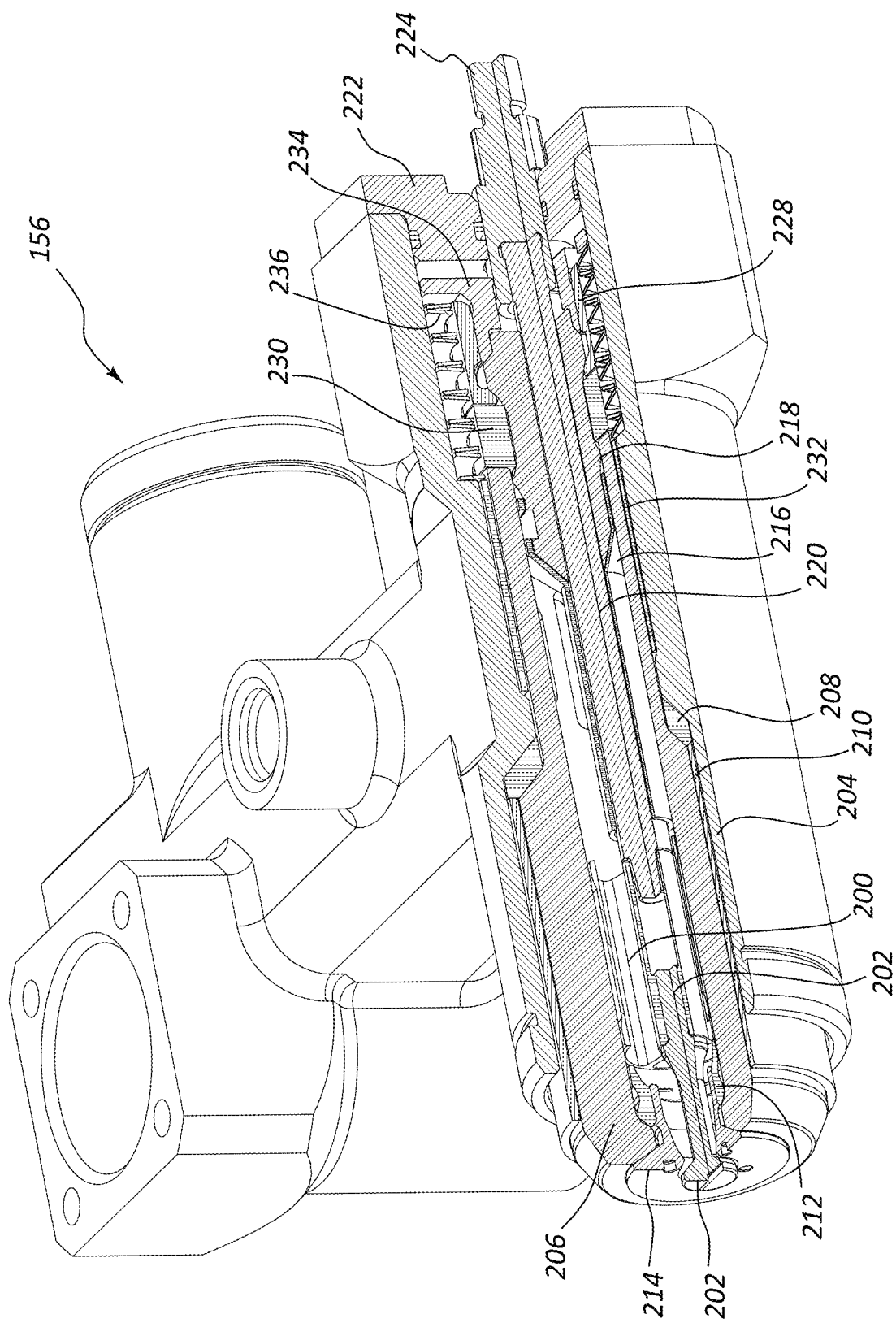
FIG. 23 is a partial cross-sectional perspective view of the accumulator valve in the prototype attitude control system.

Accumulator Valve Materials (FIGS. 22-23)

| Ref. No. | Name | Material |
|---|---|---|
| 200 | Poppet guide | Moly |
| 202 | Poppet | ReMo |
| 204 | Housing | 17-4 H1150 |
| 206 | Valve body | C-ZrOC |
| 208 | Conic seal | S-phenolic |
| 210 | Valve body insulator | EPDM |
| 212 | Throat retainer | Moly |
| 214 | Throat | ReMo |
| 216 | Shaft shield | Moly |
| 218 | Standoff insulator | C-ZrOC |
| 220 | Accumulator shaft | C-ZrOC |
| 222 | Actuator closure | 17-4 H1150 |
| 224 | Actuator adapter | Inconel 718 |
| 226 | Retaining pin | Tungsten |
| 228 | Retainer nut | Inconel 718 |
| 230 | Retainer insulator | S-phenolic |
| 232 | Collar insulator | S-phenolic |
| 234 | Collar retainer | Inconel 718 |
| 236 | Wavespring | |

TABLE 16

Vent Valve Materials (FIG. 24)

| Ref. No. | Name | Material |
|---|---|---|
| 238 | Vent valve body | C-ZrOC |
| 240 | Vent plenum insulator | S-phenolic |
| 242 | Vent poppet | ReMo |
| 244 | Vent shaft | C-ZrOC |
| 246 | Vent actuator adapter | Inconel 718 |
| 248 | Vent throat | ReMo |
| 250 | Vent seal closure | 17-4 H1150 |
| 252 | Vent valve body insulator | EPDM |
| 254 | Vacuum tube insulator | S-phenolic |
| 256 | Wavespring | |

TABLE 17

Accumulator Valve Housing Assembly Materials (FIG. 25)

| Ref. No. | Name | Material |
|---|---|---|
| 258 | GG inlet insulator | S-phenolic |
| 260 | Gas tube insulator | S-phenolic |
| 262 | GG castle nut | 300 series |
| 264 | Burst disk insulator | S-phenolic |
| 266 | Burst disk closure | 17-4 H1150 |
| 268 | Centering housing | 300 series |
| 270 | Centering bullet | 300 series |
| 272 | Centering shaft | 300 series |
| 274 | Centering bracket | 300 series |
| 276 | Actuator bracket | Aluminum |
| 278 | Actuator base | Aluminum |
| 280 | Accumulator castle nut | 300 series |

TABLE 18

Accumulator Materials (FIG. 26)

| Ref. No. | Name | Material |
|---|---|---|
| 282 | Accumulator closure | 17-4 H1150 |
| 284 | End cap | 17-4 H1150 |
| 286 | Bleed orifice insulator | C-phenolic |

TABLE 18-continued

Accumulator Materials (FIG. 26)

| Ref. No. | Name | Material |
|---|---|---|
| 288 | Orifice entrance insulator | C-phenolic |
| 290 | Bleed orifice | Moly |
| 292 | Accumulator chamber | 17-4 H1150 |
| 294 | Case sleeve insulator assembly | EPDM |
| 296 | Case sleeve | Garolite |
| 298 | Front plate insulator assembly | EPDM |
| 300 | Front plate | Garolite CE |
| 302 | Rear plate insulator assembly | EPDM |
| 304 | Rear plate | Garolite |

TABLE 19

Figure 27:
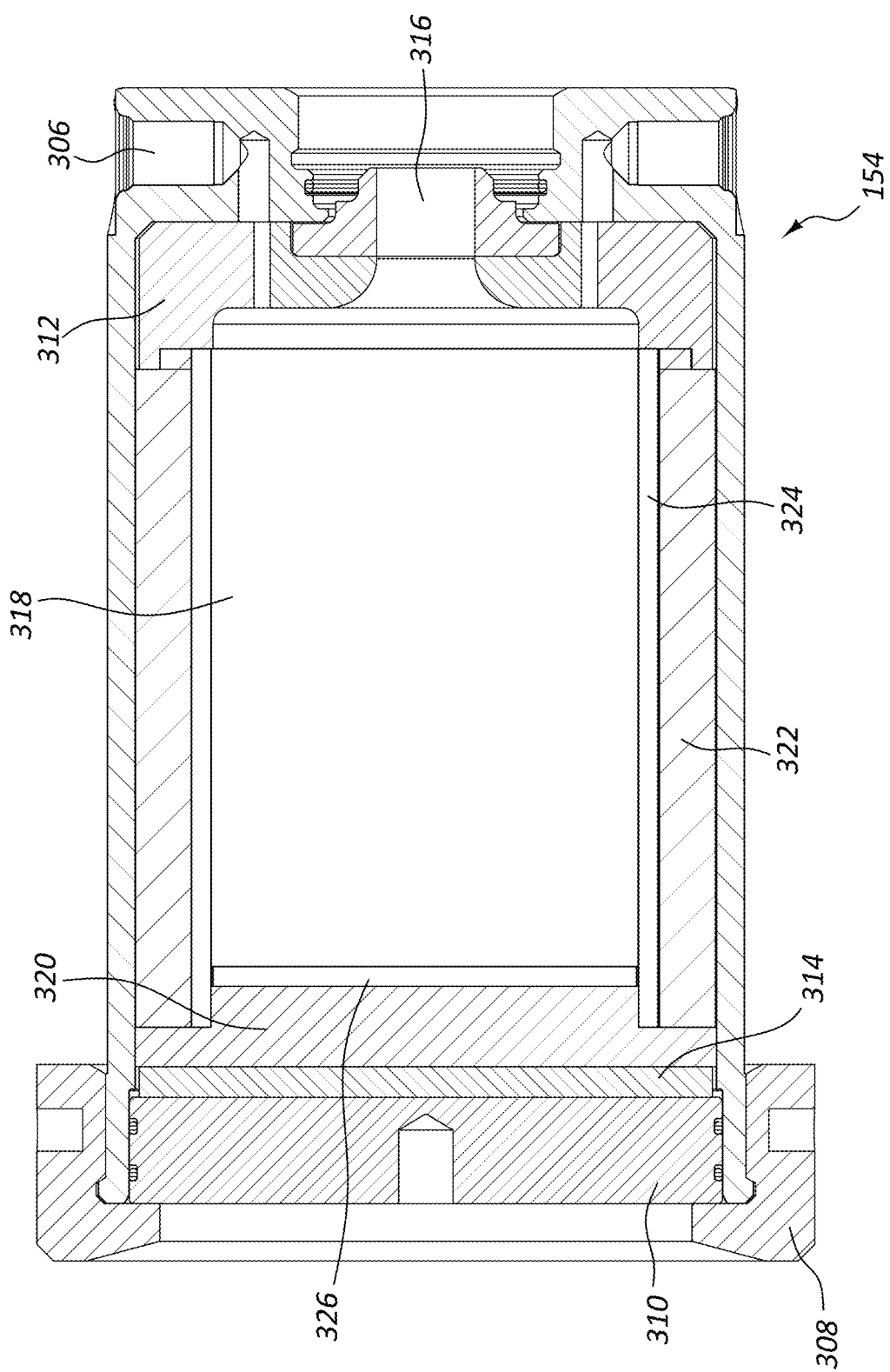
FIG. 27 is a cross-sectional view of the gas generator in the prototype attitude control system.

Gas Generator Materials (FIG. 27)

| Ref. No. | Name | Material |
|---|---|---|
| 306 | GG chamber | 17-4 H1150 |
| 308 | End cap | 17-4 H1150 |
| 310 | GG closure | 17-4 H1150 |
| 312 | GG forward insulator | C-phenolic |
| 314 | GG rear shim insulator | Garolite CE |
| 316 | GG tuber spacer insulator | S-phenolic |
| 318 | Propellant cup | AAP-3797 |
| 320 | GG propellant base | Garolite CE |
| 322 | GG propellant sleeve | Garolite CE |
| 324 | Propellant cup insulator sleeve | EPDM |
| 326 | Propellant cup insulator base | EPDM |

The accumulator valve body 206 had a 0.300 inch wall thickness and was designed to withstand a maximum expected operating pressure of 2,250 psia and a maximum operating temperature of 2,000° F. The other components in the prototype system 150 were designed to withstand a maximum expected operating pressure of 3,500 psia. This meant that the C—ZrOC components drove the design of the other structures.

The accumulator valve body 206 and the vent valve body 238 were coated with 0.0010±0.0005 inch of silicon carbide (SiC) to prevent hot gas from flowing through these components. The valve bodies 206, 238 are made of C—ZrOC, which is inherently porous. Hot gas can leak through these parts when they are pressurized. The SiC coating helps prevent hot gas from leaking. Also, the hot fire tests revealed that the particles in the hot gas also help to plug and seal the pores in the C—ZrOC components.

The hot fire test had the following primary objectives: (1) demonstrate operation of the accumulator valve 156 for 200 s, (2) demonstrate operation of the accumulator valve poppet 202, control system, and gas flow operations, and (3) demonstrate basic propellant operations including ignition, extinguishment, and reignition. The hot fire test had the following secondary objectives: (1) demonstrate basic ballistics, (2) measure burnback of the propellant, pressure drops, and performance of the accumulator 152, (3) demonstrate control logic, and (4) demonstrate rack operation, vacuum, and ignition system.

The prototype system 150 was configured to operate in the following manner. An initial start propellant grain is ignited in the accumulator 152 with the accumulator valve 156 closed. The pressure rises in the accumulator until it exceeds 1,260 psia. At this point, the controller initiates a recharge event by opening the accumulator valve 156 and allowing hot gas to enter the gas generator 154 and ignite the propellant 318.

The hot gas flows from the gas generator 154 to the accumulator 152 until it reaches a pressure of 1900 psia. The gas generator 154 is extinguished by closing the accumulator valve 156 and opening the vent valve 158. The pressure drops in the accumulator 152 as hot gas exits through the bleed orifice 290. Another recharge event is initiated when one of the following events occurs: (1) the pressure reaches a minimum level in the accumulator 152 or (2) ten seconds have elapsed. The minimum pressure level in the accumulator 152 was set at 1,000 psia for the first three recharges and 500 psia thereafter. The hot fire test is conducted under conditions that simulate high altitude >50,000 ft and temperatures of 40-90° F.

Before the hot fire test, the prototype system 150 was pressure and leak tested using inert gas. The accumulator valve 156 was tested to verify that it moved accurately and without issues. The other hardware in the prototype system 150 was tested to verify that its performance was acceptable for the purposes of the test. The propellant 318 was X-rayed to ensure no cracks or voids existed in the grains which could cause unintended consequences during a test. The prototype system 150 was secured inside a modified magazine.

Figure 28:
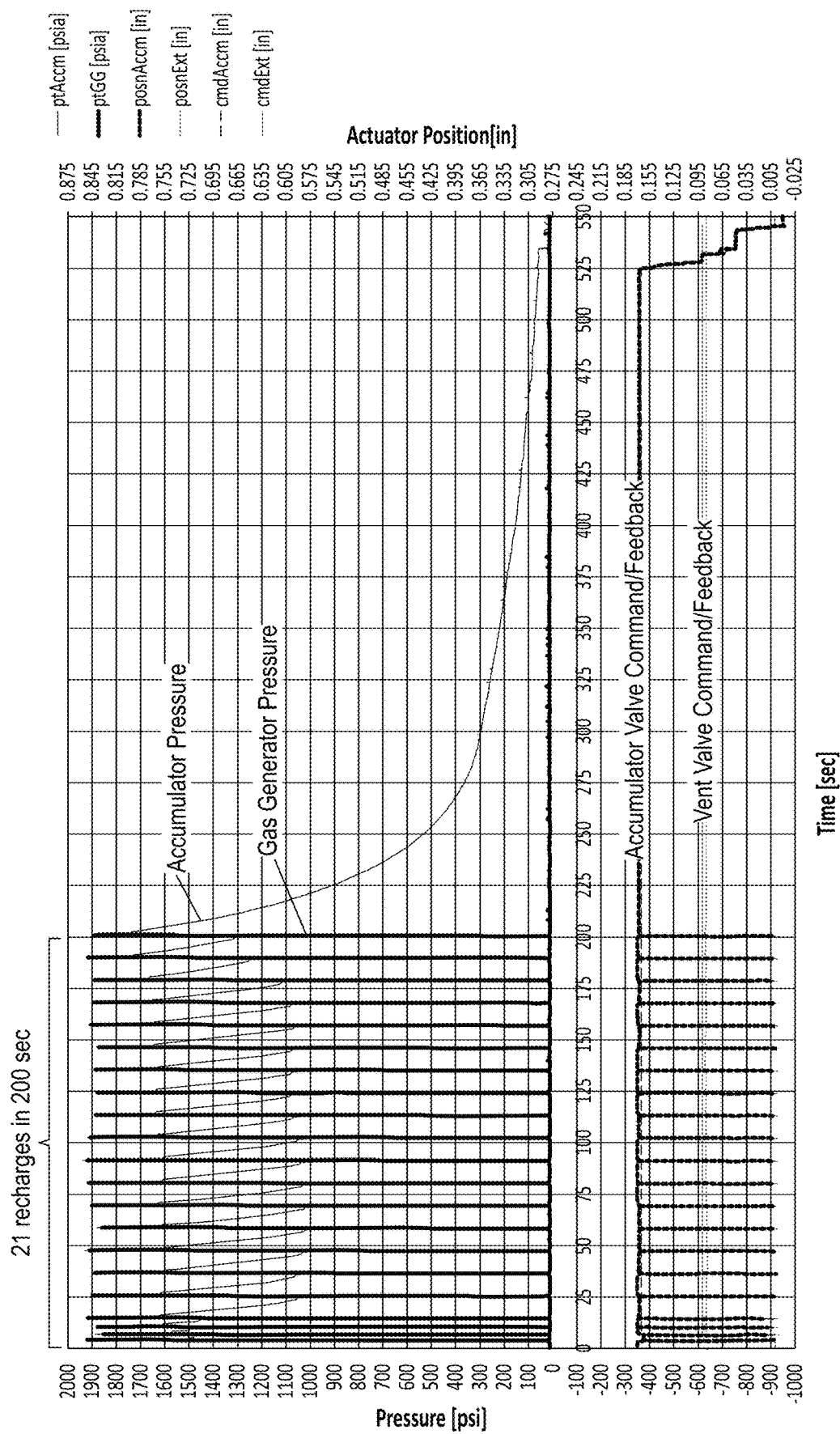
FIG. 28 is a graph of the test data produced by a first hot fire of the prototype attitude control system. The graph shows the pressure in the accumulator and gas generator as well as the actuation of the accumulator valve and the vent valve.

FIG. 28 shows the test data in its completeness and, for all intent and purposes, indicates no major anomalies. The initial pressurization charge in the accumulator 152 successfully triggered the software controller and started a series of recharges. The first three recharges are pressure triggered when the accumulator reaches approximately 1,400 psia. The remaining recharges occurred after the ten second timeout period elapsed. In total, twenty one recharges occurred in the specified 200 second mission time, and afterward pressure in the accumulator was held for an addition 300 seconds.

Figure 29:
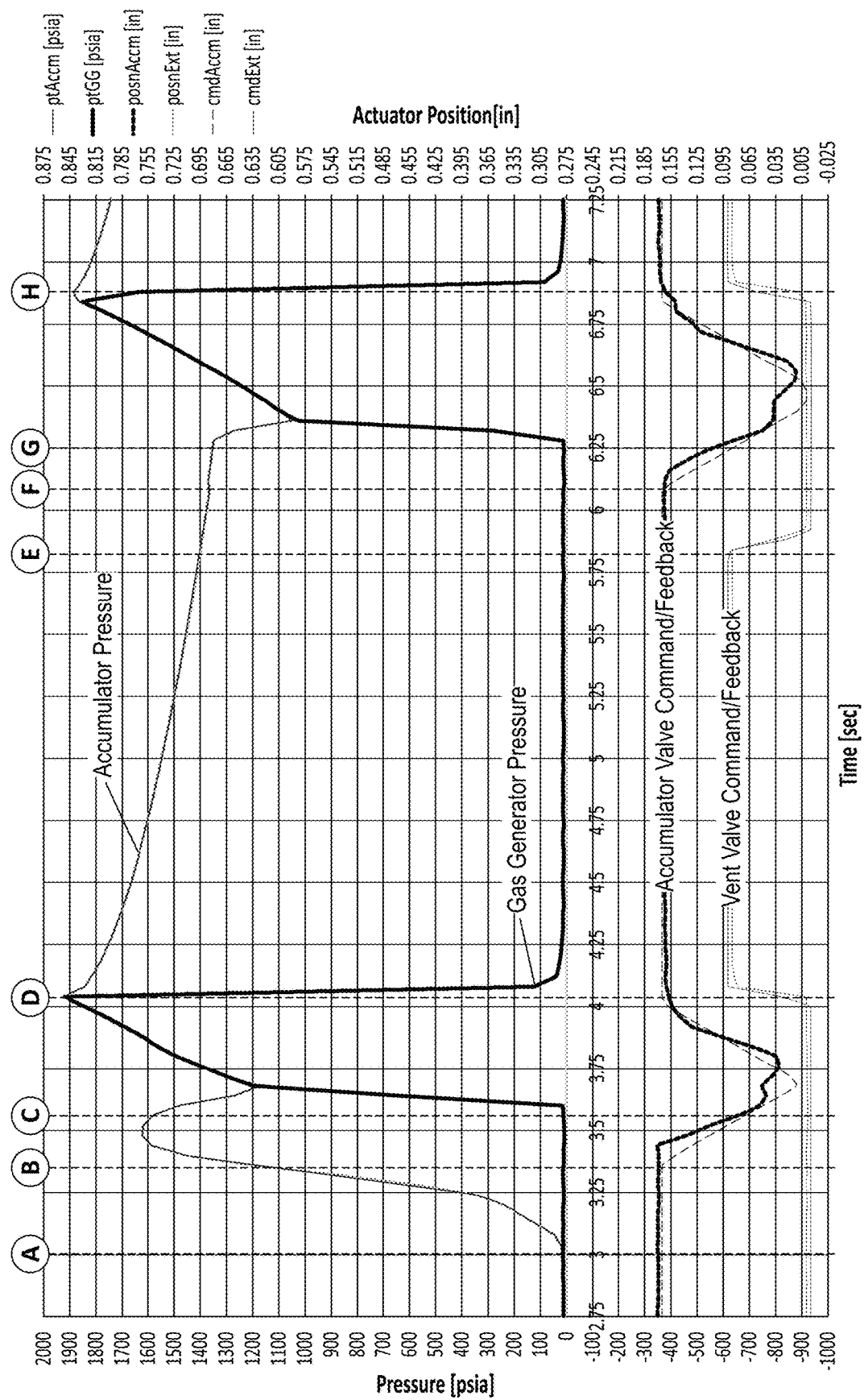
FIG. 29 is a detailed graph of the data in FIG. 28 for the first 7.25 seconds of the hot fire test, which includes the initial pressurization and first recharge of the accumulator.

The pressure in the prototype system 150 stayed well below the maximum expected operating pressure and peaked at 1,941 psia. FIG. 29 shows a detailed record of the initial pressurization and first recharge. The major events are denoted by vertical lines A though H and described as follows.

Event A in FIG. 29 denotes the ignition of the accumulator charge and initial pressurization of the accumulator. At T-0 seconds, power was applied to the nichrome wire to initiate heating of the accumulator pressurization propellant. It took approximately 3.0 seconds for the wire to reach a critical temperature and ignite the initial propellant charge. Within 0.25 seconds, the pressure in the accumulator 152 rapidly increased thereby indicating that the propellant charge was fully ignited.

Event B occurred at T+3.40 seconds. At this point, the pressure in the accumulator 152 exceeded the 1,260 psia threshold and activated the test controller. The test was now running in closed-loop operation. Simultaneously, the controller initiated a recharge event and commanded the accumulator valve 156 to open at the specified 0.5 in/s slew rate.

Event C occurred at T+3.64 seconds. At this point, the accumulator valve 156 reached a critical position, approximately 0.055 inches, and hot gas backflowed from the accumulator 152 to the gas generator 154. The accumulator shaft 220 deflected a small amount due to the increased pressure load. Within 0.060 seconds, the pressure in the accumulator 152 and the gas generator 154 equalized and the burning propellant 318 began to increase the pressure in the accumulator 152.

Event D occurred at T+4.04 seconds. At this point, the pressure in the accumulator 152 reaches the 1,900 psia trigger. The controller commanded the vent valve 158 to begin opening. By T+4.24 the pressure in the gas generator 154 dropped back to ambient and the pressure in the accumulator 152 sealed the poppet 202 closed. For the next several seconds the pressure in the accumulator 152 was steadily exhausted through the bleed orifice 290.

Event E occurred at T+5.84 seconds. At this point, the pressure in the accumulator 152 reached 1,400 psia and the vent valve 158 started to close to initiate a recharge event. It should be noted that the 1,400 psia limit was intentionally set higher than the 1,000 psia desired recharge pressure so that the vent valve 158 was closed for a short amount of time to determine if the propellant 318 was smoldering. The pressure in the gas generator 154 between event E and F remained steady at approximately 0 psia, meaning the grain was fully extinguished.

Event F occurred at T+6.08 seconds. At this point, a 0.25 second timeout occurs and the accumulator valve 156 was forced to start opening even though the pressure in the accumulator 152 is well above 1,000 psia at 1,380 psia. This was partially due to an inaccurate bleed-down rate—the pressure was expected to have dropped significantly more due to heat transfer to the walls and mass loss through the bleed orifice 290. Audio recording obtained as part of the test data revealed a periodic "whistling" from the bleed orifice 290 that fluctuated in intensity and indicated a partial clog. This partially explained why the pressure did not drop as fast as predicted.

Event G occurred at T+6.32 seconds. At this point, the accumulator poppet 202 opened to the critical position and allowed hot gas from the accumulator 152 to backflow into the gas generator 154 to initiate a recharge.

Event H occurred at T+6.88 seconds. At this point, the accumulator reached the 1,900 psia trigger and the process of extinguishing the gas generator 154 began. From here, the general pattern repeated itself successively. It should be noted that clogging of the bleed orifice 290 became more evident as the test continued. FIG. 29 shows that the pressure in the accumulator 152 at recharge slowly increased from approximately 1,000 psia up to 1,300 psia by the end of the test. The audio recording also confirmed that the "whistling" from the bleed orifice 290 was not as audible.

The hot fire test completely fulfilled all of the primary and secondary test objectives. The performance of the actuator for the accumulator valve 156 was in line with expectations and the control algorithm kept the pressure in the accumulator 152 below the maximum expected operating pressure. The clog in the bleed orifice 290 caused ten second timeouts and recharges for the majority of the test. Because of this, the pressure in the accumulator 152 never dropped below the 500 psia threshold.

Example 2

A hot fire test of the hot gas attitude control system 150 was performed using the prototype system shown in FIGS. 20-21 with a modified duty cycle. The goal of this test was to extend the duty cycle to 300+ seconds by increasing the time between recharges. The prototype system 150 was largely the same as in Example 1 except that some of the sensors and instrumentation were upgraded. Prior to running the test, the hardware was tested using the same procedures described above in Example 1.

Figure 30:
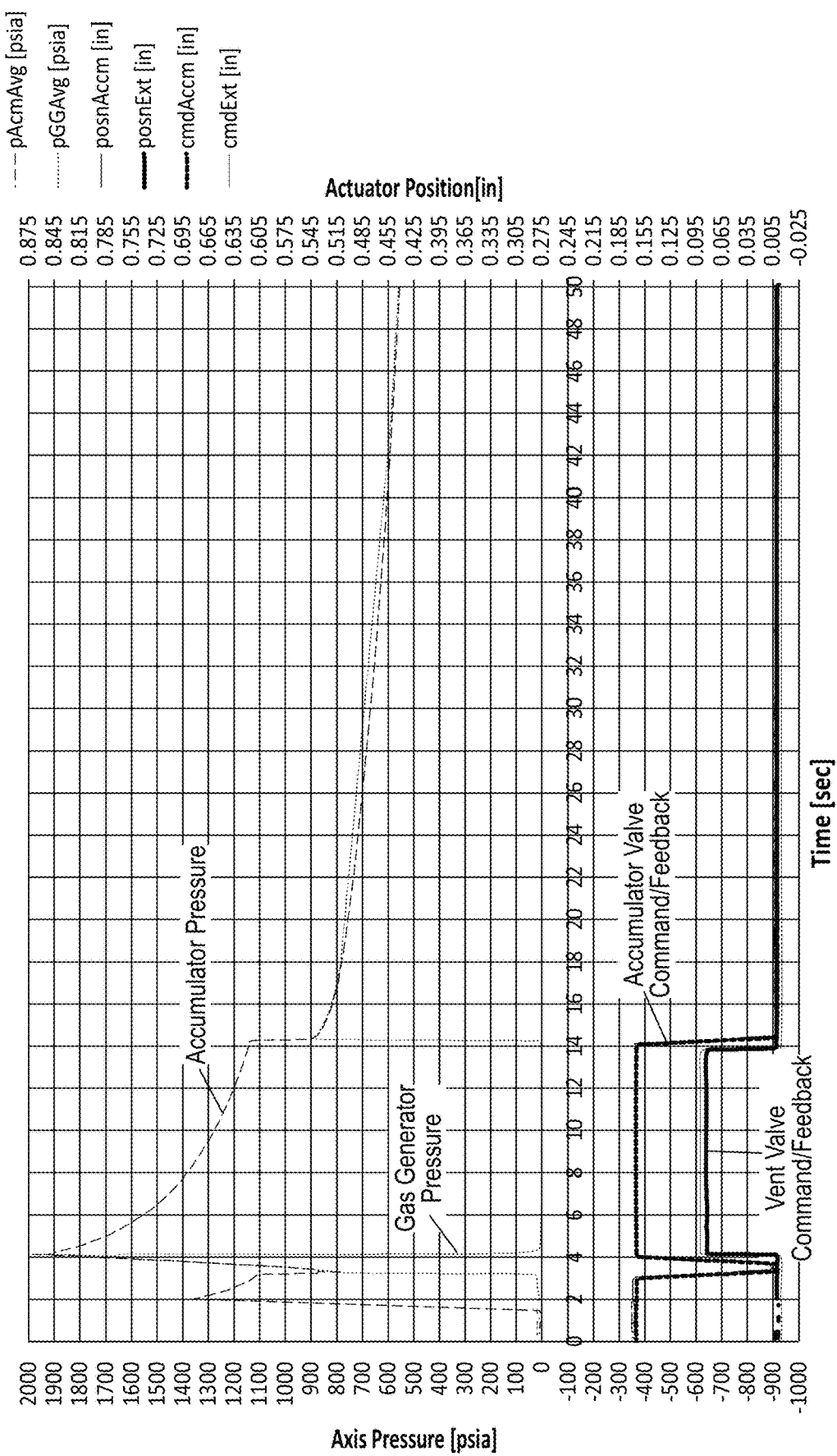
FIG. 30 is a graph of the test data produced by a second hot fire of the prototype attitude control system. The graph shows the pressure in the accumulator and gas generator as well as the actuation of the accumulator valve and the vent valve.

FIG. 30 shows the results of hot fire test. This test did not meet its primary objective of demonstrating multiple recharges in a 300 second duty cycle. As shown in FIG. 30, the initial propellant charge pressurized the accumulator 152 to approximately 1,350 psia and activated the controller at approximately T+2 seconds. The pressure in the accumulator 152 dropped to 1,125 psia at approximately T+3 seconds and initiated a recharge sequence (i.e., accumulator valve 156 was opened) that ignited the propellant 318 in the gas generator 154. The propellant 318 in the gas generator burned until the pressure in the accumulator 152 reached 1,975 psia at approximately T+4 seconds. The pressure in the accumulator 152 was allowed to bleed down for approximately 10 seconds to 1,125 psia when another recharge sequence started.

FIG. 30 shows that the pressure in the gas generator 154 rapidly reached equilibrium with the pressure in the accumulator 152 but there is no indication that the propellant 318 reignited. The accumulator valve 156 remained open and the test continued for approximately 380 seconds without the propellant 318 reigniting.

After evaluating the thermal test date, the cause of the reignition failure is believed to be the ten second dwell time between the last ignition and the subsequent ignition attempt. The prototype system 150 has a large thermal mass that absorbed too much of the heat between the first ignition event and the subsequent failed reignition attempt. The temperature of the hot gas was too low at the time of the failed reignition event to ignite the propellant 318.

Despite the failed reignition, the control logic continued to operate nominally. The controller recognized that it failed to ignite and continued to command a recharge until the test was manually stopped.

Example 3

A hot fire test of the hot gas attitude control system 150 was performed using the prototype system shown in FIGS. 20-21 to correct the problems identified in Example 2 and extend the duty cycle to 500+ seconds. The prototype system 150 was largely the same as in Example 2. Prior to running the test, the hardware was tested using the same procedures described above in Example 1.

The duty cycle was modified in the following ways based on the test in Example 2. The pressure level at which the accumulator 152 would trigger a recharge was changed from 1,125 psia back to 1,400 psia (what it was in Example 1). The duty cycle was modified to include a warm-up period where the first three recharges are subject to a 2.5, 3.0, and 3.5 second timeout. What this means is that the first recharge would be initiated after 2.5 seconds, the second after 3.0 seconds, and the third after 3.5 seconds regardless whether the pressure in the accumulator 152 had dropped below the low pressure level.

After the warm-up period the duty cycle was set to revert to a ten second timeout for the first minute of the test. After the first minute, the recharge timeouts were gradually increased from 10 seconds to 25 seconds. After 325 seconds, the control logic transitioned into an extended mission mode where the recharge timeout and minimum pressure recharge trigger were set aggressively to 45 seconds and 750 psia, respectively. The test was set to run indefinitely until it was manually stopped.

Figure 31:
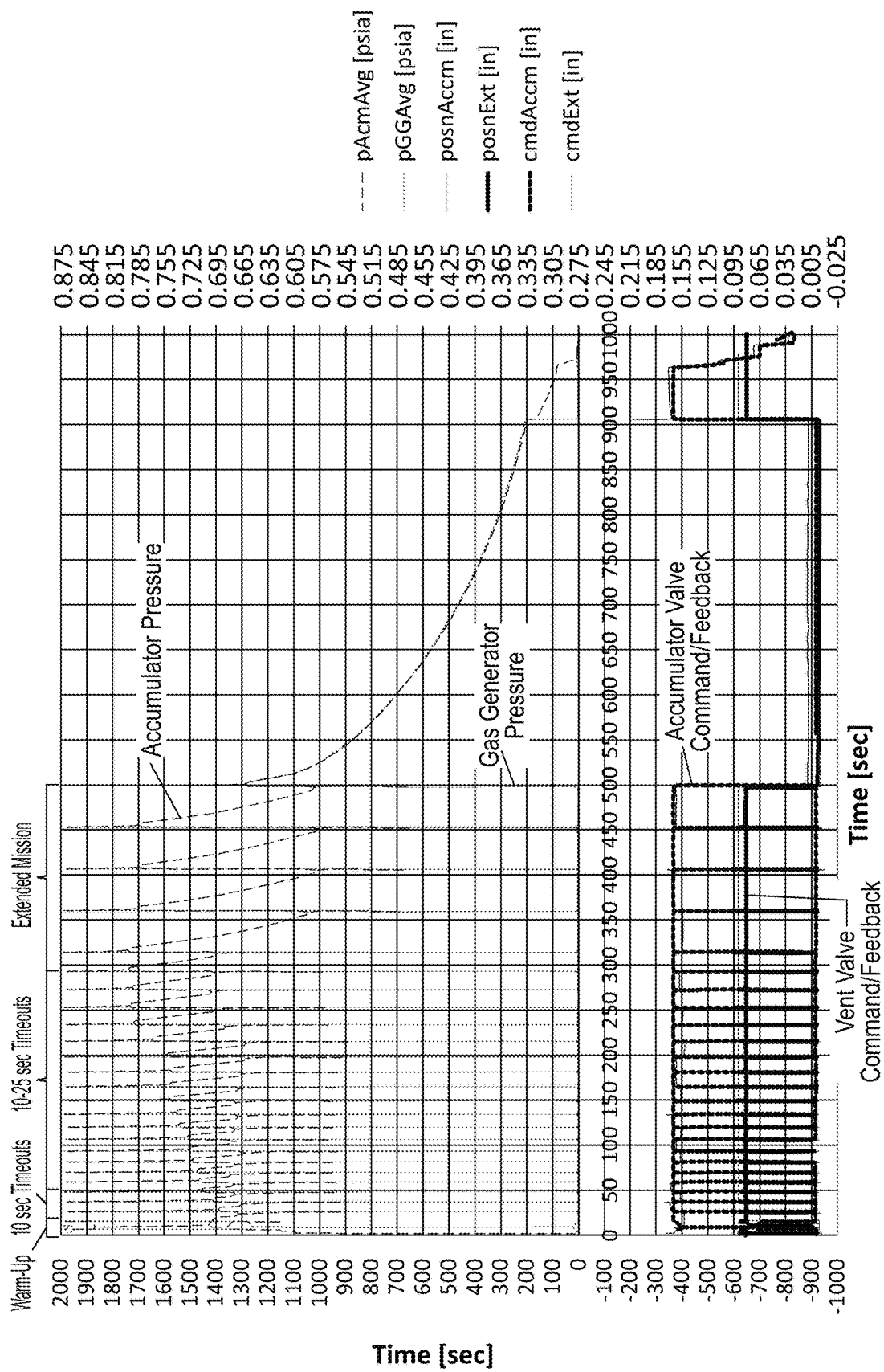
FIG. 31 is a graph of the test data produced by a third hot fire of the prototype attitude control system. The graph shows the pressure in the accumulator and gas generator as well as the actuation of the accumulator valve and the vent valve.

The results of the hot fire test are shown in FIG. 31. The modifications to the duty cycle successfully extended the operational time to 500+ seconds. The first sixty seconds of the duty cycle in this test match closely the same data from the test in Example 1. This duty cycle does a good job of thermally conditioning the system 150 as shown by the fact that all subsequent recharges occurred without incident.

At T+325 seconds the test successfully demonstrated the capability of performing four recharges 45 seconds apart before running out of the propellant 318 midway through a recharge at T+500 seconds. When the propellant rant out, the accumulator valve 156 was retracted and the hot gas inside the accumulator 152 was held for an additional 400 seconds for a total mission time of 900 seconds. During this time, the pressure in the accumulator 152 gradually decayed at an average rate of approximately −3.25 psi/s due to a partial clog in the bleed orifice 290. At T+905, the test was stopped and the pressure was vented from the system 150. It should be noted that the peak pressure during all the recharges stayed below 1,986 psia, which is only slightly above the target pressure of 1,975 psia and well below the 2,500 psia maximum expected operating pressure.

This test consumed the entire propellant grain in an effort to demonstrate the maximum capability of the system 150. Assuming a targeted flight-$I_{sp}$ of 185 sec, the full 1.1 lbm of propellant 318 is equivalent to 204 lbf·s of impulse through one valve. This is a substantial improvement over the target amount of only 100 lbf·s of impulse over 300 seconds of operation.

The hot fire test satisfied all primary and secondary objectives. The system 150 demonstrated 24 recharges spanning a 325 second time frame by revising the initial duty cycle to match the previously successful test in Example 1. Afterward, the system 150 used aggressive recharge timeouts and pressure triggers to demonstrate an additional four recharges with 45 second dwell times. The current system 150 and especially the accumulator valve 156 show that it has a substantial margin for error. This shows that there is an opportunity to significantly reduce the weight of the system 150 and/or implement duty cycles well in excess of 500 seconds and 200 lbf·s of impulse through a single valve.

Example 4

Figure 32:
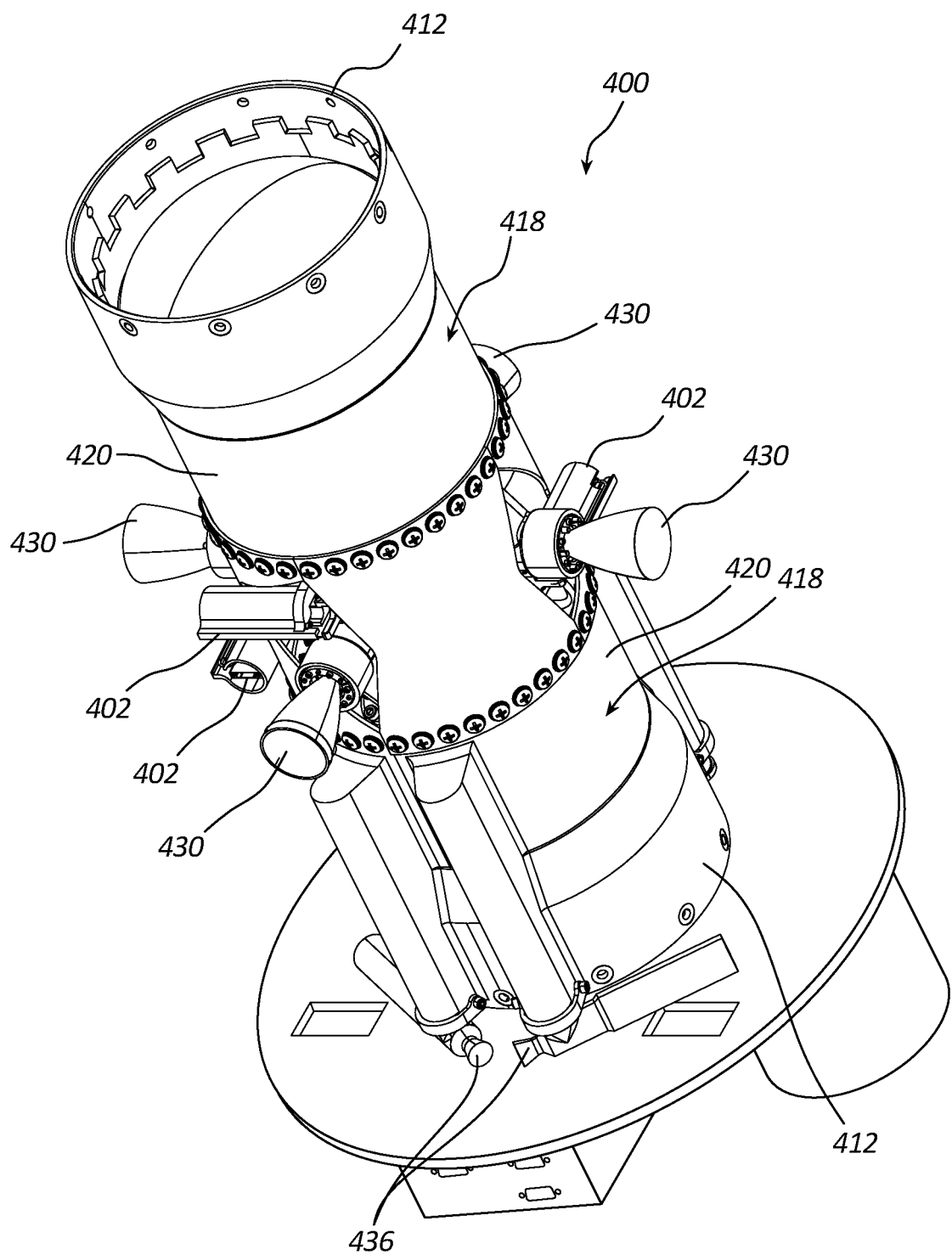
FIGS. 32 and 33 are perspective views of a prototype divert system from the forward end and aft end, respectively.
Figure 33:
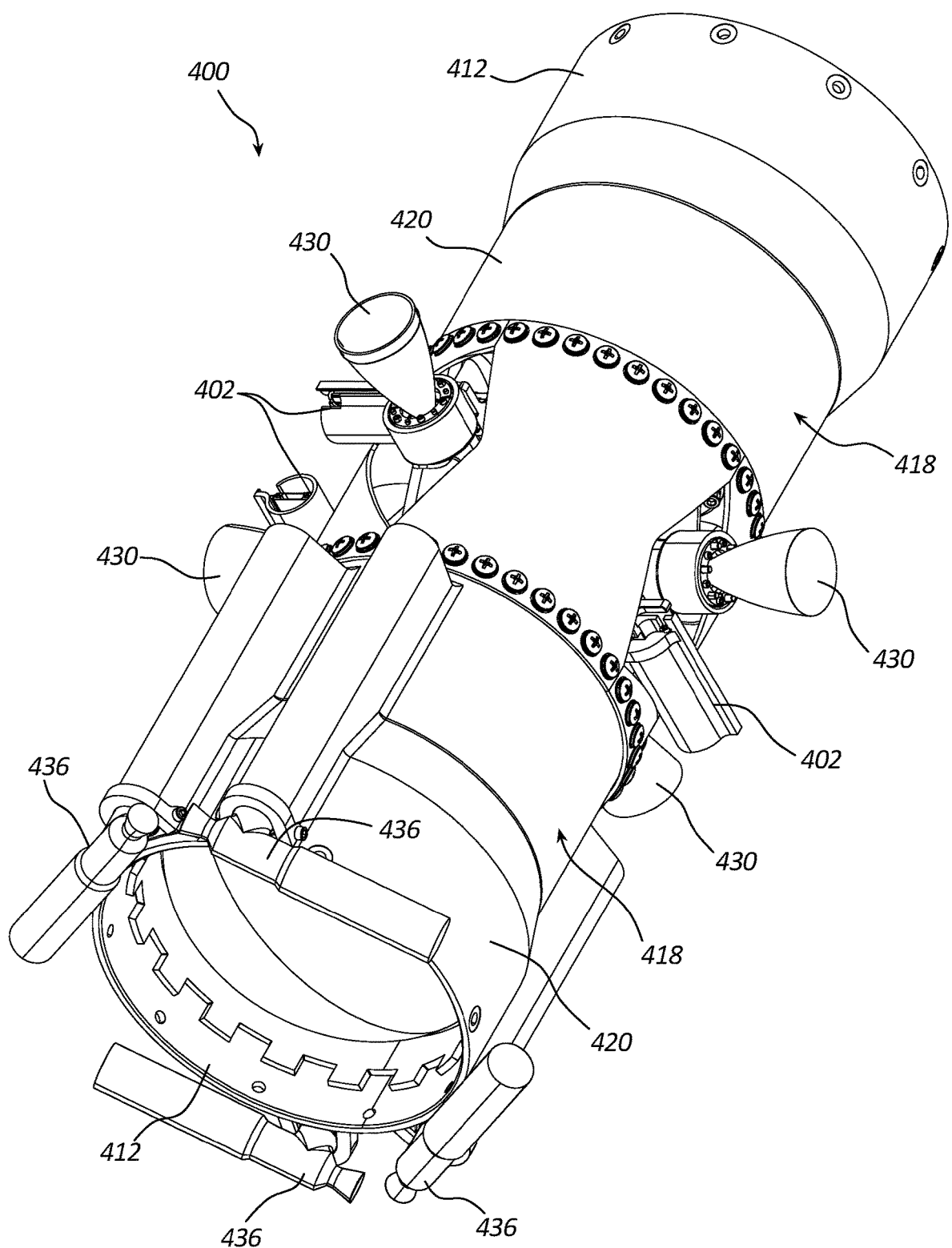

A prototype divert system 400 is designed and fabricated. Isometric views from the forward and aft directions of the divert system 400 are shown in FIGS. 32 and 33. The divert system 400 is a close representation of a production divert system such as the one shown in FIG. 18. The divert system 400 is designed to satisfy the requirements in the following tables.

TABLE 20

Prototype Divert System Specifications

| Parameter | Value |
| --- | --- |
| Propellant loading | 2.5 in usable web. Outer diameter driven by max envelope and linings. |
| Operation time | Launch to initiation: ≤1000 s<br>Upon initiation command: ≥1000 s |
| Divert duty cycle | Requirement: 3 pulses over 1000 s period (POD at T+0, T+500, T+1000) + 1 backup pulse/igniter |
| Divert pulse operation time | 1 s |
| Divert operating pressure | 80 lbf nominal |

TABLE 20-continued

Prototype Divert System Specifications

| Parameter | Value |
|---|---|
| Divert system thrust | Not specified |
| Maximum mass | The maximum mass, when fully loaded with expendables, shall not exceed 300.0 lbm |
| Maximum envelope | 17.26 in diameter × 225 in length |
| Thruster misalignment | TBD |
| Structural stiffness | Maximize as best as possible within reasonable judgement. |
| Normal temp | System shall meet performance and reliability after continuous exposure to assembly and check out temperature range of +50° F. to +95° F. during the final assembly and missile encanisterization period of up to 180 days. |
| Air conditioning malfunction temp | System shall meet performance and reliability after continuous exposure to assembly and check out temperature range of 0° F. to +120° F. due to air conditioning malfunction for a period not to exceed 72 hours. There can be up to three air conditioning malfunctions during any 180 day period. |
| Storage temp | System shall meet performance and reliability after continuous exposure to storage temperature range of −20° F. to +120° F. for periods up to 2 years. The conditions apply with maximum variation in any 24 hour period of 30° F. |
| Transportation temp | System shall meet performance and reliability after exposure to transportation temperature range of −20° F. to +130° F. for periods of up to 5 days. |
| Normal pressure | System shall meet performance and reliability after exposure to assembly and checkout atmospheric pressures of 15.4-11.3 psia (sea-level to 7000 ft). |
| PHS&T pressure | System shall meet performance and reliability after exposure to PHS&T atmospheric pressures of 15.4-2.7 psia (sea-level to 40,000 ft). |
| Factors of safety | The factors of safety for structures shall be as follows: All structures Not Specified: Yield: 1.50 Ultimate: 2.00 Fittings (Ultimate): 1.75 Castings (Ultimate): 2.00 DACS Pressurized Components: Proof: 1.10 × MEOP Yield: 1.50 Burst: 2.00 × MEOP DACS Propellant Grain and Bondline: Ultimate: 2.00 DACS Pressurant Tank: Proof: 1.50 × MEOP Burst: 2.00 × MEOP |
| Margin of safety | System shall have positive strength margins of safety based on minimum material thickness, minimum strength, extreme temperatures, and maximum expected combined loads calculated as follows for yield and ultimate conditions: MS = X/(Y*FS) − 1 > 0.0 |

TABLE 21

Prototype Attitude Control System Specifications

| Parameter | Value |
|---|---|
| Operation time | Launch to initiation: ≤1000 s Upon initiation command: ≥1000 s |
| Total ACS impulse | Not to exceed 50 lbf s per thruster |
| ACS duty cycle | On when divert thrusters are on |
| ACS pulse operation time | Continuous operation while divert thrusters are on |

TABLE 22

Prototype Divert Thruster Specifications

| Parameter | Value |
|---|---|
| Nominal peak thrust | 48.09 lbf; 80.72 lbf overthrust capable at 3000 psia |
| Thrust accuracy | Better than or equal to 0.30 lbf (at 1365.21 psia) |
| Nominal operating pressure | 1365.21 psia; 3000 psia during overthrust |
| Maximum expected operating pressure (MEOP) | 3300 psia |
| Throat | |
| Operating throat area (Aero.) | 0.021410 in² |
| Throat area margin | 1.20 |
| Throat area (+Margin) | 0.025692 in² |
| Natural throat diameter | 0.1809 in |
| Valve slope | 0.11 in²/in |
| Throat geometry | 0.47 in²/in; Class Circle-in-circle; dBarrel 1.250 in; thetaInlet 45°; dThroat 0.388 in; rsi 0.125 in; thetaExit 15°; dExit 1.972 in; rTip 1.500 in; yTipStart 1.160 in; dShaft 0.500 in; dSeal 0.343 in |
| Nozzle | |
| Maximum allowable divergent half-angle (at exit) | ≤15° |
| Minimum exit diameter | ≥0.590 in |
| Thruster inlet | |
| Inlet tube/barrel flow area | ≥0.06423 in² |

TABLE 23

Prototype Divert Thruster Actuator Specifications

| Parameter | Value |
|---|---|
| Step | |
| Step constant resistance force | ≥75 lbf |
| 0-90% step time against constant force | ≤0.010 s |
| Step size | 0.195 in |
| Bandwidth | |
| Force bandwidth at −3dB, −90° | ≥75 Hz |
| Bandwidth sinusoidal half amplitude input (±in) | 0.001 in |
| Constant prevailing torque driven during bandwidth | 75 lbf |
| Duty cycle | |
| Duty cycle RMS force | 75 lbf |
| Duty cycle time | 16 s |
| Temp rise during duty cycle | ≤150° F. |
| Threshold | |
| High load threshold | 0.001 in |
| Load at which threshold is measured | 75 lb |
| Accuracy | |
| Accuracy (±in) | ≤0.001 in |
| Temperature range for accuracy | 40-350° F. |
| Load for accuracy measurement | 75 lb |
| Miscellaneous | |
| Soak temperature | Not specified |
| Actuator weight | ≤0.75 lb |

TABLE 23-continued

Prototype Divert Thruster Actuator Specifications

| Parameter | Value |
|---|---|
| Inertial load | 0.015 lb |
| Friction load | 12.5 lb |
| Minimum total travel | Req: 0.245 in (+.025/−.000) Goal: ≥0.345 in |
| No load speed (m/s) | Not specified |
| Loaded speed (in/sec) | >20 in/s to meet 0-90% step at 75 Hz |
| Stall force | ≥75 lbf |
| Position sensor | DVRT, LVDT, potentiometer, or similar |
| Supply voltage [V] | 24-33 VDC (regulated) |
| Max steady state power draw | ≤150 W |
| Position command signal | 0-10 VDC, 25 mA max |
| Remote enable/disable | 5 V TTL enable/disable |
| Current draw sense | Linearly scaled 0-10 VDC current feedback |
| Position Feedback | Linearly scaled 0-10 VDC position feedback on output shaft |

TABLE 24

Prototype Attitude Thruster Specifications

| Parameter | Value |
|---|---|
| Nominal thrust | 4.08-16.32 lbf (500-2000 psia) |
| Thrust accuracy | Better than or equal to 0.20 lbf (500-2000 psia) |
| Nominal operating pressure | 500-2000 psia |
| Maximum expected operating pressure | 2200 psia |
| Allowable leak rate through ACS thruster | TBD |
| Pneumatic sealing load at 500 psia | TBD, forcing shaft into throat |
| Throat | |
| Operating throat area (Aero.) | 0.004902 in² |
| Throat area margin | 1.20 |
| Throat area (+margin) | 0.005883 in² |
| Natural throat diameter | 0.0865 in |
| Valve slope | 0.06 in²/in |
| Throat geometry | 0.47 in²/in |
| | Class       Circle-in-circle |
| | dBarrel     1.250 in |
| | thetaInlet  45° |
| | dThroat     0.388 in |
| | rsi         0.125 in |
| | thetaExit   15° |
| | dExit       1.972 in |
| | rTip        1.500 in |
| | yTipStart   1.160 in |
| | dShaft      0.500 in |
| | dSeal       0.343 in |
| Nozzle | |
| Maximum allowable divergent half-angle (at exit) | ≤18° |
| Minimum exit diameter | ≥0.282 in |
| Thruster inlet | |
| Inlet tube/barrel flow area | ≥0.014706 in² |

TABLE 25

Prototype Attitude Thruster Actuator Specifications

| Parameter | Value |
|---|---|
| Step | |
| Step constant resistance force | ≤10 lbf |
| 0-90% step time against constant force | ≥0.003 s |
| Step size | 0.082 in |
| Bandwidth | |
| Force bandwidth at −3 dB, −90° | ≥226 Hz |
| Bandwidth sinusoidal half amplitude input [±in] | 0.001 in |
| Constant prevailing torque driven during bandwidth | 10 lbf |
| Duty cycle | |
| Duty cycle RMS force | 2.5 lbf |
| Duty cycle time | 1000 s |
| Temp rise during duty cycle | ≤150° F. |
| Threshold | |
| High load threshold | 0.001 in |
| Load at which threshold is measured | 10 lb |
| Accuracy | |
| Accuracy [±in] | ≤0.001 in |
| Temperature range for accuracy | 40-350° F. |
| Load for accuracy measurement | 10 lb |
| Miscellaneous | |
| Soak temperature | Not specified |
| Parameter | Value |
| Actuator weight | ≤0.50 lb |
| Inertial load | 0.010 lb |
| Friction load | 12.5 lb |
| Minimum total travel | 0.120 in (+.025/−.000) |
| No load speed (m/s) | Not specified |
| Loaded speed (m/s) | >26 in/s to meet 0-90% step at 226 Hz |
| Stall force | ≥25 lbf |
| Position sensor | DVRT, LVDT, potentiometer, or similar |
| Supply voltage | 24-33 VDC (regulated) |
| Max steady state power draw | ≤150 W |
| Position command signal | 0-10VDC, 25 mA max |
| Remote enable/disable | 5V TTL enable/disable |
| Current draw sense | Linearly scaled 0-10VDC current feedback |
| Position feedback | Linearly scaled 0-10VDC position feedback on output shaft |

The divert system 400 includes four divert thrusters 430 coupled to corresponding electromechanical (EM) actuators 402 positioned between two middle domes or thruster interface domes 404. Four barrier ignitors 406 are coupled to the domes 404—two on each dome—to provide four divert ignition pulsing events. The ignitors 406 are pneumatically linked to the gas generators 418 through ports 408. Other ports 410 are used to couple thermocouple and pressure transducer instruments to the domes 404. The divert system 400 includes two extinguishable solid propellant gas generators (GG) 418 that mirror each other and operate (ignite, burn and extinguish) simultaneously.

An insulated hot gas tube 427 is centered on the axis of the gas generators 418 and pneumatically links the gas generators 418 together. The tube 427 provides pressure commutation and structure. There is a skirt 412 at the outermost end of each gas generator 418. The skirt 412 is used to mount hardware to the ground test table, rocket bulkhead interface and any other accessories that might be required. Within each gas generator 418 is an extinguishable solid propellant grain 414. The overall dimensions of the divert system 400 are about 5 inches in diameter and 15 inches in length.

The components and materials of the gas generators 418 are shown in FIGS. 37-42. The inner dome 404 contains a number of features. Each dome 404 has an interface 416 to pneumatically link the gas generators 418 to each other and balance pressure between each side.

Each gas generator 418 is coupled to two divert thrusters 430 for a total of four divert thrusters 430 (proportional divert thrusters). Metallic gas generators 418 were used for the prototype divert system 400. Other gas generator 418 materials and manufacturing options can be used in production systems such as insulated composites wound and composite overwrap of metallic liner.

Two different sizes of ports 408, 410 are used. The smaller ports 410 are used for instrumentation and for adapting to the divert ignition valve. The larger size ports 408 are used for igniter interfaces. The large threaded interface 416 between the dome and a case or housing 420 allows cartridge loading of the propellant grains (production systems will likely cast propellant directly into cases to minimize overall envelope and weight). Each gas generator 418 contains half of the total divert subsystem propellant.

There is a large fiber-reinforced phenolic spacer 422 at the outer end of each gas generator 418. The spacer 422 is meant to take up the dome volume so that the propellant grain 414 is flat on both ends. A standard elastomeric O-ring bore seal is used to contain pressure inside the gas generator 418. The spacer 422 is included in the prototype only for test efficiency in using existing hardware designs. A production system will fill the entire available volume of the gas generator 418 with propellant 414 to maximize overall propulsion system mass fraction.

Figure 40:
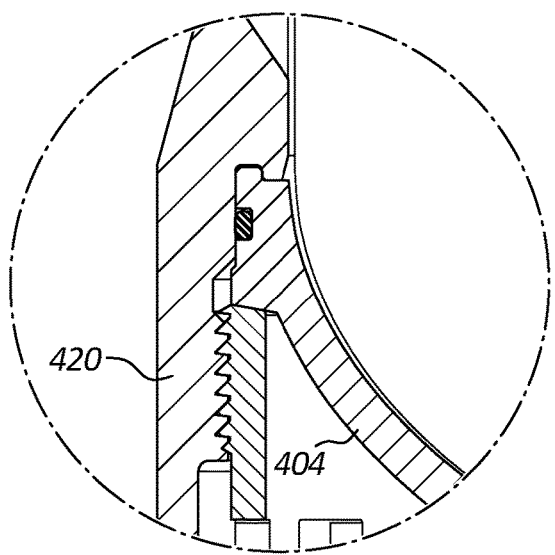
FIG. 40 is a cross sectional view of the interface between the case and the dome from the gas generator of the prototype divert system in FIGS. 32 and 33.

FIG. 40 illustrates details of the interface between the dome 404 and the case 420 of the gas generator 418. One challenge of the design is to accommodate a full diameter case joint by capturing the dome 404 while using the case 420 to limit dome deflection under pressure. The case joint incorporates buttress threads which prevent the thin walled threaded ring from unseating due to ejection loads. The O-ring sits within the threaded interface and capture link. Extrusion gaps are maintained as a result of this interface design.

Figure 41:
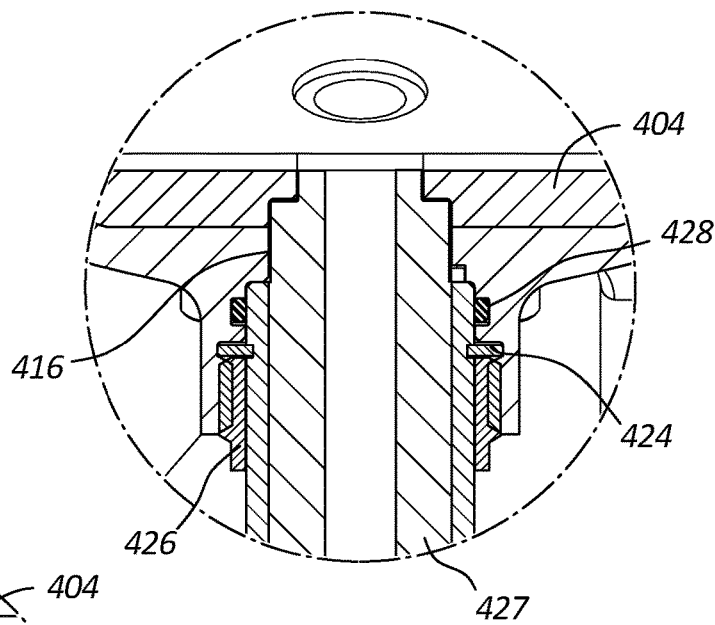
FIG. 41 is a cross sectional view of a hot gas tube connecting and extending between the gas generators of the prototype divert system in FIGS. 32 and 33.
Figure 42:
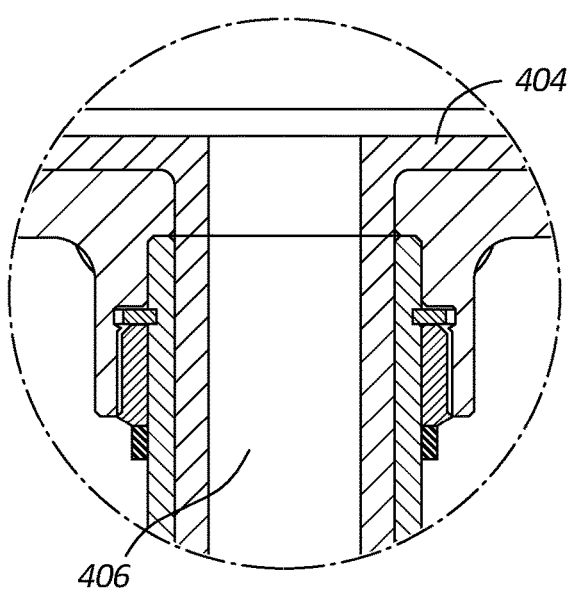
FIG. 42 is a cross sectional view of an igniter coupled to the gas generator of the prototype divert system in FIGS. 32 and 33.

FIG. 41 shows additional details of the pneumatic link interface between the gas generators 418. A spiral retaining ring 424 is loaded with a castle nut 426 and thereby mates the two gas generators 418 to each other. The linking tube 427 is sealed using an O-ring bore seal 428. All of the internal surfaces are insulated to limit hardware temperatures and preserve energy in the gas.

Figure 44:
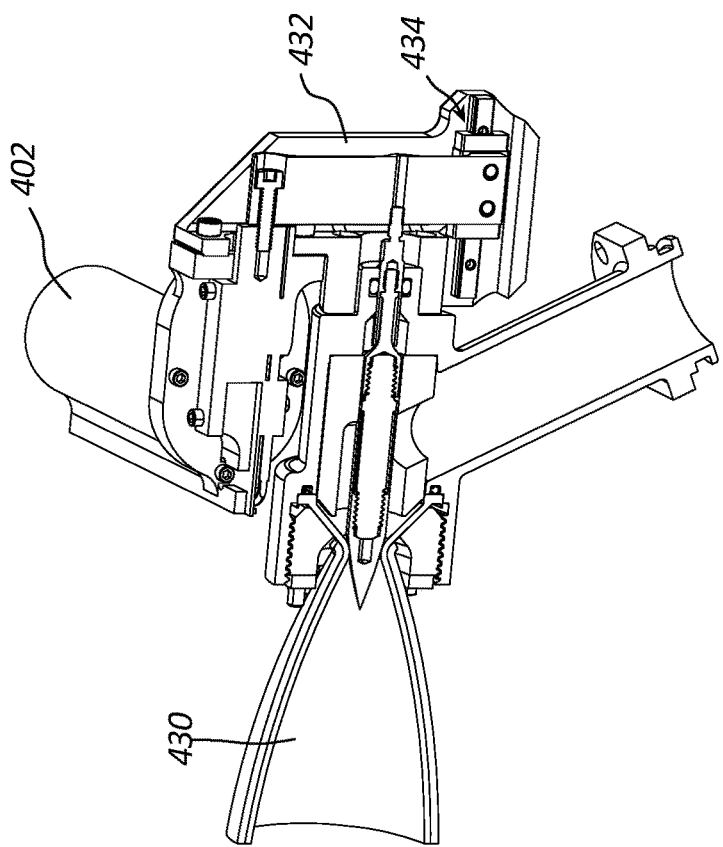
FIG. 44 is a perspective view of a cross section of the divert thruster in FIG. 43.
Figure 43:
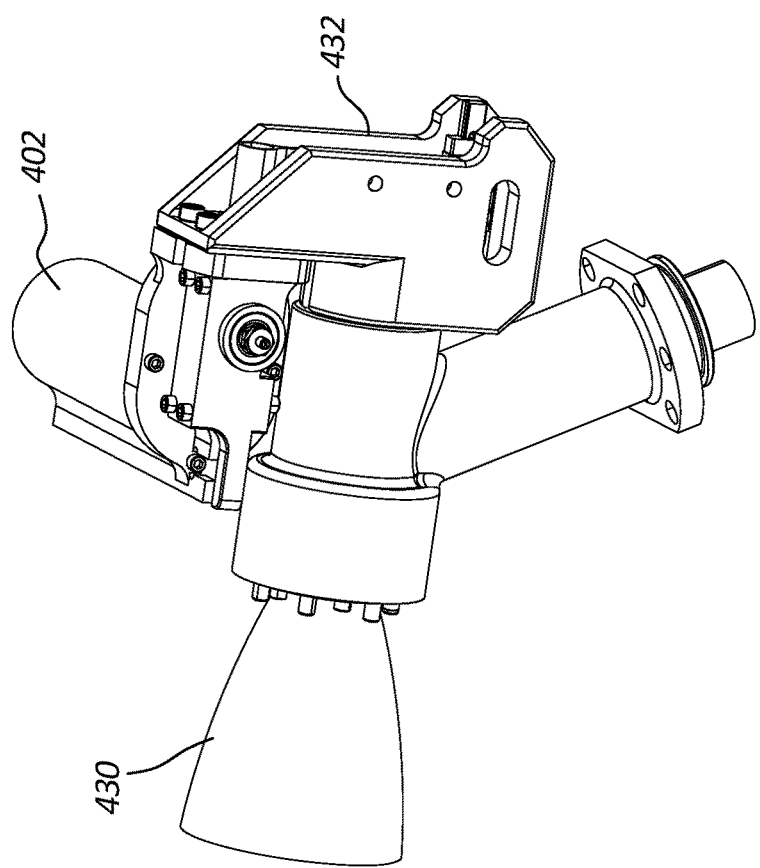
FIG. 43 is a perspective view of a divert thruster in the prototype divert system in FIGS. 32 and 33.
Figure 45:
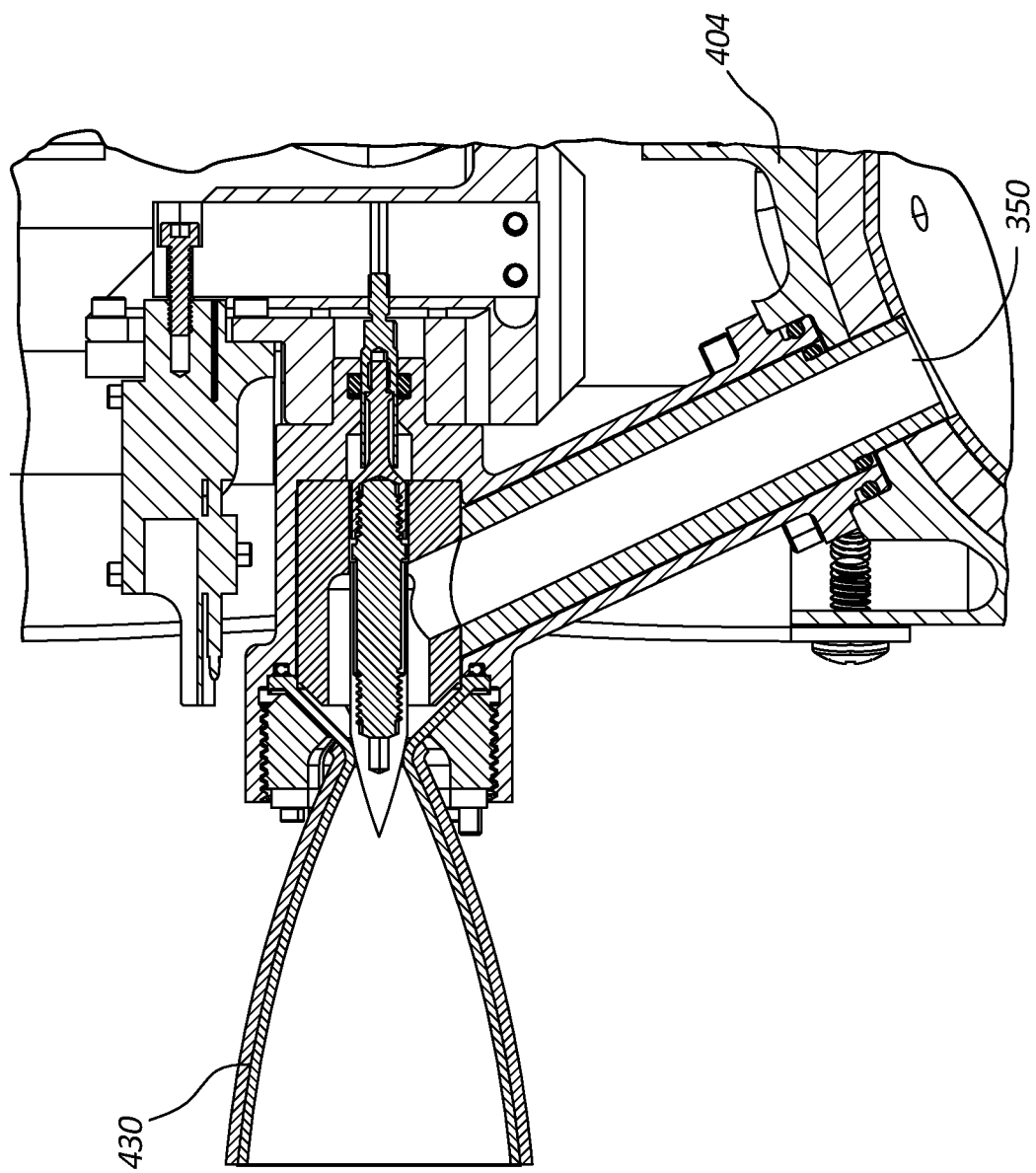
FIG. 45 is a cross sectional view of the divert thruster in FIG. 43 coupled to the gas generator.

FIGS. 43-45 show additional details of the divert thrusters 430. The divert thruster 430 includes a main bracket 432 that turns the actuator around 180° to allow more room for the actuator motor. Turning the actuator induced large relative displacements (and therefore thrust inaccuracy) between the actuator and thruster pintle. In order to minimize the relative displacements and deflections, the actuator link and slide carriage 434 were designed. They add substantial stiffness to the system. The orientation of the two items also maintains proportionality between the thruster pintle position and actuator stroke. The slide and carriage assembly 434 further improve bending stiffness.

Figure 46:
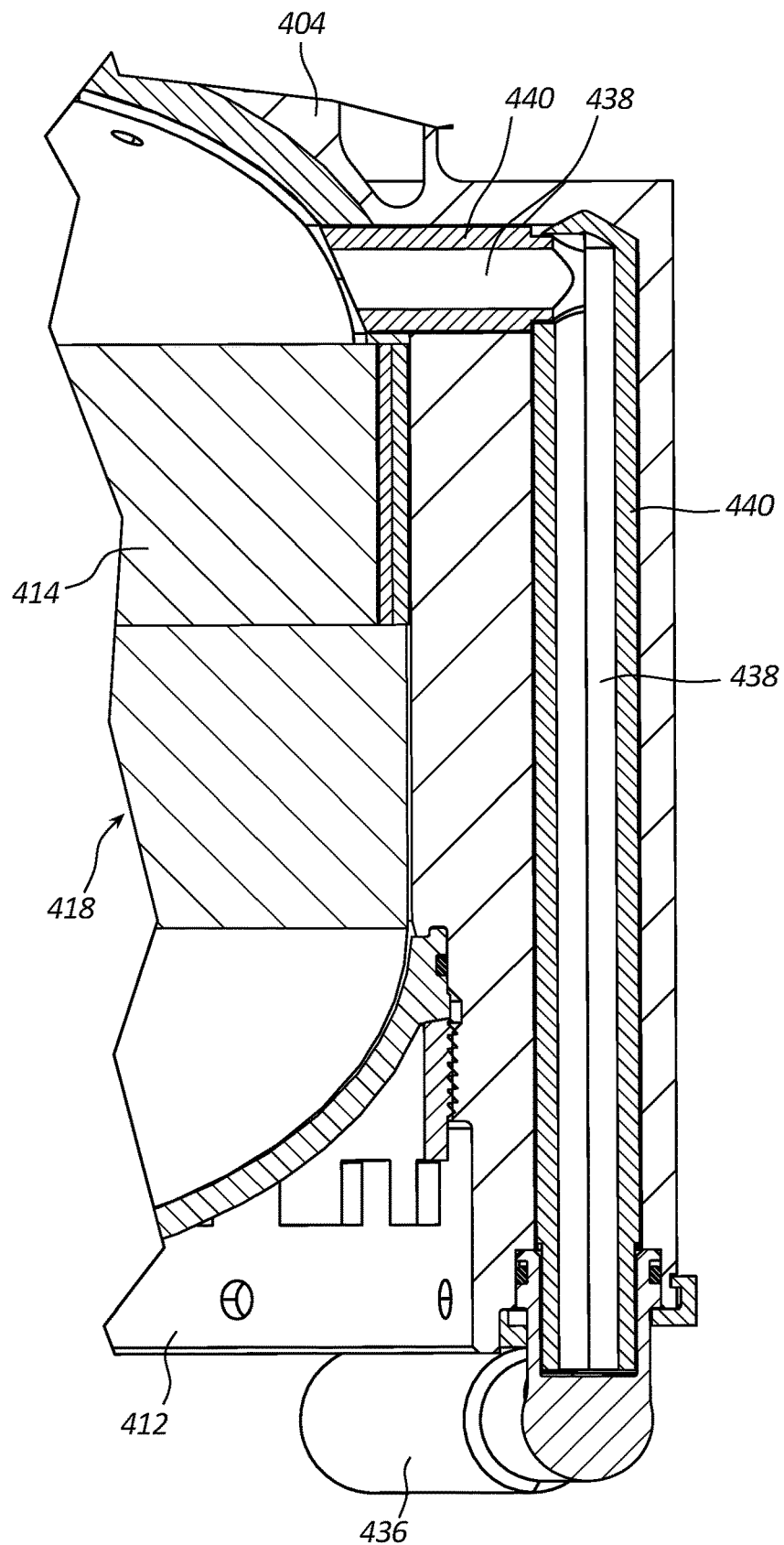
FIG. 46 is a cross sectional view of attitude thrusters coupled to the prototype divert system in FIGS. 32 and 33.

Attitude thrusters 436 are added to the prototype divert system 400 to demonstrate the attitude thruster technology in parallel with the divert prototype 400. The integral ACS manifold is shown in FIG. 46. The passageway 438 is machined directly into the outside of the gas generator case 420. Two EPDM insulators 440 are assembled in the passageway 438 and bonded into place. The attitude thruster 436 is assembled into place with a male bore seal with a clocking tab to control orientation. The attitude thruster 436 is held in place with a shoulder retaining clip.

Like the ACS manifold, the igniter 406 is integral with the gas generator case 420. The throat, burst disk, igniter propellant, and cushion are assembled into the case 420 in that order. A closure with a PacSci initiator caps off the igniter 406. It is sealed with a male bore seal held in place with a retaining ring. The igniter gas directly enters the gas generator 418 through the carbon phenolic throat. Subsequent igniters 406 are prevented from premature ignition by the one-way burst disks.

Example 5

The thermal heat transfer associated with a 1000 s propulsion duty cycle is analyzed. The heat transfer drives the overall dimensions and design techniques of the gas generator chamber and associated components. The heat transfer coefficients change dramatically depending on the location within the gas generator 418. The thruster inlets see the highest heat load and duration. The main propellant grain is not modeled in the thermal analysis. Instead, the heat is applied to the walls of the gas generator 418 in a burn-back duty cycle to simulate the heating into the case 420 and the insulation as the propellant grain 414 regresses and exposes the gas generator 418 to hot gas.

The location of each convective thermal load has three main event types: ignition, pulse, and off. This analysis does not include any radiation and is adiabatic. Nearly all surfaces of interfacing materials are in direct contact. Small areas around O-ring grooves are not in contact. However, the surfaces in those areas are so small that their separation has an insignificant influence on the results.

Figure 47:
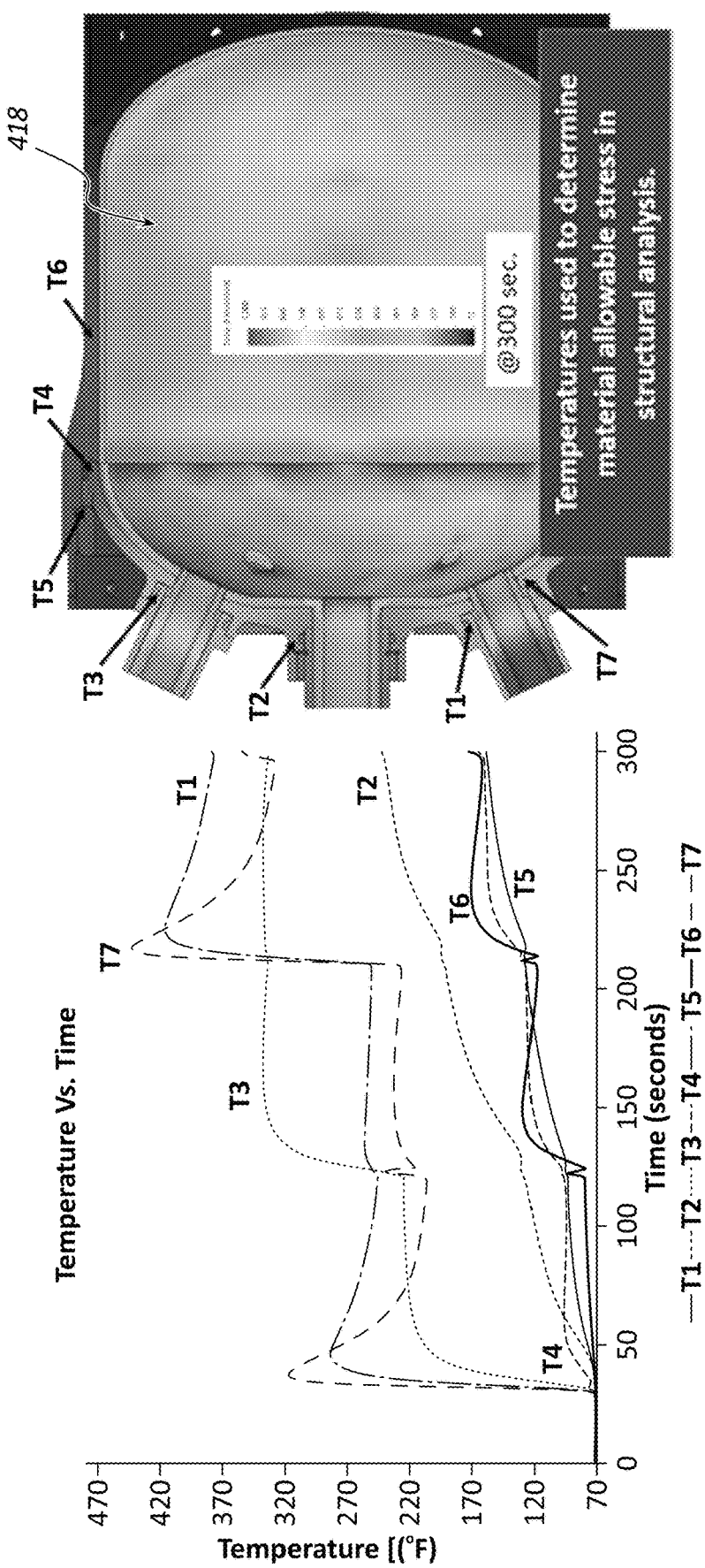
FIG. 47 shows the results of a thermal analysis of the prototype divert system. It includes a chart of the temperature at various locations along with an illustration of the locations.

The thermal results are shown in FIG. 47. Each probe location is labeled on the right and graphed on the left in a temperature vs. time plot. The temperature gradient plot is shown on the right at 300 seconds. Due to the long duration inter-pulse divert coast times associated with the 1000 second duty cycle it is believed that the 300 second analysis is conservative because the system cools down between pulses.

The results show that no specific area is excessively hot. Normally O-ring temperatures and material limits are the problematic areas. In this application, the temperatures are low for O-rings so they do not have any thermal problems. The material limits are based on the stress and were also determined not to be excessive. Seven probe locations are chosen for their location or temperature. The peak probe temperature is about 450° F. at location number seven at about 225 seconds into the duty cycle, at that time a divert thrust event is occurring. After the event occurs the interface cools down.

Example 6

A structural analysis of a number of significant components in the prototype divert system 400 are analyzed. Analyzed components include the linkage between the divert thruster 430 and the electromechanical actuator, the structural strength of the gas generators 418, and deflection at the thruster interface and the O-ring interface. All of the components passed the structural analyses.

Example 7

A computational thermal analysis of the divert thruster 430 is performed. The analysis determined that the divert thruster 430 is very likely to survive the divert prototype 1000 second multi-pulse duty cycle due to the inherent 500 sec cool down time between pulses.

Illustrative Implementations

The following is a description of various implementations of the disclosed subject matter. Each implementation may include one or more of the various features, characteristics, or advantages of the disclosed subject matter. The implementations are intended to illustrate a few aspects of the disclosed subject matter and should not be considered a comprehensive or exhaustive description of all possible implementations.

In one implementation, an attitude control system comprises: a gas generator including a propellant; an accumulator coupled to the gas generator, the accumulator being in fluid communication with the gas generator to allow hot gas produced by burning the propellant to flow between the accumulator and the gas generator; and a valve positioned between the gas generator and the accumulator, the valve including a main body; wherein the main body extends into the accumulator.

The valve can be an accumulator valve and the attitude control system can comprise a vent valve and a passage extending between the gas generator and the accumulator valve, wherein the vent valve moves between an open position where the passage is open to the outside and a closed position where the passage is not open to the outside. The attitude control system can comprise a valve shaft that moves between a first position where the valve is closed and a second position where the valve is open, the valve shaft including a ceramic matrix composite.

Pressure in the accumulator can cause hoop compression of the portion of the main body extending into the accumulator. The main body can include a ceramic matrix composite. The main body can include C—ZrOC or C—SiC. The attitude control system can comprise one or more thrusters coupled to the accumulator. The valve can be an accumulator valve and the attitude control system can comprise a divert valve that moves between an open position where the accumulator and/or the gas generator are in fluid communication with a divert system and a closed position where the accumulator and/or the gas generator are not in fluid communication with the divert system.

In another implementation, an attitude control system comprises: a gas generator including a propellant; an accumulator coupled to the gas generator, the accumulator being in fluid communication with the gas generator to allow hot gas produced by burning the propellant to flow between the accumulator and the gas generator; and a valve positioned between the gas generator and the accumulator, the valve including a main body made of a ceramic matrix composite.

The valve can be an accumulator valve and the attitude control system can comprise a vent valve and a passage extending between the gas generator and the accumulator valve, wherein the vent valve moves between an open position where the passage is open to the environment outside the attitude control system and a closed position where the passage is not open to the environment outside the attitude control system. The main body can include C—ZrOC or C—SiC. The attitude control system can comprise a valve shaft that moves between a first position where the valve is closed and a second position where the valve is open, the valve shaft including a ceramic matrix composite. The valve shaft can include C—ZrOC or C—SiC. Pressure in the accumulator can cause hoop compression of at least a portion of the main body of the valve.

The attitude control system can comprise one or more thrusters coupled to the accumulator. The valve can be an accumulator valve and the attitude control system can comprise a divert valve that moves between an open position where the accumulator and/or the gas generator are in fluid communication with a divert system and a closed position where the accumulator and/or the gas generator are not in fluid communication with the divert system.

In another implementation, an attitude control system comprises: a gas generator including a propellant; an accumulator coupled to the gas generator, the accumulator being in fluid communication with the gas generator to allow hot gas produced by burning the propellant to flow between the accumulator and the gas generator; and a valve positioned between the gas generator and the accumulator; wherein the attitude control system is a low level attitude control system for a guided missile.

The total impulse produced by attitude control system can be no more than 700 lbf·s. The valve can be an accumulator valve and the attitude control system can comprise a vent valve and a passage extending between the gas generator and the accumulator valve, wherein the vent valve moves between an open position where the passage is open to the outside and a closed position where the passage is not open to the outside.

The attitude control system can comprise a valve shaft that moves between a first position where the valve is closed and a second position where the valve is open, the valve shaft including a ceramic matrix composite. Pressure in the accumulator can cause hoop compression of at least a portion of the valve. The valve can comprise a main body including a ceramic matrix composite. The attitude control system can comprise one or more thrusters coupled to the accumulator.

The valve can be an accumulator valve and the attitude control system can comprise a divert valve that moves between an open position where the accumulator and/or the gas generator are in fluid communication with a divert system and a closed position where the accumulator and/or the gas generator are not in fluid communication with the divert system.

In another implementation, a method for controlling the attitude of a flight vehicle comprises: burning propellant in a gas generator to produce hot gas; storing the hot gas in an accumulator; and releasing the hot gas in the accumulator through one or more thrusters to control the attitude of the flight vehicle.

The method can comprise extinguishing the propellant in the gas generator when the pressure in the accumulator reaches a set point. The set point can be a first set point and the method can comprise igniting the propellant in the gas generator when a second set point is reached. The second set point can be a minimum pressure level in the accumulator or a set amount of time that has passed since a previous event.

The method can comprise repeatedly igniting and extinguishing the propellant in the gas generator to repeatedly pressurize the accumulator with the hot gas. The method can comprise burning an initial charge of propellant in the accumulator to pressurize the accumulator with hot gas. The method can comprise igniting the propellant in the gas generator for the first time with the hot gas generated by the initial charge. The method can comprise igniting the propellant in the gas generator with the hot gas stored in the accumulator. The method can comprise igniting propellant in a divert system using the hot gas in the accumulator. The flight vehicle can be a guided missile.

In another implementation, a method for controlling the attitude of a flight vehicle comprises: burning propellant in a gas generator to produce hot gas; storing the hot gas in an accumulator; closing a valve positioned between the gas generator and the accumulator to prevent hot gas from flowing between the gas generator and the accumulator; and extinguishing the propellant in the gas generator.

The method can comprise releasing the hot gas in the accumulator through one or more thrusters to control the attitude of the flight vehicle. Extinguishing the propellant in the gas generator can include opening a vent valve. The method can comprise opening the valve to allow the hot gas in the accumulator to flow to the gas generator and reignite the propellant. Opening the valve can include opening the valve when the pressure in the accumulator reaches a minimum level or a set amount of time has passed since a previous event. Closing the valve can include closing the valve when the pressure in the accumulator reaches a set point. The flight vehicle can be a guided missile.

P1. A method for guiding a flight vehicle comprising: (a) igniting solid propellant in a hot gas generator on the flight vehicle and generating hot gas; (b) discharging the hot gas through at least one divert thruster on the flight vehicle; (c) extinguishing the solid propellant by rapidly depressurizing the hot gas generator; and repeating (a) and (c) at least once; wherein (b) and (c) can be performed in any order.

P2. The method of paragraph P1 comprising repeating (a) and (c) at least twice.

P3. The method of any one of paragraphs P1-P2 comprising igniting the solid propellant in the hot gas generator with hot gas stored in a hot gas accumulator.

P4. The method of any one of paragraphs P1-P3 comprising igniting solid propellant in a hot gas accumulator on the flight vehicle and igniting the solid propellant in the hot gas generator with hot gas from the hot gas accumulator.

P5. The method of paragraph P4 comprising igniting solid propellant in an attitude control gas generator with the hot gas from the hot gas accumulator.

P6. The method of any one of paragraphs P1-P5 comprising igniting the solid propellant in the hot gas generator with an igniter.

P7. The method of any one of paragraphs P1-P6 wherein rapidly depressurizing the hot gas generator comprises opening an extinguishment valve.

P8. The method of any one of paragraphs P1-P7 wherein the hot gas generator is a first hot gas generator, and wherein (a) comprises igniting solid propellant in a second hot gas generator on the flight vehicle and generating hot gas.

P9. The method of paragraph P8 wherein the first hot gas generator and the second hot gas generator are part of a divert system and the first hot gas generator and the second hot gas generator are spaced apart and positioned opposite each other along a lengthwise axis of the divert system.

P10. The method of paragraph P9 wherein the first hot gas generator and the second hot gas generator are positioned symmetrically on the lengthwise axis of the divert system.

P11. The method of any one of paragraphs P1-P10 comprising providing on-demand, multi-pulse divert thrust for at least 1000 seconds operation time.

P12. The method of any one of paragraphs P1-P11 wherein the flight vehicle is a kill vehicle of a missile defense interceptor missile.

P13. The method of any one of paragraphs P1-P12 comprising discharging the hot gas through at least one attitude control thruster.

P14. A divert system for a flight vehicle comprising: a hot gas generator including solid propellant positioned in the hot gas generator; divert thrusters pneumatically linked to the hot gas generator; an extinguishment valve pneumatically linked to the hot gas generator, the extinguishment valve being movable between a closed position where the hot gas generator is not vented and an open position where the hot gas generator is vented; wherein the extinguishment valve is configured to rapidly depressurize the hot gas generator and extinguish the solid propellant when the extinguishment valve is moved from the closed position to the open position.

P15. The divert system of paragraph P14 wherein the hot gas generator is pneumatically separate from a propulsion rocket motor.

P16. The divert system of any one of paragraphs P14-P15 wherein the hot gas generator is a first hot gas generator, the diver system comprising: a second hot gas generator including solid propellant positioned in the second hot gas generator; wherein the first hot gas generator and the second hot gas generator are spaced apart and positioned opposite each other along a lengthwise axis of the divert system; wherein the first hot gas generator and the second hot gas generator are pneumatically linked to each other.

P17. The divert system of paragraph P16 wherein the divert thrusters are positioned between first hot gas generator and the second hot gas generator.

P18. The divert system of any one of paragraphs P16-P17 wherein the first hot gas generator and the second hot gas generator are positioned symmetrically on the lengthwise axis of the divert system.

P19. The divert system of any one of paragraphs P14-P18 comprising a hot gas accumulator pneumatically linked to the hot gas generator.

P20. The divert system of paragraph P19 comprising solid propellant positioned in the hot gas accumulator.

P21. The divert system of any one of paragraphs P19-P20 comprising an attitude control hot gas generator pneumatically linked to the hot gas accumulator.

P22. A divert system for a flight vehicle comprising: a first hot gas generator including solid propellant positioned in the first hot gas generator; a second hot gas generator including solid propellant positioned in the second hot gas generator; divert thrusters pneumatically linked to at least one of the first hot gas generator or the second hot gas generator; wherein the first hot gas generator and the second hot gas generator are spaced apart and positioned opposite each other along a lengthwise axis of the divert system; wherein the first hot gas generator and the second hot gas generator are pneumatically linked to each other; wherein the first hot gas generator and the second hot gas generator are pneumatically separate from a propulsion rocket motor; and wherein the divert thrusters are positioned between first hot gas generator and the second hot gas generator.

P23. The divert system of paragraph P22 comprising: an extinguishment valve pneumatically linked to the hot gas generator, the extinguishment valve being movable between a closed position where the hot gas generator is not vented and an open position where the hot gas generator is vented; wherein the extinguishment valve is configured to rapidly depressurize the hot gas generator and extinguish the solid propellant when the extinguishment valve is moved from the closed position to the open position.

P24. The divert system of any one of paragraphs P22-P23 comprising a hot gas accumulator pneumatically linked to the first hot gas generator and the second hot gas generator.

P25. The divert system of paragraph P24 comprising solid propellant positioned in the hot gas accumulator.

P26. The divert system of any one of paragraphs P24-P25 comprising an attitude control hot gas generator pneumatically linked to the hot gas accumulator.

P27. The divert system of any one of paragraphs P22-P26 wherein the first hot gas generator and the second hot gas generator are positioned symmetrically on the lengthwise axis of the divert system.

General Terminology and Interpretative Conventions

Any methods described in the claims or specification should not be interpreted to require the steps to be performed in a specific order unless expressly stated otherwise. Also, the methods should be interpreted to provide support to perform the recited steps in any order unless expressly stated otherwise.

Certain features described in the context of separate implementations can also be implemented in combination in a single implementation. Conversely, various features that are described in the context of a single implementation can also be implemented in multiple implementations separately or in any suitable subcombination. Moreover, although features may be described above in certain combinations and even initially claimed as such, one or more features from a claimed combination can be excised from the combination, and the claimed combination may be directed to a subcombination or variation of a subcombination.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative implementations where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any implementation, feature, or combination of features described or illustrated in this document. This is true even if only a single implementation of the feature or combination of features is illustrated and described.

Joining or Fastening Terminology and Interpretative Conventions

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Drawing Related Terminology and Interpretative Conventions

The drawings are intended to illustrate implementations that are both drawn to scale and/or not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

Spatial or directional terms, such as "left," "right," "front," "back," and the like, relate to the subject matter as it is shown in the drawings and/or how it is commonly oriented during manufacture, use, or the like. However, it is to be understood that the described subject matter may assume various alternative orientations and, accordingly, such terms are not to be considered as limiting.

INCORPORATION BY REFERENCE

The entire contents of each of the documents listed below are incorporated by reference into this document (the documents below are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any of the following documents and this document, then this document shall govern. The incorporated subject matter should not be used to limit or narrow the scope of the explicitly recited or depicted subject matter.

U.S. Prov. App. No. 62/670,685, titled "Flight Vehicle Divert System," filed on 11 May 2018.

U.S. Pat. No. 9,927,217 (application. Ser. No. 14/847,820), titled "Attitude Control System," filed on 8 Sep. 2015, issued on 27 Mar. 2018.

U.S. patent application Ser. No. 15/488,267, titled "Hot Gas Thruster," filed on 14 Apr. 2017.

U.S. patent application Ser. No. 14/875,424, titled "Attitude Control System," filed on 5 Oct. 2015.

The invention claimed is:

1. A method for controlling the trajectory of a flight vehicle comprising:
   (a) igniting solid propellant in a first hot gas generator disposed in a first case and a second hot gas generator disposed in a second case on the flight vehicle and generating hot gas, the solid propellant in the first hot gas generator and the second hot gas generator burning at the same time, wherein the second case is spaced apart from the first case along a lengthwise axis;
   (b) discharging the hot gas through at least one divert thruster on the flight vehicle;
   (c) extinguishing the solid propellant by rapidly depressurizing the first hot gas generator and the second hot gas generator;
   igniting solid propellant in a hot gas accumulator on the flight vehicle and igniting the solid propellant in the first hot gas generator and/or the second hot gas generator with hot gas from the hot gas accumulator, wherein the hot gas accumulator is configured to store hot gas; and
   repeating (a) and (c) at least once;
   wherein (b) and (c) can be performed in any order.

2. The method of claim 1 comprising repeating (a) and (c) at least twice.

3. The method of claim 1 comprising igniting the solid propellant in the first hot gas generator and/or the second hot gas generator with hot gas stored in a hot gas accumulator.

4. The method of claim 1 comprising igniting solid propellant in an attitude control gas generator with the hot gas from the hot gas accumulator.

5. The method of claim 1 comprising igniting the solid propellant in the first hot gas generator and/or the second hot gas generator with an igniter.

6. The method of claim 1 wherein rapidly depressurizing the first hot gas generator and the second hot gas generator comprises opening an extinguishment valve.

7. The method of claim 1 wherein the first hot gas generator and the second hot gas generator are part of a divert system and the first hot gas generator and the second hot gas generator are spaced apart and positioned opposite each other along a lengthwise axis of the divert system.

8. The method of claim 1 comprising providing on-demand, multi-pulse divert thrust for at least 1000 seconds operation time.

9. The method of claim 1 wherein the flight vehicle is a kill vehicle of a missile defense interceptor missile.

10. A divert system for a flight vehicle comprising:
    a first hot gas generator including solid propellant positioned in the first hot gas generator;
    a second hot gas generator including solid propellant positioned in the second hot gas generator;
    divert thrusters on the flight vehicle pneumatically linked to at least one of the first hot gas generator or the second hot gas generator; and
    an extinguishment valve pneumatically linked to the first hot gas generator and the second hot gas generator, the extinguishment valve being movable between a closed position where the hot gas generator is not vented and an open position where the hot gas generator is vented;
    wherein the extinguishment valve is configured to rapidly depressurize the hot gas generator and extinguish the solid propellant when the extinguishment valve is moved from the closed position to the open position;
    wherein the first hot gas generator and the second hot gas generator are spaced apart along a lengthwise axis of the divert system and positioned opposite each other along the lengthwise axis;
    wherein the first hot gas generator and the second hot gas generator are pneumatically linked to each other;
    a hot gas accumulator pneumatically linked to the first hot gas generator and/or the second hot gas generator; and
    solid propellant positioned in the hot gas accumulator.

11. The divert system of claim 10 wherein the first hot gas generator and the second hot gas generator are pneumatically separate from any propulsion rocket motors on the flight vehicle.

12. The divert system of claim 10 wherein the divert thrusters are positioned between first hot gas generator and the second hot gas generator.

13. The divert system of claim 10 comprising an attitude control hot gas generator pneumatically linked to the hot gas accumulator.

14. A divert system for a flight vehicle comprising:
- a first hot gas generator including solid propellant positioned in the first hot gas generator;
- a second hot gas generator including solid propellant positioned in the second hot gas generator;
- divert thrusters pneumatically linked to at least one of the first hot gas generator or the second hot gas generator;
- wherein the first hot gas generator and the second hot gas generator are spaced apart along a lengthwise axis of the divert system and positioned opposite each other along the lengthwise axis;
- wherein the first hot gas generator and the second hot gas generator are pneumatically linked to each other;
- wherein the first hot gas generator and the second hot gas generator are pneumatically separate from any propulsion rocket motors on the flight vehicle;
- wherein the divert thrusters are positioned between the first hot gas generator and the second hot gas generator along the lengthwise axis of the divert system;
- a hot gas accumulator pneumatically linked to the first hot gas generator and/or the second hot gas generator; and
- solid propellant positioned in the hot gas accumulator.

15. The divert system of claim 14 comprising:
- an extinguishment valve pneumatically linked to the first hot gas generator and/or the second hot gas generator, the extinguishment valve being movable between a closed position where the first hot gas generator and/or the second hot gas generator is not vented and an open position where the first hot gas generator and/or the second hot gas generator is vented;
- wherein the extinguishment valve is configured to rapidly depressurize the first hot gas generator and/or the second hot gas generator and extinguish the solid propellant when the extinguishment valve is moved from the closed position to the open position.

16. The divert system of claim 14 comprising an attitude control hot gas generator pneumatically linked to the hot gas accumulator.

* * * * *